US012447588B2

(12) United States Patent

Opsitos, Jr. et al.

(10) Patent No.: US 12,447,588 B2
(45) Date of Patent: Oct. 21, 2025

(54) IMPACT DRIVER

(71) Applicant: BLACK & DECKER INC., New Britain, CT (US)

(72) Inventors: Robert J. Opsitos, Jr., Felton, PA (US); Sandip Patel, Rosedale, MD (US); Hamza Nisar, Ellicott City, MD (US); Dylan Parker, Towson, MD (US)

(73) Assignee: Black & Decker Inc., New Britain, CT (US)

(*) Notice: Subject to any disclaimer, the term of this patent is extended or adjusted under 35 U.S.C. 154(b) by 282 days.

(21) Appl. No.: 18/078,822

(22) Filed: Dec. 9, 2022

(65) Prior Publication Data

US 2023/0191567 A1 Jun. 22, 2023

Related U.S. Application Data

(60) Provisional application No. 63/291,087, filed on Dec. 17, 2021.

(51) Int. Cl.
*B25B 21/02* (2006.01)

(52) U.S. Cl.
CPC .................................. *B25B 21/023* (2013.01)

(58) Field of Classification Search
CPC ........ B25D 16/00; B25D 17/06; B25D 17/11; B25D 17/24; B25D 17/245; B25D 17/22;
(Continued)

(56) References Cited

U.S. PATENT DOCUMENTS 3,210,959 A 10/1965 Brown
3,289,407 A 12/1966 Brown
(Continued)

FOREIGN PATENT DOCUMENTS

GB 2231292 A 11/1990
GB 2240500 A 8/1991
(Continued)

OTHER PUBLICATIONS

Extended European Search Report issued in EP Application No. 22214014.7, dated Jan. 26, 2023, pp. 1-9.

*Primary Examiner* — Robert J Scruggs
(74) *Attorney, Agent, or Firm* — Brake Hughes Bellermann LLP

(57) ABSTRACT

A power tool comprises a housing, a motor assembly and an impact assembly configured to be driven by the motor assembly. The impact assembly comprises a hammer defining a hammer chamber therein and an anvil at least partially disposed in the hammer chamber and configured to rotationally drive an output shaft. The anvil comprises a body portion, an anvil chamber defined therein, and a reciprocating member configured to selectively move radially outwardly relative to the body portion to be selectively impacted by an impact member of the hammer so that the hammer selectively imparts rotational movement to the anvil. The anvil includes an active valve configured to control discharge of fluid from an anvil chamber to the hammer chamber. The active value variably opens based on variance of one or more physical characteristics of the fluid (e.g., at least one of volume, temperature, pressure, or viscosity of the fluid).

22 Claims, 50 Drawing Sheets

(58) Field of Classification Search
CPC ..... B25B 21/002; B25B 21/008; B25B 21/02; B25B 21/023; B25B 21/026; B25B 23/14; B25B 23/1405; B25B 23/145; B25F 5/001; B25F 5/02
See application file for complete search history.

(56) References Cited

U.S. PATENT DOCUMENTS

| | | | |
|---|---|---|---|
| 4,175,408 | A | 11/1979 | Kasal et al. |
| 4,533,337 | A | 8/1985 | Schoeps |
| 4,683,961 | A | 8/1987 | Schoeps |
| 4,767,379 | A | 8/1988 | Schoeps |
| 4,836,296 | A | 6/1989 | Biek |
| 4,854,916 | A | 8/1989 | Schoeps |
| 4,884,995 | A | 12/1989 | Schoeps |
| 5,092,410 | A | 3/1992 | Wallace et al. |
| 5,163,519 | A | 11/1992 | Mead et al. |
| 5,172,772 | A | 12/1992 | Kettner et al. |
| 5,429,553 | A | 7/1995 | Schoeps |
| 5,704,434 | A | 1/1998 | Schoeps |
| 6,110,045 | A | 8/2000 | Schoeps |
| 6,708,778 | B2 | 3/2004 | Tokunaga |
| 7,647,986 | B2 | 1/2010 | Kettner |
| 8,338,997 | B2 | 12/2012 | Nishikawa |
| 8,360,166 | B2 | 1/2013 | Iimura et al. |
| 9,878,435 | B2 | 1/2018 | Ito |
| 10,994,393 | B2 | 5/2021 | Harada et al. |
| 2001/0010268 | A1 | 8/2001 | Tokunaga et al. |
| 2001/0027871 | A1 | 10/2001 | Tokunaga |
| 2004/0182588 | A1 | 9/2004 | Tokunaga et al. |
| 2005/0023016 | A1 | 2/2005 | Nakamizo |
| 2008/0110656 | A1 | 5/2008 | Kettner |
| 2009/0008117 | A1 | 1/2009 | Kettner |
| 2010/0252287 | A1 | 10/2010 | Morimura et al. |
| 2011/0073334 | A1 | 3/2011 | Iimura et al. |
| 2011/0203822 | A1 | 8/2011 | Harada et al. |
| 2011/0214894 | A1 | 9/2011 | Harada et al. |
| 2012/0000684 | A1 | 1/2012 | Sugimoto |
| 2012/0006573 | A1 | 1/2012 | Sugimoto |
| 2012/0073846 | A1 | 3/2012 | Hiral et al. |
| 2014/0371018 | A1 | 12/2014 | Ito |
| 2015/0343622 | A1 | 12/2015 | Chen |
| 2019/0232469 | A1* | 8/2019 | Carlson ................. B25B 21/026 |
| 2020/0023501 | A1 | 1/2020 | Bandy et al. |
| 2020/0108490 | A1 | 4/2020 | Uemura |
| 2021/0031342 | A1 | 2/2021 | Takahagi |
| 2021/0339361 | A1* | 11/2021 | Abbott .................. B25B 21/026 |
| 2023/0311290 | A1 | 10/2023 | Takahagi |

FOREIGN PATENT DOCUMENTS

| | | | |
|---|---|---|---|
| JP | H08187673 | A | 7/1996 |
| JP | H08192370 | A | 7/1996 |
| JP | 2000308975 | A | 11/2000 |
| JP | 2002028874 | A2 | 1/2002 |
| JP | 2002361570 | A | 12/2002 |
| JP | 2003039341 | A | 2/2003 |
| JP | 2003291074 | A | 10/2003 |
| JP | 2004249423 | A | 9/2004 |
| JP | 2005014146 | A | 1/2005 |
| JP | 2005040881 | A | 2/2005 |
| JP | 2005144617 | A | 6/2005 |
| JP | 2006088280 | A | 4/2006 |
| JP | 2006102826 | A | 4/2006 |
| JP | 2007007821 | A | 1/2007 |
| JP | 2008044080 | A | 2/2008 |
| JP | 4103626 | B2 | 4/2008 |
| JP | 4247426 | B2 | 1/2009 |
| JP | 2009196074 | A | 9/2009 |
| JP | 2009269137 | A | 11/2009 |
| JP | 2010120121 | A | 6/2010 |
| JP | 2010284734 | A | 12/2010 |
| JP | 4801888 | B2 | 8/2011 |
| JP | 2012051067 | A | 3/2012 |
| JP | 5021240 | B2 | 6/2012 |
| JP | 2012161852 | A | 8/2012 |
| JP | 2012206181 | A | 10/2012 |
| JP | 5224105 | B2 | 3/2013 |
| JP | 2014240114 | A | 12/2014 |
| JP | 6027388 | B2 | 10/2016 |
| JP | 6198572 | B2 | 9/2017 |
| WO | 2018039564 | A1 | 3/2018 |
| WO | 2018054311 | A1 | 3/2018 |
| WO | 2021041829 | A1 | 3/2021 |

* cited by examiner

IMPACT DRIVER

CROSS-REFERENCE TO RELATED APPLICATIONS

This application claims the benefit of priority from U.S. Provisional Application No. 63/291,087, filed Dec. 17, 2021, titled "IMPACT DRIVER," which is incorporated herein by reference in its entirety.

FIELD

The present patent application relates to impact drivers.

BACKGROUND

Impact tools are configured to deliver rotational impacts to a workpiece at high speeds by storing energy in a rotating mass and transmitting it to an output shaft. The impact driver/tool generally includes a rotational impact mechanism/assembly, which has been used in power tools that are powered by either pneumatic or air-powered motors. The impact driver/tool may also be referred to as an oil pulse impact driver. More recently, this type of impact mechanism/assembly has been used in power tools powered by an electric motor. Two of these impact tools are described in U.S. Patent Application Publication No.: 2019/0232469 to Carlson et al. ("the '469 Publication") and U.S. Patent Application Publication No.: 2020/0047322 to Ito ("the '322 Publication").

FIG. 45 shows the impulse mechanism/assembly of the '469 Publication. FIGS. 46-48 also show various views of this prior art impact assembly. Referring to FIGS. 35-48, hammer cylinder and transmission assembly 1000 includes a hammer cylinder 1002, a planet carrier 1004 that is integral with the hammer cylinder 1002, three planet gears 1006, a carrier bearing 1008 and a ring gear 1010. The hammer cylinder 1002 has an integral planet carrier with three pins 1012 facing the ring gear 1010. These three pins 1012 attach to the three planet gears 1006, which couple with the ring gear 1010 and an output shaft of an electric motor. The carrier bearing 1008 connects to the back side of the hammer cylinder 1002 facing the ring gear 1010. The carrier bearing 1008 provides rotational support to the hammer cylinder 1002. The ring gear 1010 is received over the planet gears 1006 and the carrier bearing 1008 with the ring gear teeth meshed with the planet gear teeth. Since the planet gears 1006 are attached to the hammer cylinder 1002, the hammer cylinder 1002 rotates along with the planet gears 1006 once the electric motor is actuated. Inside the hammer cylinder 1002, there are two lugs 1014 that make contact with anvil blades 1016 every half rotation and a key slot 1018 that receives a rear end of a cam shaft 1020.

The anvil assembly comprises an anvil shaft 1022, the cam shaft 1020, two balls 1024, and two blades or vanes 1016. The anvil shaft 1022 has an axial bore 1026 in its rear end that receives the cam shaft 1020 with a key 1028 of the cam shaft 1020 protruding from the rear end of the anvil shaft 1022. The cam shaft 1020 has cam surfaces 1029. The anvil shaft 1022 also has two oblong radial holes 1034 in communication with the axial bore 1026 that receive the balls 1024. The anvil shaft 1022 also includes blade holder 1053 and two slots 1036 that loosely receive the blades or vanes 1016 radially outward from the balls 1024. The anvil shaft 1022 also has two inlet holes 1030 and two outlet holes 1032 (one of each shown) for a viscous fluid. These holes 1030, 1032 are perpendicular to the radial ball holes 1034.

The cam shaft 1029 has an oblong shape at its front end and the rectangular key 1028 at its rear end, which is received in the key slot 1018 in the hammer cylinder 1002 so that the cam shaft 1020 rotates together the hammer cylinder 1002. This allows the cam shaft 1020 to block or open the inlet hole 1030 and the ball hole 1034. The hammer cylinder 1002 and the cam shaft 1020 co-rotate, while the anvil shaft 1022 stays stationary for the most part. In one orientation, the cam shaft 1020 is able to block off the inlet holes 1030 while creating space for the balls 1024 to be pushed radially inwards, when the blades 1016 make contact with the hammer lugs 1014. When the blades 1016 make contact, the viscous fluid within the chamber provides resistances to the inward motion of the balls 1024. The viscous fluid acts as a damper and slows down the inward motion of the blades 1016. Between the time the lugs 1014 contact the blades 1016 and the blades 1016 skip over the lugs 1014, both the anvil shaft 1022 and the hammer cylinder 1002 are rotating together. Once the blades 1016 have passed over the lugs 1014, the cam shaft 1020 pushes the balls radially outward and prevents them from moving inwards. At this point, the inlet holes 1030 are open and the bore is in fluid communication with the hammer cylinder 1002.

When anvil assembly is assembled in the hammer cylinder 1002, the anvil shaft 1022 extends partially from the open front end of the hammer cylinder 1002. An externally threaded cylinder cap 1038 is threadably attached to internal threads on the open end of the hammer cylinder 1002 to create a closed space within the hammer cylinder 1002 that is filled with the viscous fluid. A bladder 1040 that is filled with air or another gas is located within a cavity 1044 in the cylinder cap 1038. The air bladder 1040 accounts for the expansions of the working fluid in the enclosed space inside the hammer cylinder 1002. A disk 1042 is received over the anvil shaft 1022 located between the bladder 1040 and the hammer cylinder cavity 1044 as the cylinder cap 1038 is threadably attached to the hammer cylinder 1002 with the anvil shaft 1022 extending through a central opening in the cylinder cap 1038.

FIG. 45 also shows the order of assembly of this prior art impact assembly. That is, all the components of this prior art impact assembly are loaded into the rear hammer cylinder 1002 in the direction of the arrow $OA_{prior}$. Also, as shown in FIG. 45, the planet gears are supported on the hammer cylinder 1002 by the planet gear carrier 1004 that is integral with the hammer cylinder 1002 and supported by the pins 1012 that are supported only at their front ends by the planet gear carrier 1004.

FIG. 49 shows the impulse mechanism 2000 of the '322 Publication. FIGS. 50-53 also show various views of this prior art impact assembly. Referring to FIGS. 49-53, The impact pulse mechanism 2000 of the '322 Publication works in a similar manner to that of the '469 Publication. The two biggest differences being that rear hammer cylinder 2002 is externally threaded (see external threads 2003) and contains a rear hex protrusion 2005 that mounts a triangular planet carrier 2004 thereon. The triangular planet carrier 2004 has a hexagonal aperture at the center which connects to a hexagonal protrusion 2007 on the rear hammer cylinder 2002. The planet gears 2006 are attached to the triangular planet carrier 2004 via press fit pins 2012. The carrier bearing 2008 is housed within the ring gear 2010 for providing rotational support to the hammer cylinder 2002. The bearing 2008 is press fit onto the rear hammer cylinder 2002. The hammer lugs 2014 are located inside the cylinder cap 2038. The anvil design of the '322 Publication is essentially the same as that of the '469 Publication. The cam shaft 2020, balls 2024, and blades 2016 are not held in place and are easily able to slide in and out. The only thing preventing them from sliding out is the internal cavity of the hammer cylinder 2002. In the case of the balls, the cam shaft 2020 also contain them, and prevent them from falling into the bore. The cam shaft 2020 has a key which is inserted into a slot located inside the rear hammer cylinder 2002. With this configuration, the cam shaft 2020 co-rotates with the rear hammer cylinder 2002. The cylinder cap 2038, facing the toward the nose cone contains a cavity 2039 that houses rubber air bladder 2040 and a disk 2042, which separates the bladder cavity 2039 from the hammer cylinder cavity. The hammer cap 2038 is threaded to the rear hammer cylinder 2002.

The hydraulic impact driver mechanisms, which are currently offered in the market, generally include a system of collapsible angled vanes (analogous to traditional anvil lugs) contained within the drive anvil and an impactor shell with corresponding angled impact lugs. The blades or vanes resistance to inward movement when force is applied to them by the impact shell, is governed by the oil contained within the impact driver mechanisms, and specifically the oil/fluid under the vane/blade.

In these systems, the tolerances around the vane/blade define the blow by area. The amount of blow by area controls how readily the inwardly driven blade/vane can pass the oil from under the vane/blade. This detail effects the performance of the system in various temperature conditions (because of oil viscosity changes), there is an ideal amount of blow by area to keep the total system functioning well across the range of temperatures and application joint torques. As the blow by area is defined by part tolerance interaction, it can vary from mechanism to mechanism. To little blow by area and the system will perform well in room temperature and when hot, but will not function when cold (load too high, likely stalling the electric motor). Too much blow by area and the system will perform well in cold, but its performance will suffer at room temperature, and potentially not function (freewheeling mechanism with no drive output) when hot.

To this end, the common tactic is to provide a setscrew to control total blow by area. For a system that has tighter vane tolerance stack up, the set screw is loosened from closed to open a secondary path for the oil/fluid. For the opposite condition of looser tolerance and greater blow by area, the set screw is tightened towards closed, reducing the total blow by area.

In the '469 Publication, referring to FIG. 45, the discharge of the viscous hydraulic fluid from the outlet orifices 1032 is controlled by the position of an orifice screw 1041, which dampens the radial inward movement of the blades or vanes 1016. One problem with this design of the '469 Publication is that the position of the orifice screw 1041 is calibrated and preset at the factory and cannot easily be adjusted by a user. When the power tool is operating at low temperatures, the hydraulic fluid becomes more viscous and tends to not get released quickly enough, leading to possible stall of the electric motor. When the impact tool is operating at high temperatures, the hydraulic fluid becomes less viscous and tends to get released too quickly, leading to faster than desired impacts. It would be desirable to have a valve system/design that operates at a wide range of temperatures with similar performance regardless of temperature.

This setscrew 1041 is generally tuned at end of line to deliver the right balance for a given collection of parts. This compromises performance in normal conditions to allow function at the temperature extremes. This also adds considerable complication to end of line processing as the unit must be checked against the metrics of performance and current consumption, and then adjusted (perhaps multiple times) to bring it in line. It is also a challenge to tune at room temperature, having to relate metrics in room temp conditions to the cold and hot temp conditions. The way the anvil 1022 contains the setscrew 1041, the hole threaded from the drive end of the anvil 1022, making it accessible from the front of the finished tool, precludes the use of bit ejection springs, which are user preferred for bit ejection and assisting with bit runout by axially loading the bit.

It should be mentioned that as the mechanism is used, it heats up. So, not only are ambient conditions a factor, but the performance in use will also drift with enough usage. With a fixed set screw position, there is no ability to accommodate for this.

Within the oil pulse/impact mechanism of the impulse drivers of the '469 Publication and the '322 Publication, there is a requirement for a compressible bladder to accommodate the volumetric changes the oil/fluid experiences as its temperature changes within the mechanism chamber. While external environmental temperature changes will cause a volumetric change to be compensated for, the bladders primarily exist to compensate from the volumetric change the oil/fluid experiences from the temperature increases in the oil/fluid as a function of the power tool use. As the oil/fluid is forced through the blowby areas/ports, from impactor collision forcing the vanes/blade inward, that the oil/fluid is compressed and sheared. This working of the oil/fluid will cause it to heat up and thus expand. Since the mechanism chamber is fully sealed and because the oil/fluid volume must be complete (no free air volume), the pressure in the chamber can rise dramatically from temperature changes. This pressure rise can cause leakage, which is detrimental to the performance of the tool, and if the internal chamber pressure increases too far, it can stall the power tool out and cause the impact mechanism to not function.

The '469 Publication and the '322 Publication use sealed elastic tubes that entrap gas inside them. These systems main detriment are they are single point failure systems, meaning that if the sealed elastic tube is compressed too far, it can rupture. Any leak is catastrophic, and renders the bladder totally non-functional.

Various improvements to the impact drivers or tools are desired.

SUMMARY

The present patent application provides improvements in the impact drivers or tools.

One aspect of the present patent application provides a power tool. The power tool comprises a housing, a motor assembly disposed in the housing, an output shaft at least partially received in and rotatable relative to the housing, and an impact assembly operatively coupled with the motor assembly and configured to be driven thereby. The impact assembly comprises a hammer defining a hammer chamber therein for receiving a fluid therein and an inwardly protruding impact member. An anvil defining an anvil chamber therein is at least partially disposed in the hammer chamber and configured to rotationally drive the output shaft. The hammer is configured to be rotationally driven upon rotation of the motor assembly. The anvil comprises a body portion configured to be rotatable relative to the hammer and a reciprocating member configured to selectively move radially outwardly relative to the body portion to be impacted by the impact member of the hammer according to pressure of fluid in the anvil chamber so that the hammer imparts rotational movement to the body portion. The impact assembly may also comprise an active valve configured to control the discharge of the fluid from the anvil chamber to the hammer chamber so as to dampen the radial inward movement of the reciprocating member to the body portion. The active valve may be configured to be variably open based on one or more physical characteristics of the fluid.

Implementations of the foregoing aspects may include one or more of the following features. The anvil chamber may include an inlet orifice and an outlet orifice. The inlet orifice and the outlet orifice may be configured to selectively provide fluid communication between the anvil chamber and the hammer chamber.

The active valve may be configured to be movable among a plurality of positions including a closed position and one or more at least partially open positions therebetween to control the discharge of the fluid from the anvil chamber in the anvil to the hammer chamber via the outlet orifice.

The impact assembly may further comprise a cam shaft that is configured to be received within the anvil chamber and configured to selectively seal the inlet orifice.

The active valve may comprise a flapper valve. The flapper valve may comprise a flexible plate that is configured to selectively cover and flex relative to an outlet orifice in the anvil. The flapper valve may further comprise a limiter plate having a greater stiffness than the flexible plate. The limiter plate may be configured to limit travel of the flexible plate away from the outlet orifice. The flapper valve may further include a valve fastener that is configured to connect the flapper valve to the anvil. The flapper valve may further comprise one or more spacers disposed between the anvil and the flexible plate or between the flexible plate and the limiter plate.

The impact assembly may further comprise a valve alignment pin that is configured to align the active valve with respect to the outlet orifice.

The hammer may be generally cylindrical. The hammer may comprise at least one cooling vane on an outer surface of hammer.

The impact assembly may comprise an at least partially collapsible insert disposed inside the hammer chamber. The at least partially collapsible insert may be configured to reduce in volume upon an increase in temperature or pressure of the fluid in the hammer chamber. The at least partially collapsible insert may comprise a foam insert. The foam insert may be composed of a closed-cell foam material. The foam insert may comprise at least two foam inserts spaced apart in the hammer chamber.

The impact assembly may be configured to operate with the fluid in a temperature range between −30° C. and 215° C. without stall of the impact assembly. The impact assembly may be configured to operate in an environment having an ambient temperature range between −30° C. and 50° C. without stall of the impact assembly. The one or more physical characteristics of the fluid may include at least one of volume of the fluid, temperature of the fluid, pressure of the fluid and/or viscosity of the fluid.

The motor assembly may comprise an electric motor. The electric motor may comprise a brushless DC motor. The motor may be powered by a battery having a nominal voltage in the range of approximately 18 Volts (V) to approximately 80V (e.g., approximately 20V) and having a power output in the range of approximately 400 Watts to approximately 600 Watts (e.g., approximately 435 Watts). The impact assembly may be configured to provide an output torque in the range of approximately 500 inch-lbs. to approximately 750 in-lbs. (e.g., approximately 500 inch-lbs. to approximately 550 inch-lbs). The power tool may have a weight of at most 2.5 pounds (e.g., approximately 2.2 pounds) without the battery. The power tool may have an overall length of at most 4.5 inches (e.g., approximately 4 inches). The hammer cylinder may have an outer diameter of approximately 40 mm to approximately 45 mm (e.g., approximately 42 mm), a length of approximately 45 mm to approximately 50 mm (e.g., approximately 47 mm) and an interior volume of approximately 6 $cm^3$ to approximately 10 $cm^3$ (e.g., approximately 8 $cm^3$). Each partially collapsible insert may have a volume of approximately 2 $cm^3$ to approximately 4 $cm^3$ (e.g., approximately 2.8 $cm^3$) and may be collapsible to a volume of approximately 1 $cm^3$ to approximately 3 $cm^3$ (e.g., approximately 1.8 $cm^3$). The collapsible inserts may fill approximately 33% to approximately 50% of the interior volume of the cylinder when uncollapsed, and may collapse to about 50% to approximately 75% of its uncollapsed volume to fill approximately 17% to approximately 30% of the interior volume of the cylinder, enabling heat expansion of the fluid in the cylinder and a greater of volume of fluid in the cylinder.

Another aspect of the present patent application provides a power tool. The power tool comprises a housing, a motor assembly disposed in the housing, an output shaft at least partially received in and rotatable relative to the housing, and an impact assembly operatively coupled with the motor assembly and configured to be driven thereby. The impact assembly comprises a hammer defining a hammer chamber therein for receiving a fluid therein and an inwardly protruding impact member. An anvil defining an anvil chamber therein is at least partially disposed in the hammer chamber and configured to rotationally drive the output shaft. The hammer is configured to be rotationally driven upon rotation of the motor assembly. The anvil comprises a body portion configured to be rotatable relative to the hammer and a reciprocating member configured to selectively move radially outwardly relative to the body portion to be impacted by the impact member of the hammer according to pressure of fluid in the anvil chamber so as to impart rotational movement to the body portion. The impact assembly also may comprise at least two foam members within the hammer chamber. The foam members may be at least partially collapsible based upon a changing physical characteristic of the fluid during an operation of the impact assembly.

Implementations of the foregoing aspects may include one or more of the following features. Each foam member may comprise closed-cell foam material. Each foam member may have a C-shaped configuration. Each foam member may have the same cross-sectional area. The foam members may have different cross-sectional areas. The foam members may be spaced from one another within the hammer.

One of the foam members may be positioned at a first end portion of the hammer and the other of the foam members is positioned at an opposite second end portion of the hammer.

The impact assembly may further comprise foam member containment member that are positioned between the associated foam member and the associated portion of the hammer.

Each foam member may be received in a foam member receiving portion. The foam member receiving portion may be disposed at the first end portion of the hammer and/or at the second end of the hammer.

The hammer may comprise a first portion and a second portion connected to each other. The first portion of the hammer may comprise a first foam member receiving portion configured to receive one of the foam members therein. The second portion of the hammer may comprise a second foam member receiving portion configured to receive the other of the foam members therein.

The impact assembly may be configured to operate with the fluid in a temperature range between −30° C. and 215° C. without stall of the impact assembly. The impact assembly may be configured to operate in an environment having an ambient temperature range between −30° C. and 50° C. without stall of the impact assembly. The one or more physical characteristics of the fluid may include at least one of volume of the fluid, temperature of the fluid, pressure of the fluid and/or viscosity of the fluid.

The motor assembly may comprise an electric motor. The electric motor may comprise a brushless DC motor. The motor may be powered by a battery having a nominal voltage in the range of approximately 18 Volts (V) to approximately 80V (e.g., approximately 20V) and having a power output in the range of approximately 400 Watts to approximately 600 Watts (e.g., approximately 435 Watts). The impact assembly may be configured to provide an output torque in the range of approximately 500 inch-lbs. to approximately 750 in-lbs. (e.g., approximately 500 inch-lbs. to approximately 550 inch-lbs). The power tool may have a weight of at most 2.5 pounds (e.g., approximately 2.2 pounds) without the battery. The power tool may have an overall length of at most 4.5 inches (e.g., approximately 4 inches). The hammer cylinder may have an outer diameter of approximately 40 mm to approximately 45 mm (e.g., approximately 42 mm), a length of approximately 45 mm to approximately 50 mm (e.g., approximately 47 mm) and an interior volume of approximately 6 $cm^3$ to approximately 10 $cm^3$ (e.g., approximately 8 $cm^3$). Each partially collapsible insert may have a volume of approximately 2 $cm^3$ to approximately 4 $cm^3$ (e.g., approximately 2.8 $cm^3$) and may be collapsible to a volume of approximately 1 $cm^3$ to approximately 3 $cm^3$ (e.g., approximately 1.8 $cm^3$). The collapsible inserts may fill approximately 33% to approximately 50% of the interior volume of the cylinder when uncollapsed, and may collapse to about 50% to approximately 75% of its uncollapsed volume to fill approximately 17% to approximately 30% of the interior volume of the cylinder, enabling heat expansion of the fluid in the cylinder and a greater of volume of fluid in the cylinder.

Another aspect of the present patent application provides a power tool. The power tool comprises a housing having a rearward end portion and a forward end portion, a brushless motor received in the housing, a rotor shaft extending along a rotor axis and coupled to and configured to be rotatably driven by rotation of a rotor, and an impact assembly operatively coupled with the motor and configured to be driven thereby. The motor includes the rotor configured to rotate about the rotor axis and a stator having a stator core and conductive windings. The motor defines a motor envelope bounded by a rear plane at a rearmost point of the stator and the rotor, a front plane at a frontmost point of the stator and the rotor, and a generally cylindrical boundary extending from the rear plane to the front plane and surrounding a radially outermost portion of the stator and the rotor. The impact assembly comprises a hammer defining a hammer chamber therein for receiving a fluid therein and an inwardly protruding impact member. An anvil defining an anvil chamber therein is at least partially disposed in the hammer chamber and configured to rotationally drive the output shaft. The hammer is configured to be rotationally driven upon rotation of the motor assembly. The anvil comprises a body portion configured to be rotatable relative to the hammer, and a reciprocating member configured to selectively move radially outwardly relative to the body portion to be impacted by the impact member of the hammer according to pressure of fluid in the anvil chamber so that the hammer imparts rotational movement to the body portion. The power tool further comprises a first bearing configured to support the rotor shaft and at least partially received within the motor envelope, and a second bearing configured to support the hammer of the impact assembly and at least partially received within the motor envelope.

Implementations of the foregoing aspects may include one or more of the following features. The power tool may further comprise a support plate configured to support a portion of the hammer of the impact assembly. The support plate may be held non-rotatably relative to the housing and has a rearward portion at least partially nested within the stator. At least a portion of the rearward portion of the support plate may at least be partially received within the rotor.

At least a portion of the first bearing, at least a portion of the second bearing, and at least a portion of the support plate may be received within the motor envelope.

The support plate may include a nested portion that is at least partially received within the motor envelope. The nested portion of the support plate may support at least one of the first bearing and the second bearing. The nested portion of the support plate may at least be partially received within a recess in the rotor.

The first bearing may be received at least partially within a recess in the rotor.

The motor envelope may have a length from the rear plane to the front plane of approximately from 20 mm to 31 mm. The motor envelope may have a length from the rear plane to the front plane of approximately 25.7 mm.

A diameter of the cylindrical boundary of the motor envelope may be approximately from 45 mm to 56 mm. A diameter of the cylindrical boundary of the motor envelope may be approximately 51 mm. The motor envelope may have a volume of approximately from 31 $cm^3$ to 77 $cm^3$. The motor envelope may have a volume of approximately 52.5 $cm^3$.

The overall length, from a rear end of motor envelope to a front end of output shaft, of the power tool may be in the range of approximately 89 mm to 115 mm. An overall girth of the power tool may be in the range of approximately 152 mm to 216 mm.

Another aspect of the present patent application provides a power tool comprises a housing, a motor assembly disposed in the housing, an impact assembly operatively coupled with the motor assembly and configured to be driven thereby, and a transmission drivingly coupling the motor assembly to the hammer. The transmission includes an input gear and an output gear. The impact assembly comprises a hammer defining a hammer chamber therein for receiving a fluid therein and an inwardly protruding impact member. An anvil defining an anvil chamber therein is at least partially disposed in the hammer chamber and configured to rotationally drive the output shaft. The hammer is configured to be rotationally driven upon rotation of the motor assembly. The anvil comprises a body portion configured to be rotatable relative to the hammer, and a reciprocating member configured to selectively move radially outwardly relative to the body portion to be impacted by the impacting member of the hammer according to pressure of fluid in the anvil chamber so that the hammer imparts rotational movement to the body portion. The hammer includes a gear carrier configured to carry the output gear.

The gear carrier includes a first gear carrier portion and a second gear carrier portion, the first and second gear carrier portions having a slot therebetween. The slot is configured to receive the output gear therein. The output gear, received in the associated slot, is supported by a support member. The support member may be supported at spaced locations by the first gear carrier portion and the second gear carrier portion.

Implementations of the foregoing aspects may include one or more of the following features. The spaced locations may be locations that are spaced apart axially along a longitudinal direction of the power tool.

The support member may be supported at its first end portion by the first gear carrier portion and its second end portion by the second gear carrier portion.

The output gear may comprise at least one planet gear.

The support member may be configured to extend through and to be received in a first carrier opening in the first gear carrier portion, a gear opening in the associated gear member, and a second carrier opening in the second gear carrier portion.

The first gear carrier portion and the second gear carrier portion may be connected to each other by connector portions that are positioned between the slots.

The second gear carrier portion may include a front surface facing the first gear carrier portion and an opposing rear surface. The rear surface of the second gear carrier portion may include an outwardly extending support portion extending away from the first gear carrier portion and disposed centrally on the rear surface of the second gear carrier portion. The outwardly extending support portion may be configured to support a rear bearing thereon. The outwardly extending support portion may comprise an opening therethrough that is configured to receive a sun gear that is meshed with the planet gear.

The power tool may further comprise a rotationally stationary ring gear that is configured to be meshed with the planet gear received in the gear carrier. Rotation of the sun gear may be configured to cause the planet gear to rotate about an axis of the support member and to orbit around the sun gear, which in turn causes the gear carrier to rotate at a slower rotational speed than the sun gear.

Another aspect of the present patent application provides a power tool. The power tool comprises a housing, a motor assembly disposed in the housing and including an electric motor powered by a battery that is coupleable to the housing, an output shaft at least partially received in and rotatable relative to the housing, and an impact assembly operatively coupled with the motor assembly and configured to be driven thereby. The impact assembly may comprise a hammer defining a hammer chamber therein for receiving a fluid therein and an inwardly protruding impact member, and an anvil defining an anvil chamber therein, the anvil at least partially disposed in the hammer chamber and configured to rotationally drive the output shaft. The hammer may be configured to be rotationally driven upon rotation of the motor assembly. The anvil may comprise a body portion configured to be rotatable relative to the hammer, and a reciprocating member configured to selectively move radially outwardly relative to the body portion to be impacted by the impact member of the hammer according to pressure of fluid in the anvil chamber so as to impart rotational movement to the body portion. The impact assembly may be configured to operate in an environment having an ambient temperature range between −30° C. and 50° C. without stall of the impact assembly.

Implementations of the foregoing aspects may include one or more of the following features. The impact assembly may be configured to operate with the fluid in a temperature range between −30° C. and 215° C. without stall of the impact assembly.

The motor assembly may comprise an electric motor. The electric motor may comprise a brushless DC motor. The motor may be powered by a battery having a nominal voltage in the range of approximately 18 Volts (V) to approximately 80V (e.g., approximately 20V) and having a power output in the range of approximately 400 Watts to approximately 600 Watts (e.g., approximately 435 Watts). The impact assembly may be configured to provide an output torque in the range of approximately 500 inch-lbs. to approximately 750 in-lbs. (e.g., approximately 500 inch-lbs. to approximately 550 inch-lbs). The power tool may have a weight of at most 2.5 pounds (e.g., approximately 2.2 pounds) without the battery. The power tool may have an overall length of at most 4.5 inches (e.g., approximately 4 inches). The hammer cylinder may have an outer diameter of approximately 40 mm to approximately 45 mm (e.g., approximately 42 mm), a length of approximately 45 mm to approximately 50 mm (e.g., approximately 47 mm) and an interior volume of approximately 6 $cm^3$ to approximately 10 $cm^3$ (e.g., approximately 8 $cm^3$). Each partially collapsible insert may have a volume of approximately 2 $cm^3$ to approximately 4 $cm^3$ (e.g., approximately 2.8 $cm^3$) and may be collapsible to a volume of approximately 1 $cm^3$ to approximately 3 $cm^3$ (e.g., approximately 1.8 $cm^3$). The collapsible inserts may fill approximately 33% to approximately 50% of the interior volume of the cylinder when uncollapsed, and may collapse to about 50% to approximately 75% of its uncollapsed volume to fill approximately 17% to approximately 30% of the interior volume of the cylinder, enabling heat expansion of the fluid in the cylinder and a greater of volume of fluid in the cylinder.

The impact assembly may further include an active valve configured to control the discharge of the fluid from the anvil chamber to the hammer chamber so as to dampen the radial inward movement of the reciprocating member to the body portion. The active valve may be configured to be variably open based on one or more physical characteristics of the fluid. The one or more physical characteristics of the fluid may include at least one of volume of the fluid, temperature of the fluid, pressure of the fluid and/or viscosity of the fluid.

The impact assembly may further include a foam insert disposed inside the hammer chamber and configured to reduce in volume upon an increase in temperature or pressure of the fluid in the hammer chamber.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

FIGS. 18A-18B show a reset position of the impact assembly after an impact, where inlet ports are closed in FIG. 18A and outlet ports are closed by the active valve in FIG. 18B, where some portions of the impact assembly are not shown in FIGS. 18A-18B to better illustrate other portions of the impact assembly;

FIGS. 19A-19B show a position of the impact assembly between the impacts, where inlet ports are partially open in FIG. 19A and outlet ports are still closed by the active valve in FIG. 19B, where some portions of the impact assembly are not shown in FIGS. 19A-19B to better illustrate other portions of the impact assembly;

FIGS. 20A-20B show another position of the impact assembly between the impacts, where inlet ports are open in FIG. 20A and outlet ports are still closed by the active valve and the reciprocating member(s) are being pushed radially outward from a body portion of the anvil in FIG. 20B, where some portions of the impact assembly are not shown in FIGS. 20A-20B to better illustrate other portions of the impact assembly;

FIGS. 21A-21B show a position of the impact assembly just prior to the next impact, where inlet ports are closed in FIG. 21A and outlet ports are still closed by the active valve and the reciprocating member(s) are in their radially outward positions in FIG. 21B, where some portions of the impact assembly are not shown in FIGS. 21A-21B to better illustrate other portions of the impact assembly;

FIGS. 22A-22B show a position of the impact assembly at the impact, where inlet ports are closed in FIG. 22A and outlet ports are open by the active valve FIG. 22B, where some portions of the impact assembly are not shown in FIGS. 22A-22B to better illustrate other portions of the impact assembly;

FIGS. 23A-23B show a position of the impact assembly immediately after the impact, where inlet ports are closed in FIG. 23A and outlet ports are open by the active valve and the reciprocating member(s) are being pushed radially inwardly towards the body portion of the anvil in FIG. 23B, where some portions of the impact assembly are not shown in FIGS. 23A-23B to better illustrate other portions of the impact assembly;

FIGS. 27-28 show cooling vanes on the front hammer cylinder of the impact assembly;

FIG. 30 shows helical cooling vanes on the front hammer cylinder of the impact assembly, while FIG. 31 shows straight cooling vanes on the front hammer cylinder of the impact assembly;

FIGS. 33A-33C show rear perspective views and a cross-sectional view of the foam member in the front hammer cylinder of the impact assembly according to an embodiment of the present patent application, while

FIG. 38A shows a perspective view of an adjustment screw and FIG. 37B shows a cross-section view of the impact assembly with the planet carrier assembly, the anvil, the front hammer cylinder and the adjustment screw according to an embodiment of the present patent application, where some portions of the impact assembly are not shown in FIG. 38B to better illustrate other portions of the impact assembly;

FIG. 44 shows a position of the impact assembly between the impacts, where outlet ports/orifices are still closed by the active valve in FIG. 44, wherein some portions of the impact assembly are not shown in FIG. 44 to better illustrate other portions of the impact assembly;

DETAILED DESCRIPTION

Figure 1:
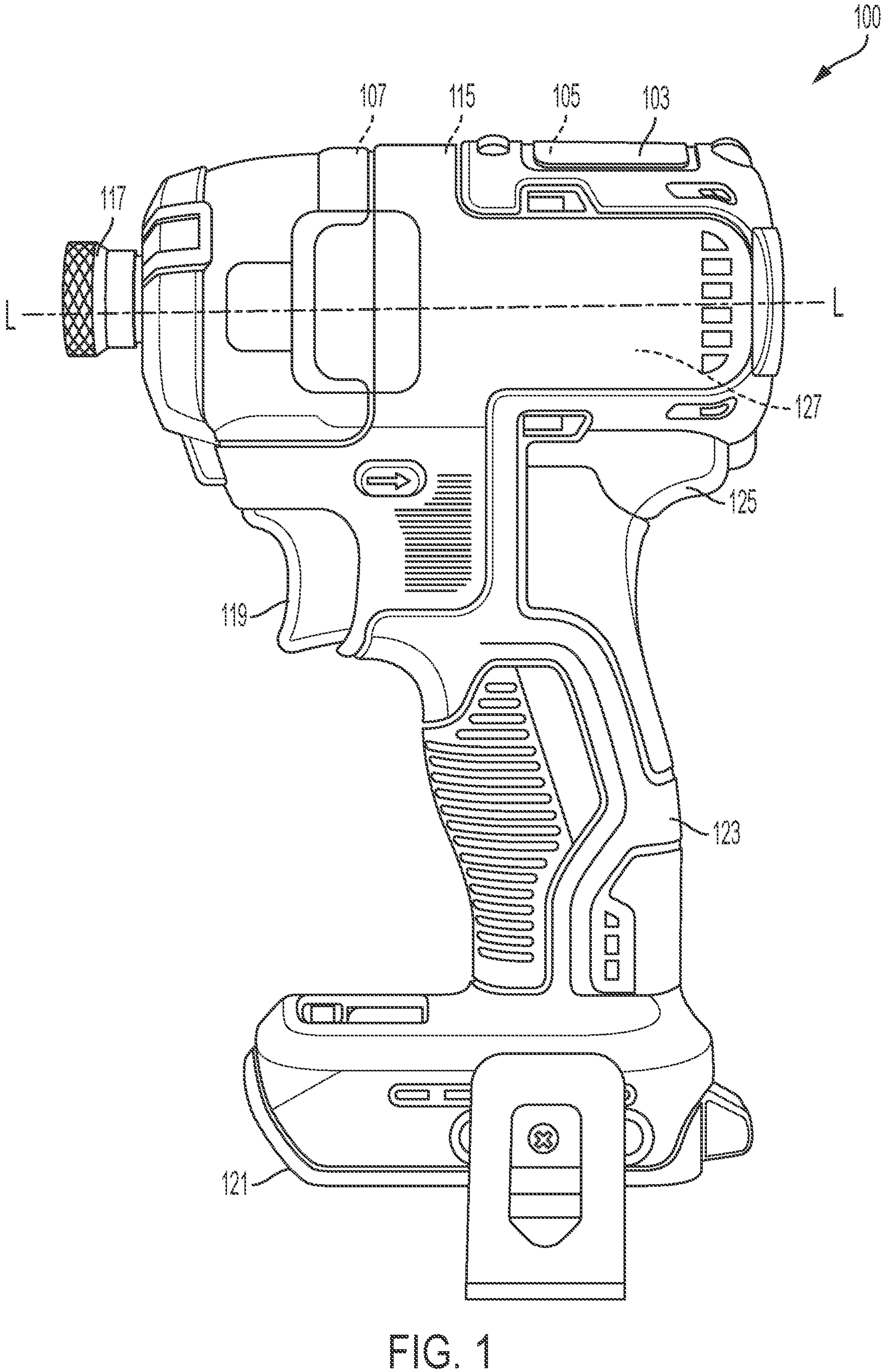
FIG. 1 shows an exemplary power tool according to an embodiment of the present patent application.

In one embodiment, referring to FIGS. 1-7, the present patent application provides a power tool 100. The power tool 100 comprises a housing 103, a motor assembly 105 disposed in the housing 103, an output shaft 109, and an impact assembly 107. The output shaft 109 is at least partially received in the housing 103 and is rotatable relative to the housing 103. The impact assembly 107 is operatively coupled with the motor assembly 105 and is configured to be driven by the motor assembly 105. The impact assembly 107 comprises a hammer 102 defining a hammer chamber 111 therein for receiving a fluid therein and an inwardly protruding impact member 114. The hammer 102 is configured to be rotationally driven upon rotation of the motor assembly 105. The impact assembly 107 also comprises an anvil 122 at least partially disposed in the hammer chamber 111 and is configured to rotationally drive the output shaft 109. The anvil 122 defines an anvil chamber 203 therein. The anvil 122 comprises a body portion 113 configured to be rotatable relative to the hammer 102, and a reciprocating member 116 configured to selectively move radially outwardly relative to the body portion 113 to be impacted by the impact member 114 of the hammer 102 according to pressure of fluid in the anvil chamber 203 so that the hammer 102 imparts rotational movement to the body portion 113.

In one embodiment, as shown in and described with respect to FIGS. 13 and 15-17, the power tool 100 comprises an active valve 201 configured to control the discharge of the fluid from the anvil chamber 203 to the hammer chamber 111 so as to dampen the radial inward movement of the reciprocating member 116 to the body portion 113. The active valve 201 is configured to be variably open based on one or more physical characteristics of the fluid that vary in accordance with a physical characteristic of the fluid, e.g., at least one of a volume, temperature, pressure, or viscosity of the fluid.

FIG. 1 shows an exemplary power tool 100 constructed in accordance with the teachings of the present patent application. As those skilled in the art will appreciate, embodiments may include either a corded or cordless (battery operated) power tool/device. In illustrated embodiment of FIG. 1, the power tool 100 is a power (cordless) impact driver/tool. The power tool 100 may be a portable device.

In one embodiment, the power tool 100 generally includes the housing 103, the motor/motor assembly 105, a transmission assembly 115, the output shaft/output spindle assembly 109, a tool holder/chuck 117, the input switch/trigger assembly 119 and a battery pack 121. The output spindle 109 may be interchangeably referred to as output spindle assembly, output shaft or output member. Those skilled in the art will understand that several of the components of the power tool 100, such as the tool holder 117, the trigger assembly 119 and the battery pack 121, are conventional in nature and therefore need not be discussed in significant detail in the present patent application. Reference may be made to a variety of patents/patent publications for a more complete understanding of the conventional features of the power tool 100. One example of such patents is U.S. Pat. No. 5,897,454 issued Apr. 27, 1999, which is hereby incorporated by reference in the present patent application in its entirety.

Referring to FIG. 1, the housing 103 includes a pair of mating handle shells that cooperate to define a handle portion 123 and a drive train or body portion 125. The body portion 125 may include a motor receiving portion, a transmission receiving portion, and an impact assembly receiving portion. In one embodiment, the housing 103 is configured to be coupled to an electrical power source. The electrical power source may include the battery pack 121 or an AC power source.

Figure 2:
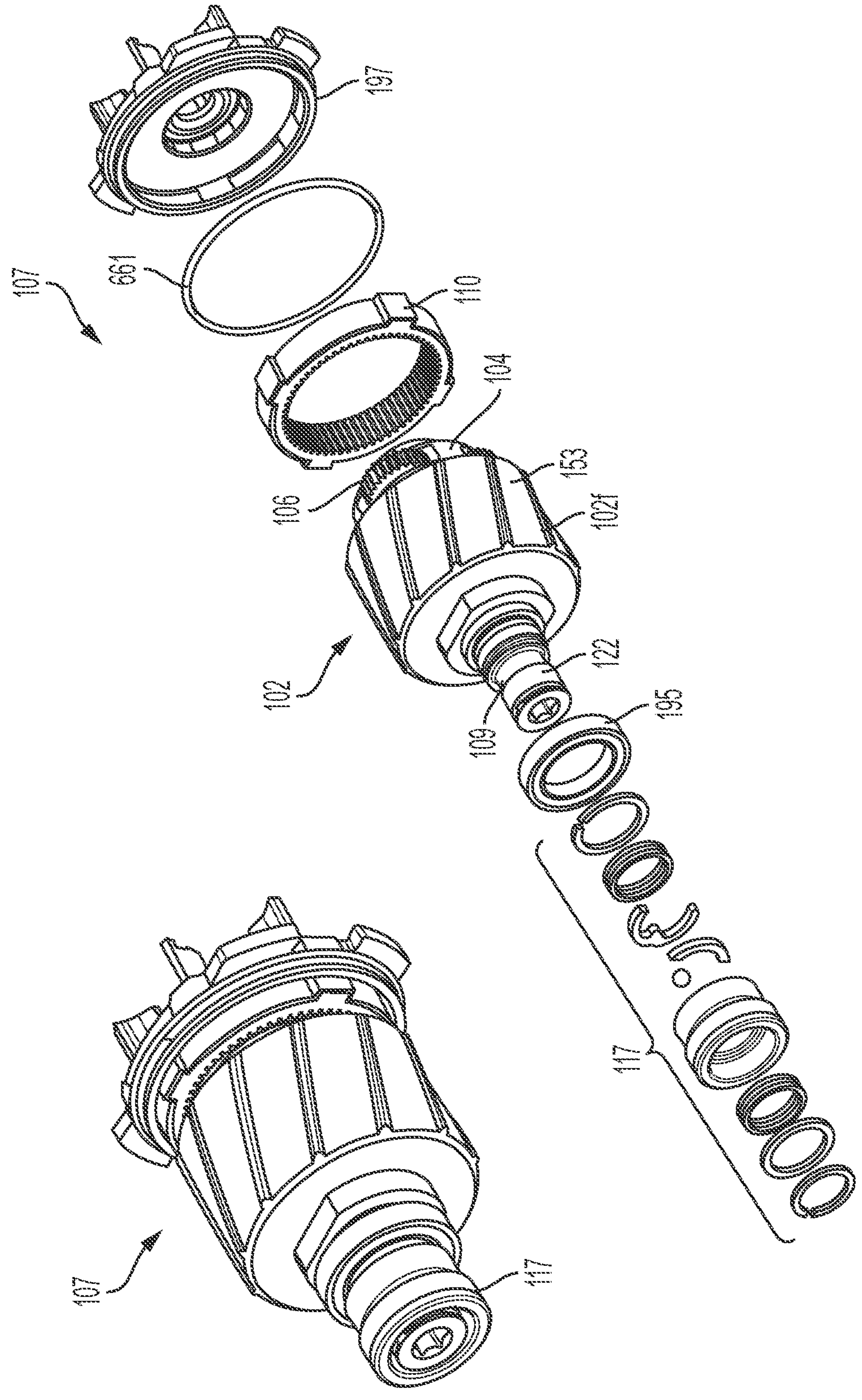
FIG. 2 shows assembled and exploded views of an impact assembly, which is configured to be driven by the motor assembly, a bit holder assembly, and some portions of the transmission assembly of the power tool according to an embodiment of the present patent application.

In one embodiment, the output spindle 109 is proximate a front end of the housing 103 and is coupled/connected to the tool holder 117 for holding a power tool accessory, e.g., a tool bit. The output spindle 109 is configured to rotationally drive the tool holder 117 that is configured to receive the tool bit portion therein. The power tool accessory may include a tool bit such as a driver bit. The tool holder 117 may be a keyless chuck, although it should be understood that the tool holder can have other tool holder configurations such as a quick release tool holder, a hex tool holder, or a keyed tool holder/chuck. The tool holder 117 may be interchangeably referred to as an end effector, a chuck, etc. In one embodiment, the end effector 117 is coupled to the housing 103 and is configured to perform an operation on a workpiece (not shown). An exploded view of the bit holder assembly 117 is shown in FIG. 2, those skilled in the art will understand that several of the components of the bit holder assembly 117 are conventional in nature and therefore need not be discussed in significant detail in the present patent application.

In one embodiment, the input switch/trigger assembly 119 and the battery pack 121 are mechanically coupled to the handle portion 123 and are electrically coupled to the motor assembly 105 in a conventional manner that is not specifically shown but which is readily the capabilities of one having an ordinary level of skill in the art. The power tool 100 may include other sources of power (e.g., alternating current (AC) power cord or compressed air source) coupled to a distal end of the handle portion 123.

The trigger assembly 119 may be a variable speed trigger. The trigger assembly 119 may be interchangeably referred to as an input switch. In one embodiment, the input switch 119 is configured for actuating the motor 105. The trigger assembly 119 is configured to be coupled to the housing 103 for selectively actuating and controlling the speed of the motor 105, for example, by controlling a pulse width modulation (PWM) signal delivered to the motor 105.

The motor 105 is disposed in the housing 103 and is configured to drive the impact assembly 107. The motor 105 may be a brushless or electronically commutated motor, although the motor 105 may be another type of motor such as a brushed DC motor, an AC motor, a universal motor, or a compressed air motor.

The motor assembly 105 is housed in the motor receiving portion and includes a rotatable output motor shaft, which extends into the transmission receiving portion. In one embodiment, a motor pinion having a plurality of gear teeth is coupled for rotation with the rotatable output motor shaft. The trigger assembly 119 and the battery pack 121 cooperate to selectively provide the electric power to the motor assembly 105 so as to permit the user of the power tool 100 to control the speed and direction with which the rotatable output motor shaft rotates. The motor assembly 105 may interchangeably be referred to as motor 105. In one embodiment, the motor output shaft extends from the motor 105 to the transmission 115 that transmits power from the motor output shaft to the impact assembly 107.

The power tool 100 also includes a motor fan 199 attached to the armature. The fan rotates along with the armature to cool the motor stator, armature, and commutator. The fan generally includes a plurality of fan blades that dispel air centrifugally, thus generating air flow through the stator, armature, and the commutator. The power tool 100 also includes an end cap 207 at a rear axial portion of the housing 103.

The power tool 100 may include a controller 127. The controller may be interchangeably referred to as a control circuit. The controller 127 is disposed in the housing 103 and is operatively cooperable with the motor 105. The controller 127 may be operatively coupled to other components of the power tool 100 (e.g., including sensors, and/or memory) so as to control the operation of the power tool. In one embodiment, the controller 127 is referred to as a microcontroller. In another embodiment, the controller 127 is referred to, be part of, or includes an electronic circuit, an Application Specific Integrated Circuit (ASIC), a processor (shared, dedicated, or group) and/or memory (shared, dedicated, or group) that execute one or more software or firmware programs, a combinational logic circuit, and/or other suitable components that provide the described functionality.

In one embodiment, the transmission assembly 115 comprises a multi-speed transmission having a plurality of gears and settings that allow the speed reduction through the transmission 115 to be changed, in a manner well understood to one of ordinary skill in the art.

The transmission assembly 115 may comprise a multi-stage planetary gear set, with each stage having an input sun gear, a plurality of planet gears meshed with the sun gears and pinned to a rotatable planet carrier, and a ring gear meshed with and surrounding the planet gears. For each stage, if a ring gear is rotationally fixed relative to the housing, the planet gears 106 orbit the sun gear when the sun gear rotates, transferring power at a reduced speed to their planet carrier, thus causing a speed reduction through that stage. If a ring gear is allowed to rotate relative to the housing 103, then the sun gear causes the planet carrier to rotate at the same speed as the sun gear, causing no speed reduction through that stage. By varying which one or ones of the stages have the ring gears are fixed against rotation, one can control the total amount of speed reduction through the transmission 115, and thus adjust the speed setting of the transmission 115 (e.g., among high, medium, and low). In one embodiment, this adjustment of the speed setting is achieved via a shift ring that surrounds the ring gears and that is shiftable along the axis of the output spindle 109 to lock different stages of the ring gears against rotation. In one embodiment, the power tool 100 includes a speed selector switch for selecting the speed reduction setting of the transmission 115. In one embodiment, the speed selector switch is coupled to the shift ring by spring biased pins so that axial movement of the speed selector switch causes the axial movement of the shift ring. Further details regarding an exemplary multi-speed transmission is described in U.S. Pat. No. 7,452,304, which is incorporated by reference in its entirety in the present patent application. It should be understood that other types of multi-speed transmissions and other mechanisms for shifting the transmission among the speeds is within the scope of the present patent application.

The transmission 115 drivingly couples the motor assembly 105 to the hammer 102 of the impact assembly 107. The transmission 115 includes an input gear and an output gear 215. The output gear 215 comprises at least one planet gear 106. The transmission assembly 115 comprise a single-stage planetary gear set having an input sun gear/motor pinion 151, a plurality of planet gears 106 meshed with the sun gear 151 and pinned (e.g., pins 112) to a rotatable planet carrier 104. The transmission 115 also includes a stationary ring gear 110 (e.g., connected to the housing 103) that meshes with and surrounds the planet gears 106.

The impact assembly 107 is operatively coupled with the motor assembly 105 and is configured to be driven by the motor assembly 105. For example, the transmission 115, positioned between the motor assembly 105 and the impact assembly 107, drivingly couples the motor assembly 105 to the hammer 102 of the impact assembly 107.

The hammer 102 is configured to be rotationally driven upon rotation of the motor assembly 105. The hammer 102 of the impact assembly 107 is arranged to rotate with the transmission 115. That is, the hammer 102 of the impact assembly 107 is coupled for co-rotation with the output (e.g., output gear including the planet gears 106) of the transmission 115. The hammer 102 of the impact assembly 107 is rotatable about the longitudinal axis L-L coaxial with the output (e.g., output gear including the planet gears 106) of the transmission 115.

Figure 5:
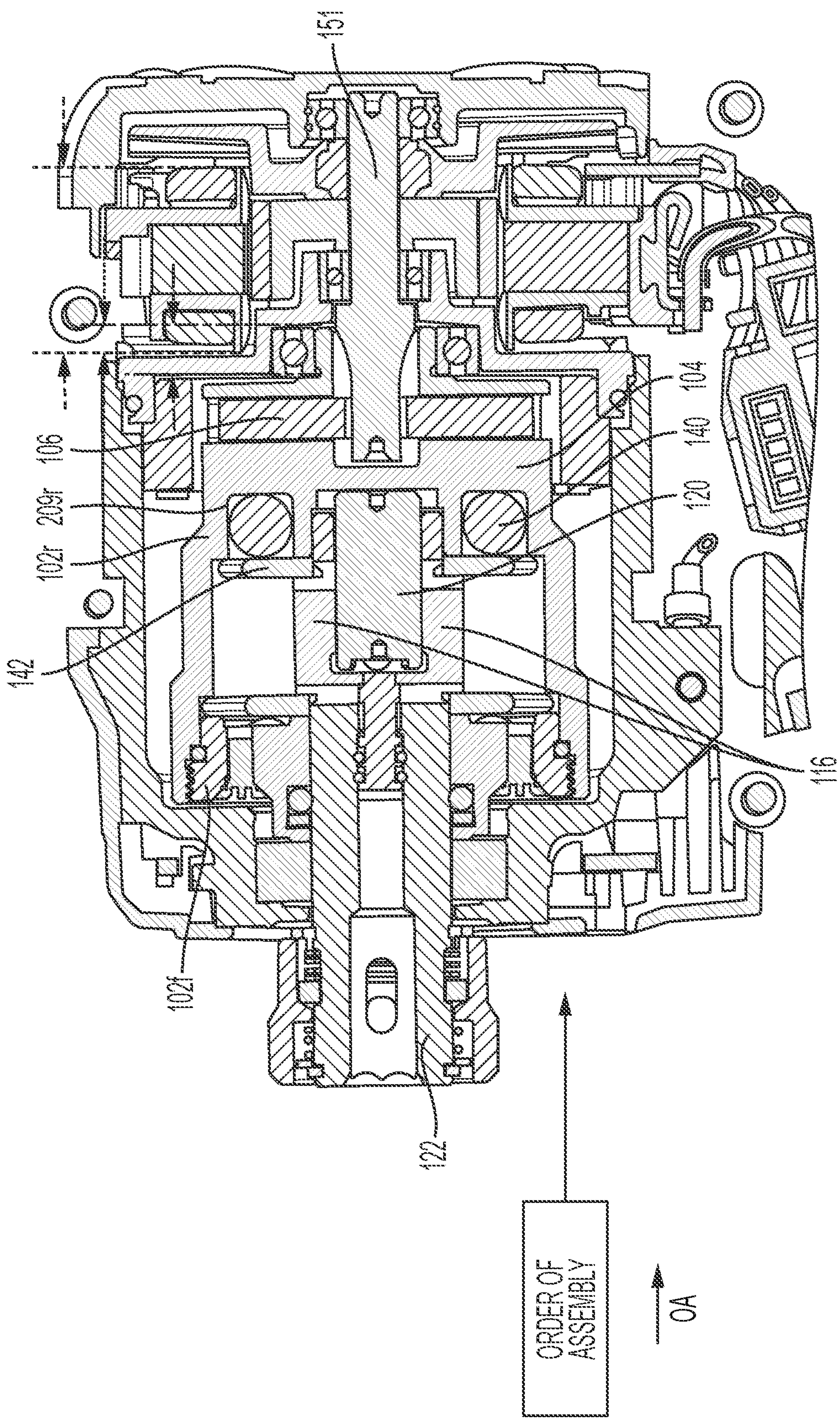
Figure 7:
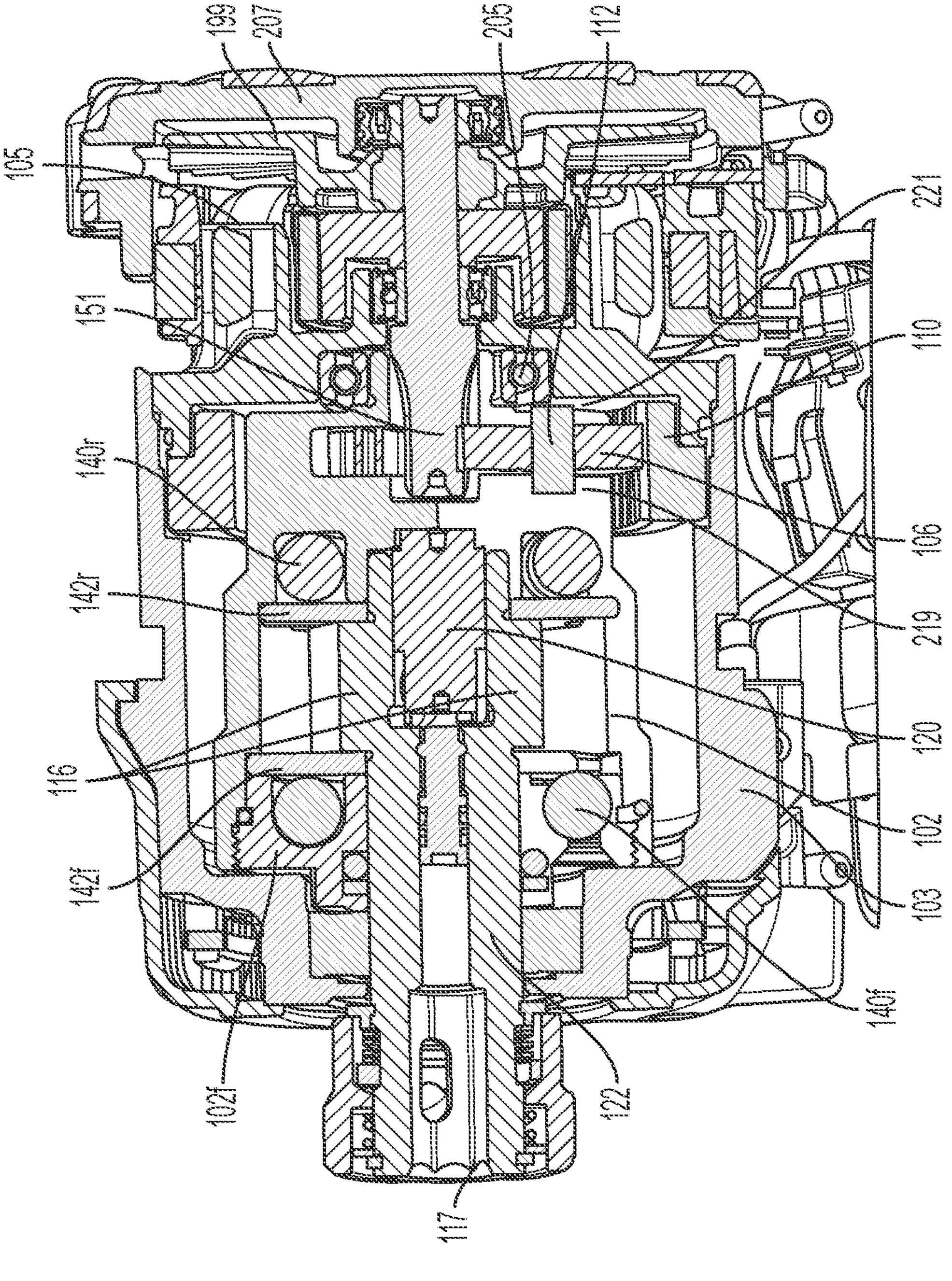

The hammer 102 may be generally cylindrical in shape. The hammer 102 is rotationally driven by a planet gear carrier 104. The planet gear carrier 104 serves as the output from a planetary gear transmission 115 that is driven in rotation by the electric motor 105. The planet gear carrier 104 carries the plurality of planet gears 106. A rotationally stationary ring gear 110 meshed with the planet gears 106 is received over the planet gear carrier 104 rearward of the hammer 102. The stationary ring gear 110 is connected to the housing 103 using a ring gear mount 197. Like any planetary gear transmission, rotation of the sun gear/motor pinion 151 (as shown in FIGS. 5 and 7) on the motor output shaft causes the planet gears 106 to rotate and orbit around the sun gear 151, in turn causing the planet gear carrier 104 to rotate at a slower rotational speed than the motor output shaft. In one embodiment, the planet gear carrier 104 is integrally formed with the rear hammer cylinder **102*r*. In another embodiment, the planet gear carrier 104 is separately formed and non-rotationally connected to the rear hammer cylinder 102*r***.

The hammer 102 may be interchangeably referred to as hammer cylinder. The hammer 102 includes a front hammer cylinder **102*f* and a rear hammer cylinder 102*r*. The front hammer cylinder 102*f* and the rear hammer cylinder 102*r* together define the hammer chamber 111 for receiving the fluid therein. The hammer 102** is filled with a viscous fluid such as oil.

Figure 3:
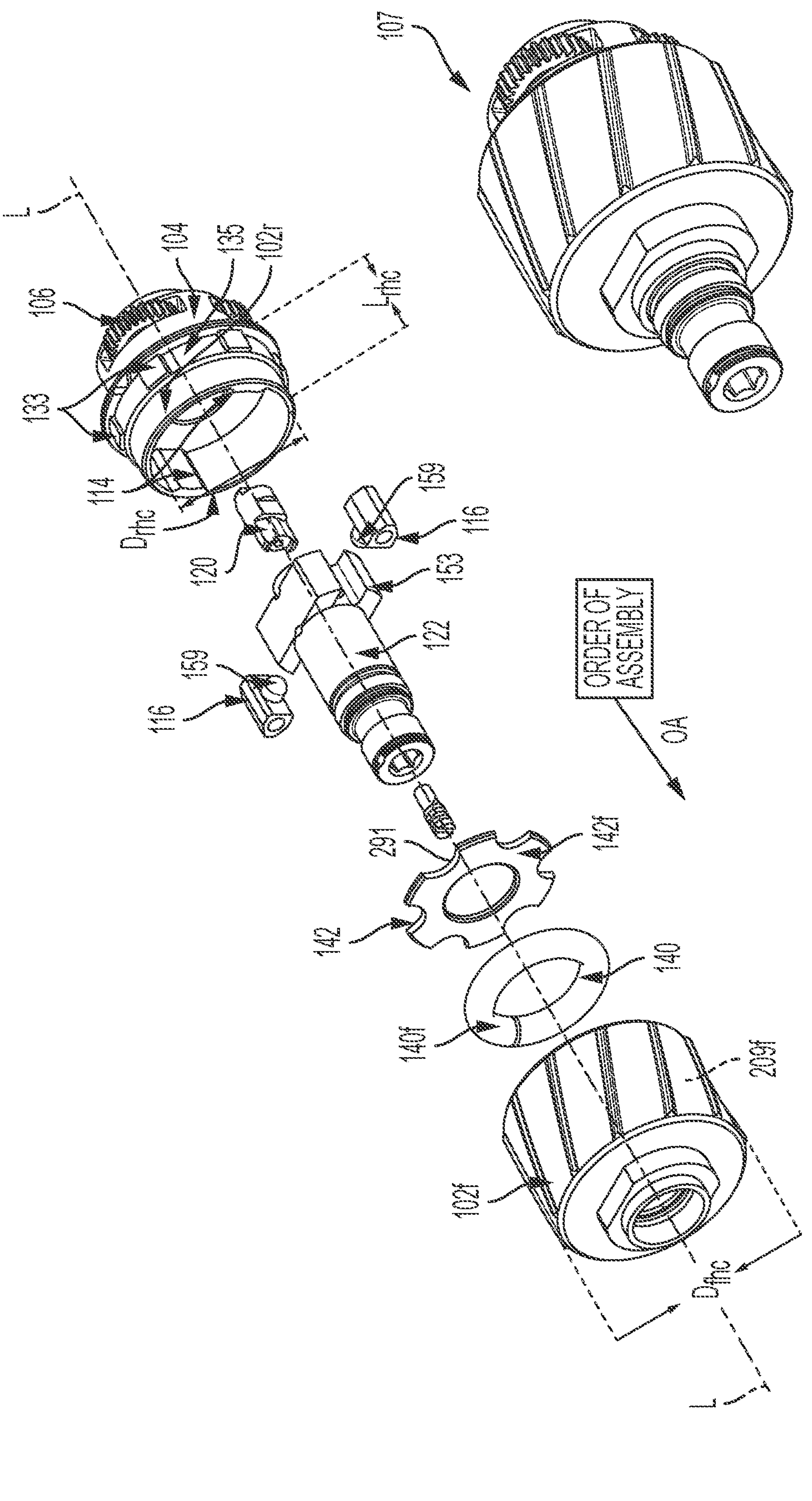
FIG. 3 shows another assembled and exploded views of the impact assembly, the bit holder assembly and some portions of the transmission assembly of the power tool according to an embodiment of the present patent application.

The front hammer cylinder **102*f* has a diameter, $D_{fhc}$ and the rear hammer cylinder 102*r* has a diameter, $D_{rhc}$. In one embodiment, as shown in FIG. 3, the diameter, $D_{fhc}$ of the front hammer cylinder 102*f* is greater than the diameter, $D_{rhc}$ of the rear hammer cylinder 102*r*. In another embodiment, as shown in FIGS. 4-7, the diameter, $D_{fhc}$ of the front hammer cylinder 102*f* is less than diameter, $D_{rhc}$ of the rear hammer cylinder 102*r***.

Figure 29:
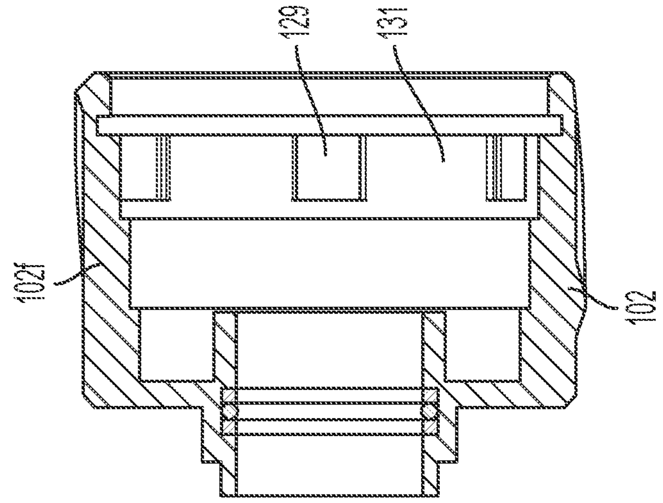
FIGS. 27-29 show a front perspective, a rear perspective view and a cross-sectional view of the front hammer cylinder of the impact assembly according to an embodiment of the present patent application, where
Figure 28:
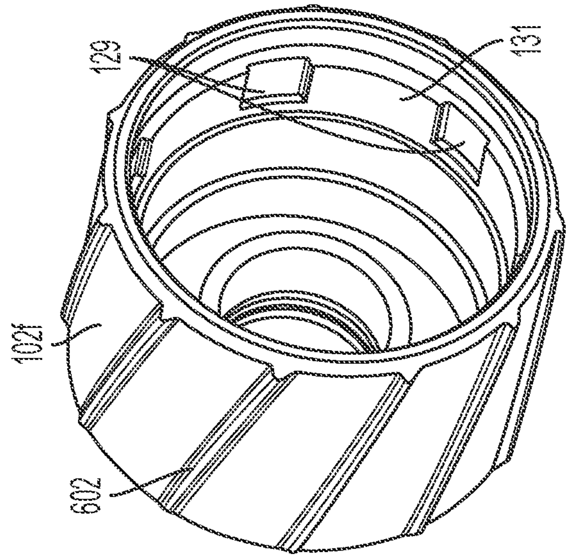
Figure 27:
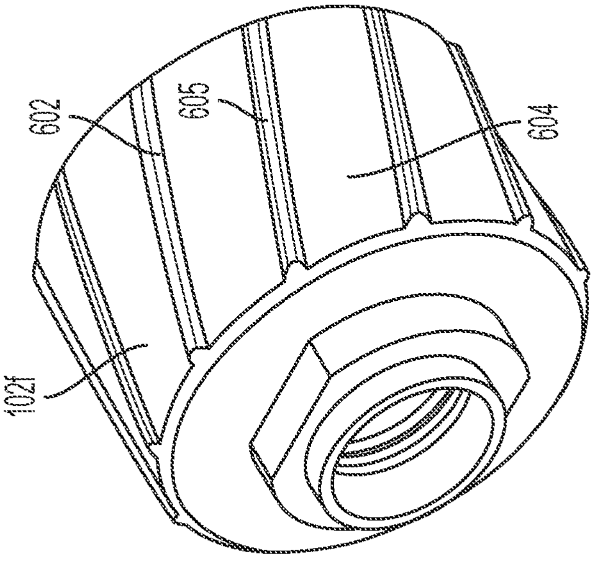
Figure 31:
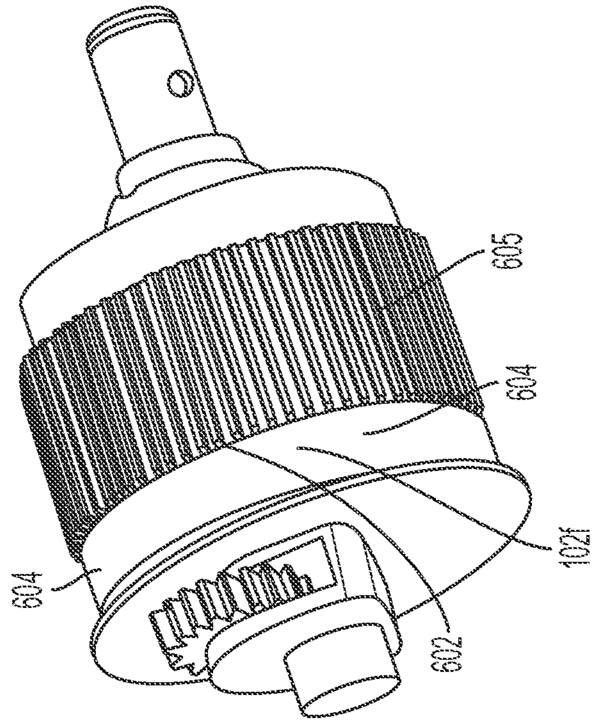
FIGS. 30-31 show perspective views of the front hammer cylinder of the impact assembly according to embodiments of the present patent application, where
Figure 30:
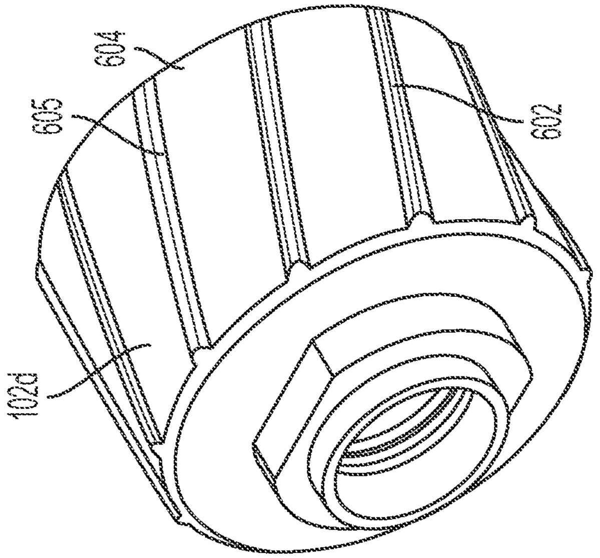

As shown in FIGS. 28 and 29, the front hammer cylinder **102*f* may include one or more recesses 129 on an inner surface 131 thereof. As shown in FIG. 3, the rear hammer cylinder 102*r* includes one or more protrusion members 133 on an outer surface 135 thereof. The one or more recesses 129 of the front hammer cylinder 102*f* are configured to receive the one or more protrusion members 133 of the rear hammer cylinder 102*r* to connect the front hammer cylinder 102*f* and the rear hammer cylinder 102*r* together and to define the hammer chamber 111** for receiving the fluid therein.

In another embodiment, the rear hammer cylinder **102*r* may include one or more recesses that are configured to receive one or more protrusion members of the front hammer cylinder 102*f* to connect the front hammer cylinder 102*f* and the rear hammer cylinder 102*r* together and to define the hammer chamber 111** for receiving the fluid therein.

Figure 4:
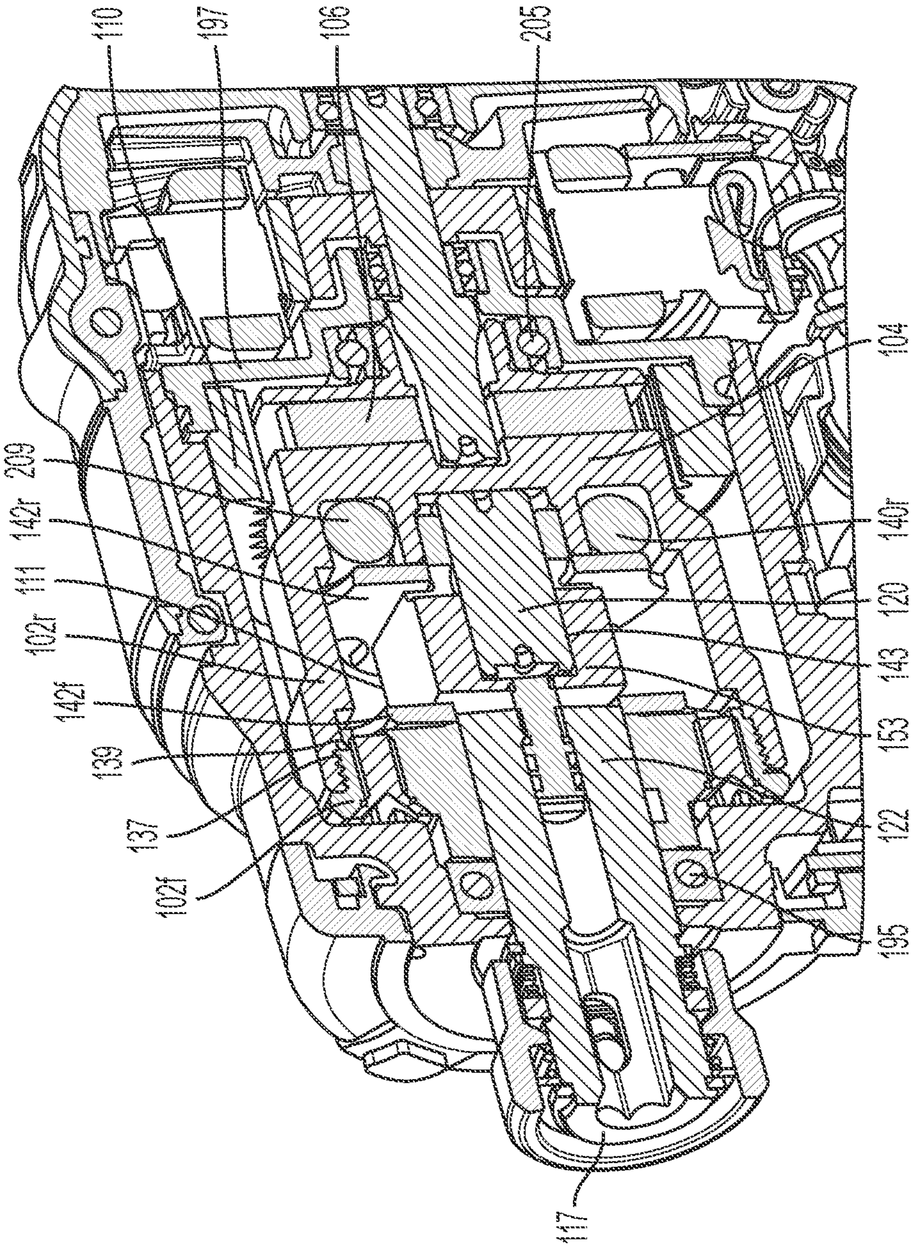
FIGS. 4-8 show cross-sectional views of the impact assembly, the bit holder assembly, the motor assembly and the transmission assembly of the power tool according to embodiments of the present patent application.

In yet another embodiment, the front hammer cylinder **102*f* and the rear hammer cylinder 102*r* may have other types of interengaging connectors that are configured to connect the front hammer cylinder 102*f* and the rear hammer cylinder 102*r* together. For example, as shown in FIG. 4, the front hammer cylinder 102*f* may have threaded portions 137 on an outer surface that are configured to engage with complementary threaded portions 139 on an inner surface of the rear hammer cylinder 102*r* to connect the front hammer cylinder 102*f* and the rear hammer cylinder 102*r* together. FIG. 5 shows a slightly differently threaded/interengaging connection (compared to FIG. 4) between the front hammer cylinder 102*f* and the rear hammer cylinder 102*r***.

Also, in another embodiment, the front hammer cylinder **102*f* may have threaded portions on an inner surface that are configured to engage with complementary threaded portions on an outer surface of the rear hammer cylinder 102*r* to connect the front hammer cylinder 102*f* and the rear hammer cylinder 102*r*** together.

The front hammer cylinder **102*f* has a length dimension, $L_{fhc}$ along the longitudinal axis L-L and the rear hammer cylinder 102*r* has a length dimension, $L_{rhc}$ along the longitudinal axis L-L. The length dimension, $L_{rhc}$ of the rear hammer cylinder 102*r* does not include the length of the planet carrier 104. In one embodiment, as shown in FIG. 3, the length dimension, $L_{fhc}$ of the front hammer cylinder 102*f* is greater than the length dimension, $L_{rhc}$ of the rear hammer cylinder 102*r*. In such embodiment, where the length dimension, $L_{rhc}$ of the rear hammer cylinder 102*r* is less than the length dimension, $L_{fhc}$ of the front hammer cylinder 102*f*, the rear hammer cylinder 102*r* may interchangeably referred to as the rear hammer cylinder cap. The rear hammer cylinder cap 102*r* may be threadably attached to the front hammer cylinder 102*f* In one embodiment, the length of the rear hammer cylinder 102*r* is long enough to at least include some interengaging connector portions on the rear hammer cylinder 102*r*. In another embodiment, the length of the rear hammer cylinder 102*r* is long enough to at least include some interengaging connector portions on the rear hammer cylinder 102***r* and the cavity therein. As will be described in detail in the discussions below, the cavity is configured to receive a foam member and its associated foam member containment disk/member in the cavity.

Figure 6:
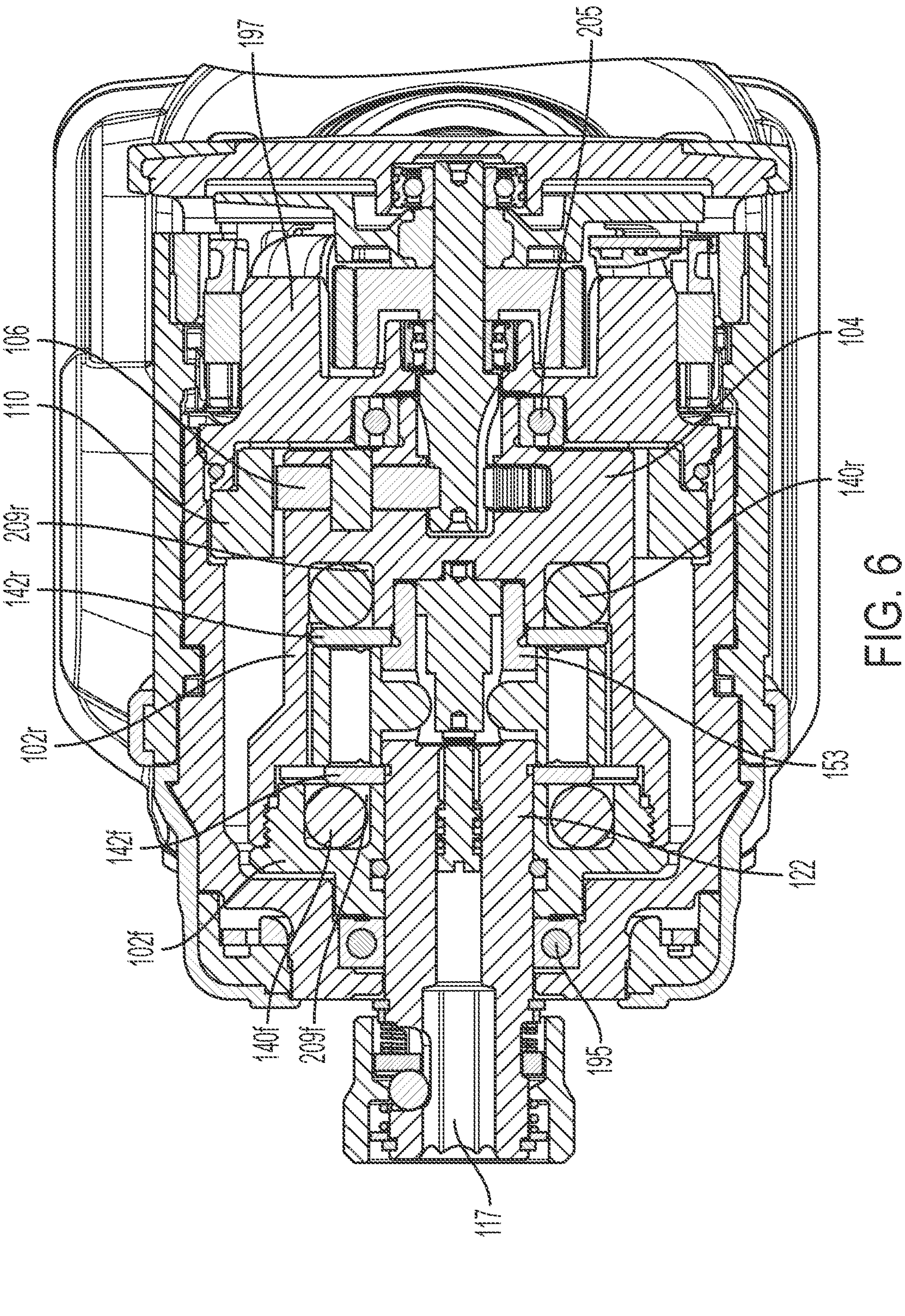

In another embodiment, as shown in FIGS. 4-7, the length dimension, $L_{fhc}$ of the front hammer cylinder 102*f* is less than the length dimension, $L_{rhc}$ of the rear hammer cylinder 102*r*. In such embodiment, where the length dimension, $L_{fhc}$ of the front hammer cylinder 102*f* is less than the length dimension, $L_{rhc}$ of the rear hammer cylinder 102*r*, the front hammer cylinder 102*f* may interchangeably referred to as the front hammer cylinder cap. The front hammer cylinder cap 102*f* may be threadably attached to the rear hammer cylinder 102*r*. In one embodiment, as shown in FIGS. 4 and 5, the length of the front hammer cylinder 102*f* is long enough to at least include some interengaging connector portions on the front hammer cylinder 102*f*. In another embodiment, as shown in FIGS. 6 and 7, the length of the front hammer cylinder 102*f* is long enough to at least include some interengaging connector portions on the front hammer cylinder 102*f* and the cavity therein. As will be described in detail in the discussions below, the cavity is configured to receive a foam member and its associated foam member containment disk/member in the cavity.

The front hammer cylinder 102*f* and the rear hammer cylinder 102*r* may each be made from a heat conductive material. The front hammer cylinder 102*f* has a central opening 141 that is configured to receive a portion of the anvil 122 therethrough.

The hammer 102 includes inwardly protruding impact member 114. FIG. 3 shows two inwardly protruding impact members 114 that are protruding radially inwardly from an inner surface of the rear hammer cylinder 102*r*. The two inwardly protruding impact members 114 in FIG. 3 are spaced apart from each other by 180 degrees. In another embodiment, three inwardly protruding impact members may be spaced apart from each other by 120 degrees. The number of the inwardly protruding impact members 114 may vary. The positioning of the inwardly protruding impact members 114 on the hammer 102 depends on the number of the inwardly protruding impact members 114. The two inwardly protruding impact members 114 in FIG. 3 are also positioned on opposite sides of the longitudinal axis L-L. In one embodiment, when the length dimension, $L_{fhc}$ of the front hammer cylinder 102*f* is greater than the length dimension, $L_{rhc}$ of the rear hammer cylinder 102*r*, the two inwardly protruding impact members 114 protrude radially inwardly from an inner surface of the front hammer cylinder 102*f*.

The power tool 100 includes a front bearing 195 positioned between a front end of the hammer 102 (i.e., a front hammer cylinder 102*f*) and the housing 103. The output shaft 109 has a generally solid cylindrical shape extending in the front-rear direction. The output shaft 109 is supported by the front bearing 195 so as to be rotatable about a rotation axis. Specifically, a front end portion of the output shaft 109 is supported by the front bearing 195.

The power tool 100 includes a rear bearing 205 positioned between a rear end of the hammer 102 (i.e., a rear hammer cylinder 102*r* with a planet carrier 104) and the housing 103. The rear bearing 205 is configured to function as the carrier bearing.

In one embodiment, referring to FIGS. 27-28 and 30-31, the impact driver 100 includes a cooling vane arrangement 600. The cooling vane arrangement 600 includes cooling vanes 602 that are provided on an exterior surface 604 of the hammer cylinder 102. The cooling vanes 602 are provided on the exterior surface 604 of the front hammer cylinder 102*f*. The cooling vanes 602 are provided on an exterior surface of the rear hammer cylinder 102*r*.

The cooling vanes 602 may be provided on an exterior surface of the front hammer cylinder 102*f* when the length dimension, $L_{fhc}$ of the front hammer cylinder 102*f* is greater than the length dimension, $L_{rhc}$ of the rear hammer cylinder 102*r*. The cooling vanes 602 may be provided on an exterior surface of the rear hammer cylinder 102*r* when the length dimension, $L_{fhc}$ of the front hammer cylinder 102*f* is less than the length dimension, $L_{rhc}$ of the rear hammer cylinder 102*r*.

The cooling vanes 602 may be connected in thermally conductive manner to the hammer cylinder 102. The cooling vanes 602 are constructed and arranged such that they are exposed to and come into direct contact with an ambient/fresh air that enters the power tool housing, having the impact assembly 107, through openings in the power tool housing 103. The cooling vanes 602 are constructed and arranged such that they are exposed to and come into direct contact with an ambient/fresh air that is provided by the motor fan 199. The cooling vanes 602 may protrude outwardly away from the exterior surface 604 of the hammer cylinder 102 so as to come into direct contact with the ambient air. The heat absorbed by the hammer cylinder 102 is dissipated directly into the ambient air via the cooling vanes 602. The cooling vanes 602 may be configured to radiate heat that is collected from the hammer cylinder 102. The material of the hammer cylinder 102 may also be made from a material that conducts heat exceptionally well.

In one embodiment, the exterior surface 604 of the hammer cylinder 102 includes a plurality of spiral cooling vanes 605 that act like a fan to enhance airflow and cooling of the impact assembly 107 as the hammer cylinder 102 rotates.

In another embodiment, the exterior surface 604 of the hammer cylinder 102 includes a plurality of straight cooling vanes 607. The cooling vanes 607 may be disposed parallel to each other. The cooling vanes 607 may be arranged vertically (i.e., along a longitudinal axis of the power tool and/or the hammer cylinder 102). The cooling vanes 607 may be arranged or aligned parallel to the direction of the flow of the ambient/fresh air.

Figure 11B:
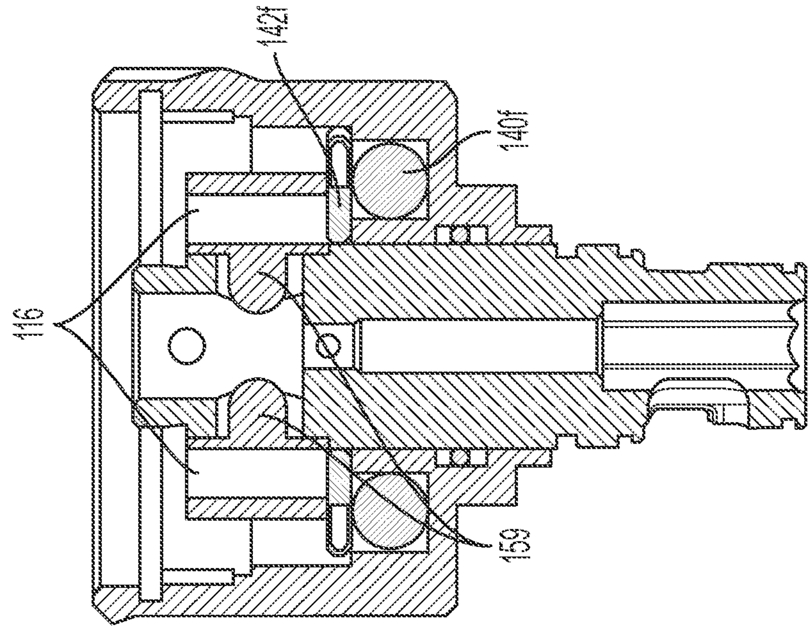
FIG. 11A shows a perspective view of a reciprocating member of the impact assembly and FIG. 11B shows a cross-section view of the impact assembly with anvil and the reciprocating member(s) according to an embodiment of the present patent application, where some portions of the impact assembly are not shown in FIG. 11B to better illustrate other portions of the impact assembly.
Figure 11A:
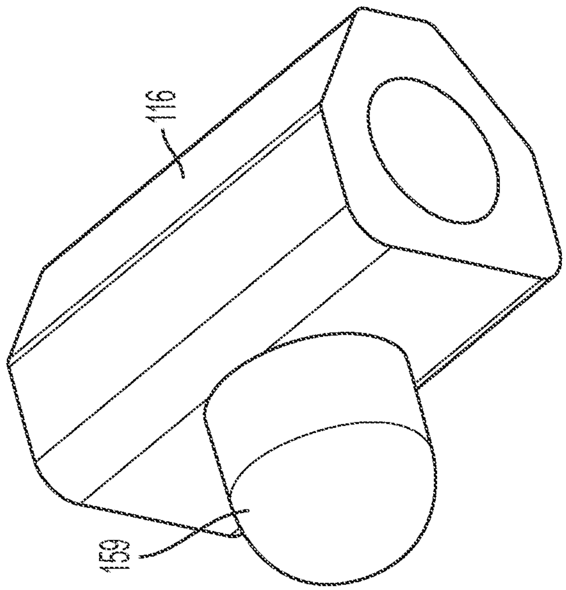

The impact assembly 107 includes the pair of blades or reciprocating members 116. One of the blades/reciprocating members 116 is shown in FIG. 11A. FIG. 11B show a cross-sectional view of the impact assembly 107 with the blades/reciprocating members 116 therein. The blades/reciprocating members 116 are received in radial holes 157 in a blade holder portion 153 of the anvil 122. The radial holes 157 are in fluid communication with the anvil chamber 203. The blades/reciprocating members 116 are moveable radially in the radial holes 157 to selectively and at least partially protrude from the anvil 122 and abut the interior surface of the hammer 102 under certain conditions. A pair of ball bearings 187 (FIGS. 20A-23B) are positioned between a cam shaft 120 and the respective blades 116. As will be clear from the discussions in detail below, during the rotation of the cam shaft 120 and the hammer 102, the blades/reciprocating members 116 are configured to be selectively or periodically impacted by the impact members/lugs 114 on the hammer 102 under certain conditions to deliver a rotational impact to the anvil 122.

In another embodiment, instead of the ball bearings 187 (FIGS. 20A-23B), each blades/reciprocating member 116 includes integrally formed pins 159 that are configured to be received in the radial holes 157 in the blade holder portion 153 of the anvil 122 as shown in FIGS. 3 and 11A-11B.

Figure 36B:
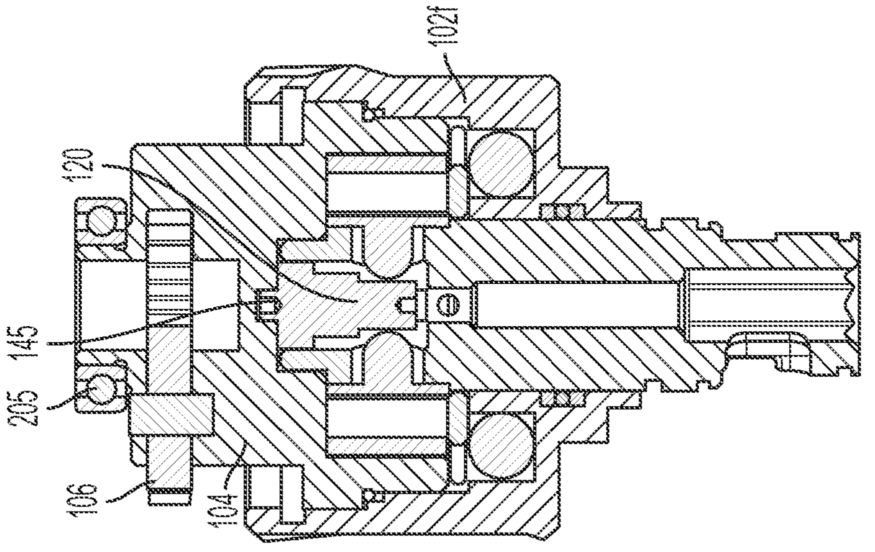
FIG. 36A shows an exploded perspective view of a planet carrier assembly and FIG. 36B shows a cross-section view of the impact assembly with the planet carrier assembly and the cam shaft/member according to an embodiment of the present patent application, where some portions of the impact assembly are not shown in FIG. 36B to better illustrate other portions of the impact assembly.
Figure 36A:
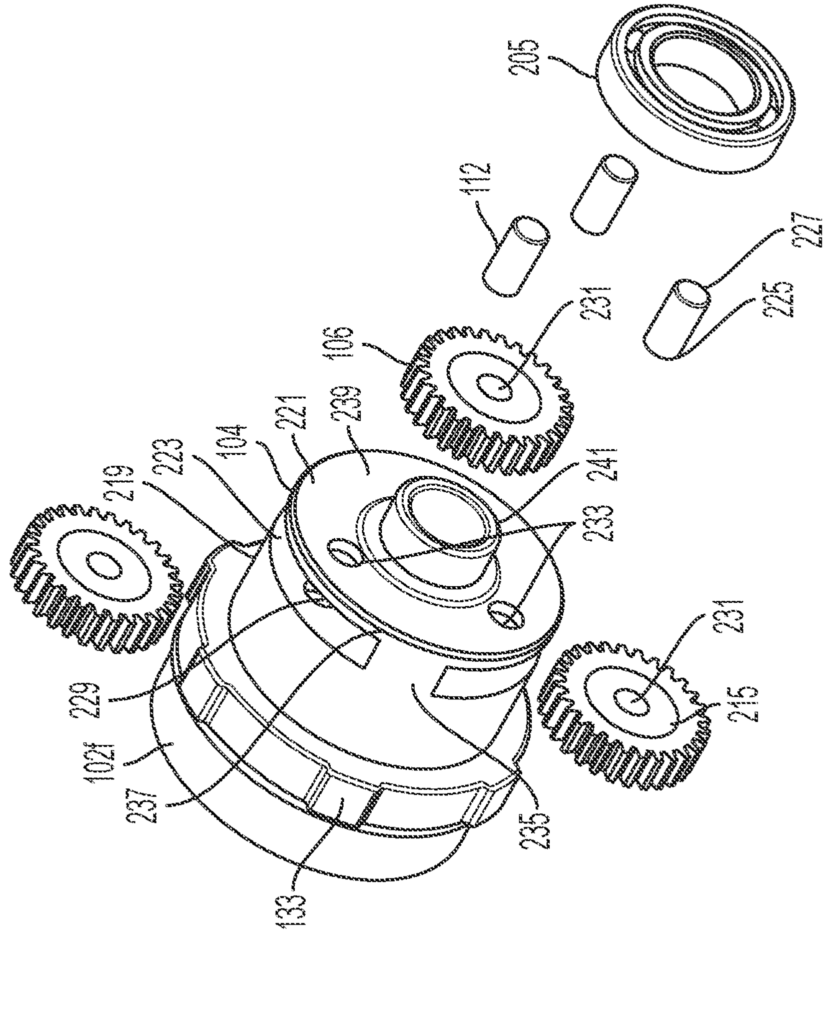
Figure 36D:
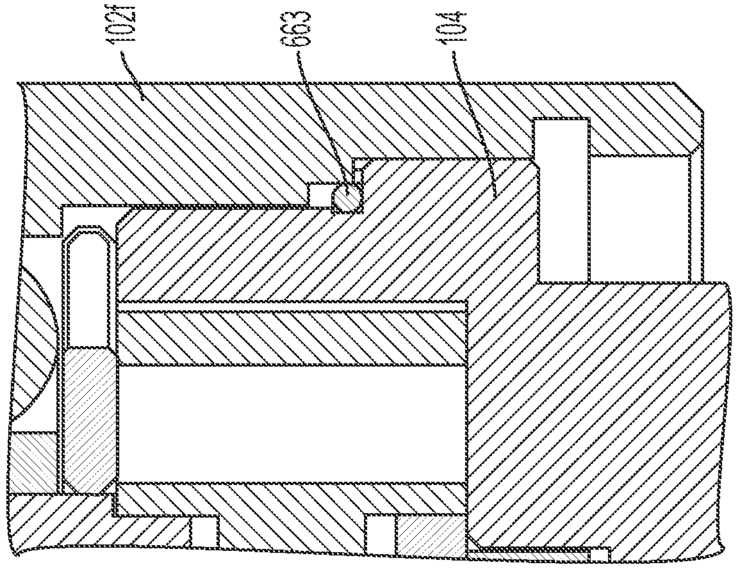
FIG. 36C shows a rear view of the planet carrier assembly and FIG. 36D shows a cross-section view of the impact assembly with the planet carrier assembly and the front hammer cylinder according to an embodiment of the present patent application, where some portions of the impact assembly are not shown in FIG. 36D to better illustrate other portions of the impact assembly.

In one embodiment, referring to FIGS. 36A-36B, a first portion (e.g., the rear hammer cylinder 102*r*) of the hammer 102 includes a gear carrier 104 that is configured to carry the output gear 215. The gear carrier 104 includes a first/front gear carrier portion 219 and a second/rear gear carrier portion 221. The first and second gear carrier portions 219, 221 have a slot 223 therebetween. The slot 223 is configured to receive the output gear 215 therein. The output gear 215, received in the associated slot 223, is supported by a support member/pin 112. The support member 112 is supported at spaced locations by the first gear carrier portion 219 and the second gear carrier portion 221. The spaced locations are locations that are spaced apart axially along the longitudinal direction L-L of the power tool 100. That is, the planet gears 106 are received in the slots 223 in the hammer 102 and supported by the pins 112 at both ends in the carrier portion 104 of the hammer 102.

The support member 112 is a pin. The support member 112 is supported at its first end portion 225 by the first gear carrier portion 219 and its second end portion 227 by the second gear carrier portion 221. Supporting the pins 112 at both their ends provides superior support for the planet gears 106 and eases assembly of the product. The output gear 215 comprises at least one planet gear 106. As shown in FIG. 36A, the output gear 215 includes three planet gears 106. The planet gears 106 are supported on the hammer 102 by the planet gear carrier 104 that is integral with the hammer 102.

The support member 112 is configured to extend through and to be received in a first carrier opening 229 in the first gear carrier portion 219, a gear opening 231 in the associated gear member 106, and a second carrier opening 233 in the second gear carrier portion 221. The first gear carrier portion 219 and the second gear carrier portion 221 are connected to each other by connector portions 235 that are positioned between the slots 223.

The second gear carrier portion 221 includes a front surface 237 facing the first gear carrier portion 219 and an opposing rear surface 239. The rear surface 239 of the second gear carrier portion 221 includes an outwardly extending support portion 241 extending away from the first gear carrier portion 219 and disposed centrally on the rear surface 239 of the second gear carrier portion 221. The outwardly extending support portion 241 is configured to support the rear bearing 205 thereon. The outwardly extending support portion 241 comprises an opening 245 therethrough that is configured to receive the motor pinion/sun gear 151 (as shown in FIG. 5) that is meshed with the planet gears 106. The rotationally stationary ring gear 110 is configured to be meshed with the planet gears 106 received in the gear carrier 104. The rotation of the sun gear 151 is configured to cause the planet gears 106 to rotate about an axis of the support member 112 and to orbit around the sun gear 151, which in turn causes the gear carrier 104 to rotate at a slower rotational speed than the sun gear 151.

The planet gears 106 of the output gear of the transmission 115 are housed within the slots 223 and the pins 112 are supported on both ends. Thus, the present patent application provides support on both sides of the planet gears 106 for quiet oil impulse mechanism. By adapting the rear section cam carriers to contain the planet gears 106, the planet gears 106 can be contained within a pocket at the end of the quiet drive mechanism. This pocket allows for fore and aft support of the planet pins 112. This configuration of the present patent application is improved over the prior art systems where only one side of the planet pins 112 are supported. This measure of support will produce a system with a stiffer planetary system providing more consistent contact between the planet gears 106, the motor pinion/sun gear 151 and the ring gear 110. This will reduce gear noise and maximize strength of the planetary gear system.

Referring to FIGS. 2-7, 24-26 and 32A-35B, the impact assembly 107 also includes one or more foam members 140 that are configured to accommodate changes in physical characteristics of the fluid (e.g., temperature, pressure, volume, and/or viscosity) as a result of temperature changes within the power tool and in the environment surrounding the power tool. For example, an increase in external environmental temperature may cause the pressure or volume of the fluid to increase. The fluid may also increase in temperature during use of the power tool. As the fluid is forced through the outlet port(s), due to the hammer lugs forcing the blades 116 radially inward, that fluid may be compressed and sheared, which may cause the fluid to heat up and thus expand. Since the hammer chamber 111 is full sealed and the fluid completely fills the hammer chamber (no free air volume), the pressure in the hammer chamber 111 can rise dramatically from the temperature changes. Ordinarily, this pressure increase could cause fluid leakage from the hammer cylinder, which may be detrimental to the performance of the power tool. Also, if the internal chamber pressure increases too far, it can stall the power tool and cause the impact assembly not to function. To accommodate this, the two or foam members 140 is/are included inside the hammer chamber 111.

The foam member(s) 140 may be of a construction such that they are flexible with a sealed internal volume, with an internal pressure state derived from the manufacturing process. This leads to a foam member 140 that has volume compensation capability depending on its size and material. For example, in one possible embodiment,. the foam member(s) 140 may be composed of an elastic closed cell foam material, which comprises many small chambers of entrapped gas. This multiplicity of micro chambers allows for a large range of volume compensation for a given initial volume of the uncompressed foam member. Also, the multiplicity of chambers inherent to closed cell material, can mitigate the single point failure of the foam inserts, as a rupture of a single micro chamber does not render the foam inserts non-functional.

The manufacture of the foam member(s) for the power tool may be achieved with minimal complexity, e.g., by cutting one or more lengths of foam material, and installing the foam member(s) within the hammer chamber 111. The foam member(s) do not require forming and sealing of an elastic air tube as in the prior art. The entrained gases are a product of the close cell foam material manufacture.

In one embodiment, at least two foam members 140 are positioned within the hammer chamber 111. The foam members 140 are spaced from one another within the hammer 102. One of the foam members 140*f* is positioned at a first/front end portion of the hammer 102 and the other of the foam members 140*r* is positioned at an opposite second/rear end portion of the hammer 102. For example, the hammer 102 comprises a first portion 102*f* and a second portion 102*r* connected to each other. The first portion 102*f* of the hammer 102 comprises a first foam member receiving portion 209*f* configured to receive one of the foam members 140*f* therein. The second portion 102*r* of the hammer 102 comprises a second foam member receiving portion 209*f* configured to receive the other of the foam members 140*r* therein.

The foam member(s) 140 are at least partially collapsible based upon a changing physical characteristic of the fluid during an operation of the impact assembly 107. The physical characteristic of the fluid may include temperature, pressure, volume, and/or viscosity of the fluid.

The foam member containment members 142*f*, 142*r* are positioned between the associated foam member 140*f*, 140*r* and the associated portion of the hammer chamber 111. Each foam member 140*f*, 140*r* is received in a foam member receiving portion 209*f*, 209*r*. The foam member receiving portion 209*f*, 209*r* is disposed at the first end portion of the hammer chamber 111 of the hammer 102 and/or at the second end of the hammer chamber 111 of the hammer 102.

The hammer chamber 111 is in communication with at least one cavity 209 (e.g., a front cavity 209*f* and/or a rear cavity 209*r*). The cavity 209 is separated from the hammer chamber 111 by a containment member 142. The containment member 142 may be interchangeably referred to as foam member/insert containment member/plate/disk. The containment member 142 has apertures 291 for communicating the fluid between the hammer chamber 111 and the cavity 209.

A foam member 140 having an interior volume (e.g., between a first closed end and a second closed end of the foam member/bladder 140), which is filled with closed cell foam material, is positioned with the cavity 209. The foam member 140 may be interchangeably referred to as foam cushion/bladder/insert. The foam member 140 is configured to be collapsible to compensate for thermal expansion of the fluid during operation of the impact assembly 107, which can negatively impact performance characteristics. The present patent application provides an improved design and function within quiet mechanism.

The foam member 140 is axially retained in place by the plate 142 received over the anvil 122. The foam member 140 may be a cylindrical piece of closed cell foam bent in a C-shape or an O-shape to act as a cushion in the front end and/or the rear end of the hammer 102. The foam is filled with tiny cells or air pockets and can be collapsible under high pressure conditions inside the hammer 102. The foam member 140 can take any shape that permits the foam member 140 to fit in the cavity 209 and still effectively compensate for thermal expansion of the hydraulic fluid in the hammer chamber 211 and the cavity 209.

Figure 33A:
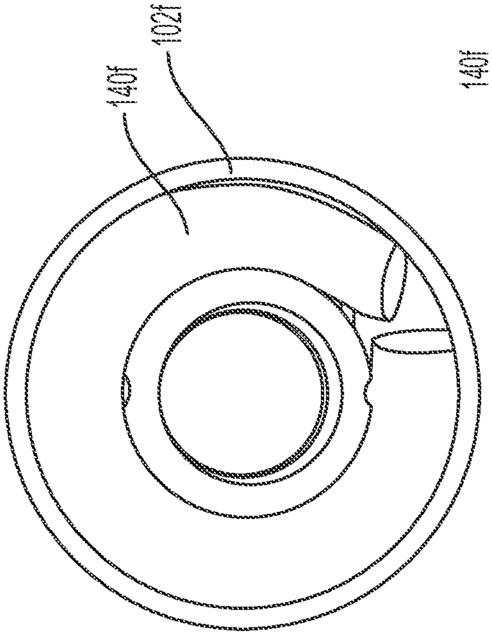
Figure 33B:
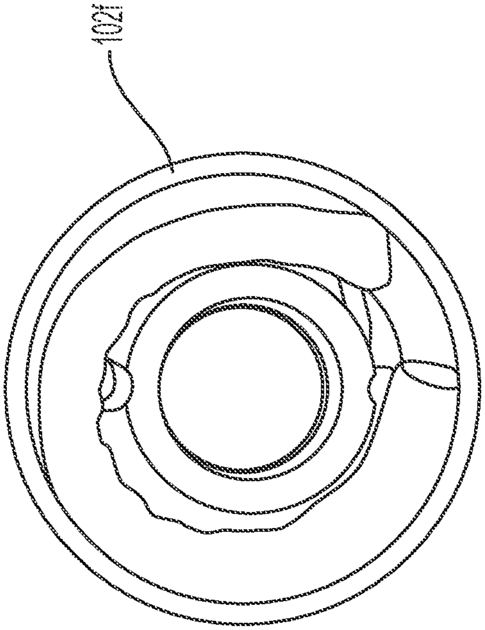
Figure 33C:
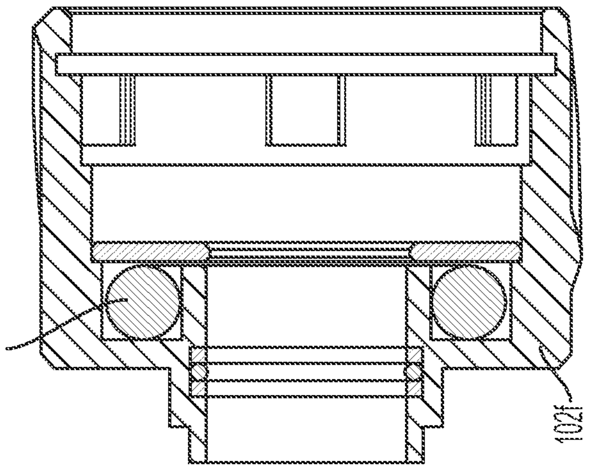
Figure 33D:
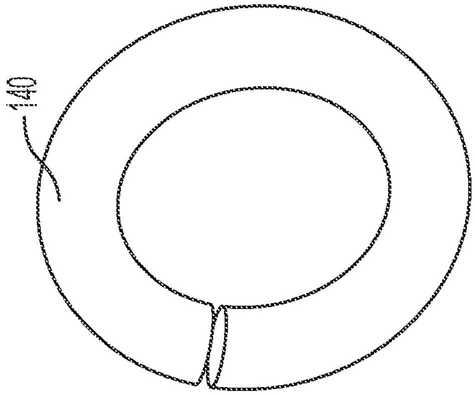
FIG. 33D shows a perspective view of the foam member of the impact assembly according to an embodiment of the present patent application.

The cavity 209 and the foam member 140 may each have a curved shape configuration (e.g., curving at least partially around the anvil 122). For example, each foam member 140 can have C-shaped configuration as shown in FIG. 33D or an O-shaped configuration. One or both of the foam inserts 140 may be constructed in two arcuate pieces received in C-shaped pockets in the hammer 102. Each foam member 140 (i.e., the front and the rear foam members 140*f*, 140*r*) may have the same cross-sectional area. The front and rear foam members 140*f*, 140*r* may have different cross-sectional areas. Each foam member 140 (i.e., the front and the rear foam members 140*f*, 140*r*) has the same density. The front and rear foam members 140*f*, 140*r* may have different densities. Each foam member 140 (i.e., the front and the rear foam members 140*f*, 140*r*) has the same length. The front and rear foam members 140*f*, 140*r* may have different lengths.

Each foam member 140 comprises closed-cell foam material. The foam member 140 may be made from silicone foam material. The foam member 140 may have a closed cell type material. The foam member 140 may have ultra-smooth texture. The foam member 140 has a diameter tolerance of −0.04 to 0.04 inches. The foam member 140 may withstand a temperature range from −85° F. and 400° F. The foam member 140 has a density of approximately 35 pounds (lbs)/cubic Feet (cu. Ft). The foam member 140 may have a soft hardness rating. The foam member 140 may withstand a pressure of 12 psi to compress 25%. The foam member 140 may be a high-temperature silicone foam cord having a diameter of ¼ inch.

Figure 32A:
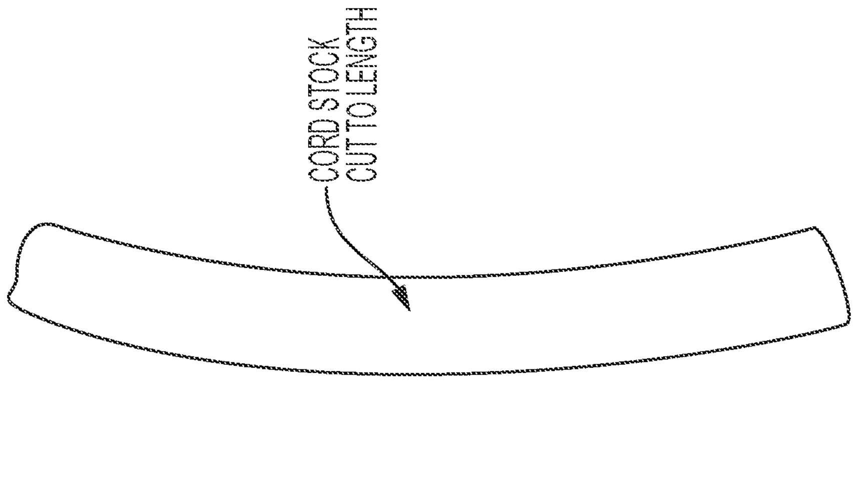
FIGS. 32A-32B show a perspective view and a cross-sectional view of the foam member of the impact assembly according to an embodiment of the present patent application.
Figure 32B:
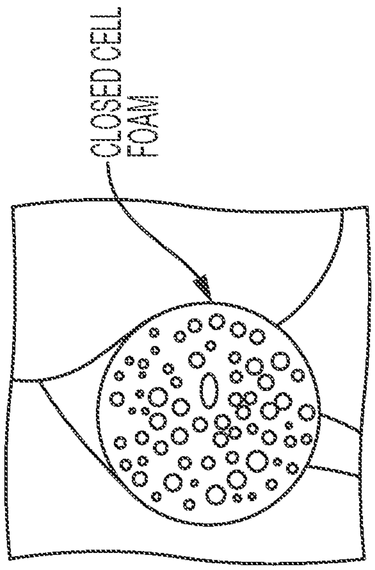

As shown in FIGS. 32A-32B, this type of foam is filled with tiny cells or air pockets. As shown in FIGS. 33A-33D, the foam is collapsible under high pressure conditions inside the hammer 102. FIG. 33A shows a view of the foam member 140*f* placed in the front hammer cylinder 102*f* in its normal condition, while FIG. 33B shows a view of the foam member 140*f* placed in the front hammer cylinder 102*f* in its collapsed condition.

In one embodiment, as shown in FIG. 3, the hammer chamber 111 is in communication with a front cavity 209*f*. The front cavity 209*f* is configured to receive a front foam member 140*f*. A front containment member 142*f* separates the hammer chamber 111 and the front cavity 209*f* and allows for communicating the fluid between the hammer chamber 111 and the cavity 209*f*. The foam insert 140*f* is disposed in the front portion of the front hammer cylinder 102*f* and is in front of the foam insert containment disk 142*f*.

In another embodiment, as shown in FIGS. 4 and 5, the hammer chamber 111 is in communication with a rear cavity 209*r*. The rear cavity 209*r* is configured to receive a rear foam member 140*r*. A rear containment member 142*r* separates the hammer chamber 111 and the rear cavity 209*r* and allows for communicating the fluid between the hammer chamber 111 and the cavity 209*r*. The foam insert 140*r* is disposed in the rear portion of the rear hammer cylinder 102*r* and is behind the foam insert containment disk 142*r*.

In yet another embodiment, as shown in FIGS. 6 and 7, multiple foam members are provided within the impact assembly 107. The present patent application allows for multiple sections of the foam member/bladder 140 to be used. Two sections are housed at either end of the impact assembly 107, doubling the available volume compensation. This should allow for the power tool 100 to be pushed further before the hammer chamber 111 pressure stops the impact assembly 107 from functioning. The two foam inserts 140*f*, 140*r* are provided for redundancy and to provide a higher range of power operation. For example, the hammer chamber 111 is in communication with both the front cavity 209*f* and the rear cavity 209*r*. The front cavity 209*f* is configured to receive the front foam member 140*f* and the rear cavity 209*r* is configured to receive the rear foam member 140*r*. The front containment member 142*f* separates the hammer chamber 111 and the front cavity 209*f* and allows for communicating the fluid between the hammer chamber 111 and the front cavity 209*f*, while the rear containment member 142*r* separates the hammer chamber 111 and the rear cavity 209*r* and allows for communicating the fluid between the hammer chamber 111 and the rear cavity 209*r*. The first foam insert 140*f* is disposed in the front of the front hammer cylinder 102*f* and is in front of the front foam insert containment disk 142*f* and a second foam insert 140*r* is disposed in the rear portion of the rear hammer cylinder 102*r* and is behind the second foam insert containment disk 142*r*.

Figure 26:
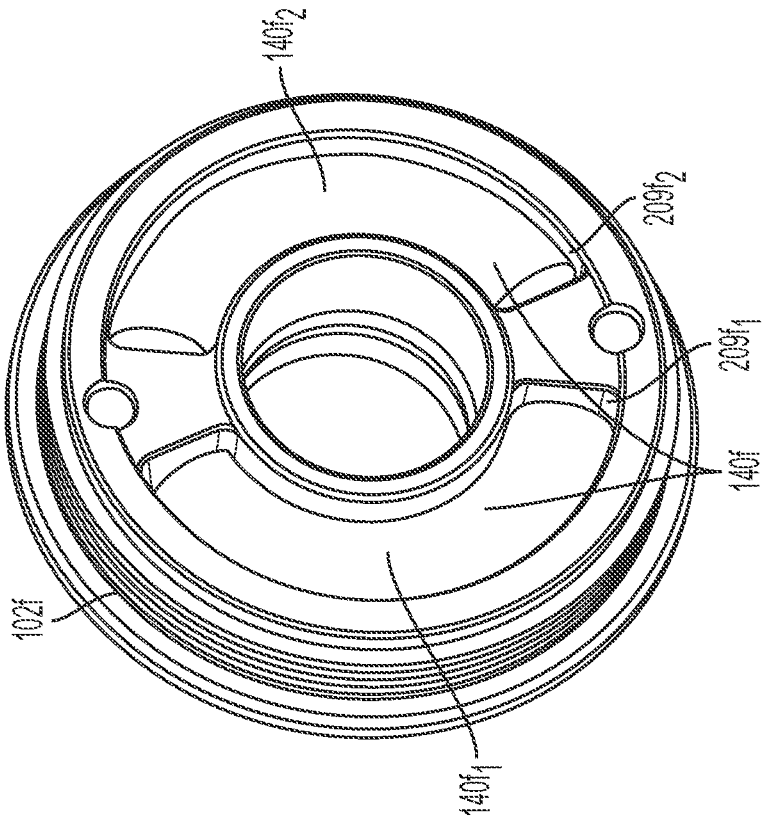
FIG. 26 shows a rear perspective view of a front hammer cylinder of the impact assembly and foam members received in the front hammer cylinder according to an embodiment of the present patent application.

In one embodiment, two foam members 140 are used in the hammer 102, for example, one at either end of the hammer 102. In another embodiment, more than two foam members are used in the hammer cylinder. That is, as shown in FIG. 26, the front foam member 140*f* includes two front foam portions $\mathbf{140}f_1$, $\mathbf{140}f_2$. The front foam portion $\mathbf{140}f_1$ is received in the front cavity $209f_1$ and the rear foam portion $140f_2$ is received in the front cavity $209f_2$. The front foam portions $140f_1$, $140f_2$ and the front cavities $209f_1$, $209f_2$ have arc shaped configurations. Similarly, the rear foam member 140*r* may also include two rear foam portions.

Figure 34A:
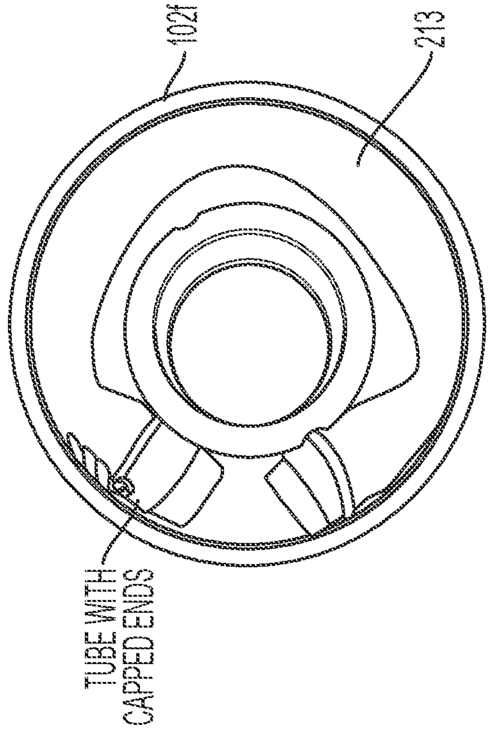
FIGS. 34A-34B show rear perspective views of the foam member in the front hammer cylinder of the impact assembly according to another embodiment of the present patent application.
Figure 34B:
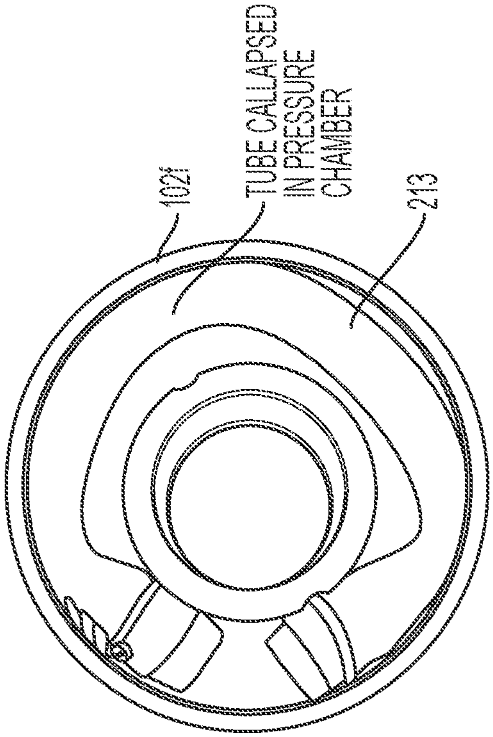
Figure 35B:
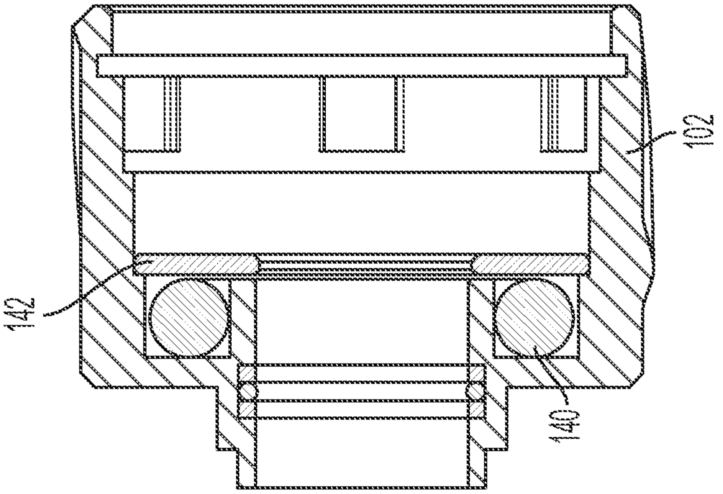
FIG. 35A shows a perspective view of the foam member containment member and FIG. 35B shows a cross-section view of the impact assembly with the foam member and the foam member containment member, where some portions of the impact assembly are not shown in FIG. 35B to better illustrate other portions of the impact assembly.
Figure 35A:
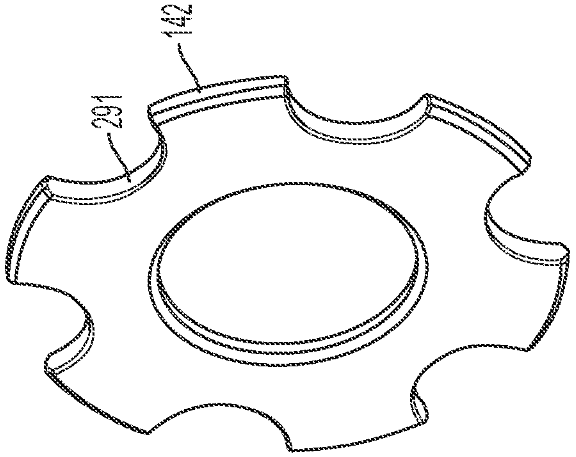

In another embodiment, as shown in FIGS. 34A-34B, the foam member 140 can be an air-filled rubber tube with capped ends that can collapse under pressure. FIG. 34A shows a view of the collapsible air-filled rubber tube 213 with capped ends placed in the front hammer cylinder 102*f* in its normal condition, while FIG. 34B shows a view of the collapsible air-filled rubber tube 213 with capped ends placed in the front hammer cylinder 102*f* in its collapsed condition. In an alternative design, an air-filled rubber tube 213 with capped ends that can collapse under pressure can be used in the hammer cylinder as shown in FIGS. 34A and 34B. The air-filled rubber tube 213 may be made from a fluorosilicone rubber material. The air-filled rubber tube 213 may be a high-temperature fluorosilicone rubber tubing with an inner diameter of 4 mm, an outer diameter of 6 mm, and a wall thickness of 1 mm. The air-filled rubber tube 213 may have a soft hardness rating. The air-filled rubber tube 213 may have a durometer 60A hardness. The air-filled rubber tube 213 may have bend radius of 18 mm. The air-filled rubber tube 213 may withstand a temperature range of −80° F. to 450° F. The air-filled rubber tube 213 may withstand a maximum pressure of 3 psi at a temperature 72° F.

Also, any specific amount of usage, resulting in a specific temperature change, results in lower chamber pressure in a highly volume compensated system. This reduces the propensity for leakage around the anvil seal from pressure fatigue cycles. The lower pressures reached through common usage duty cycles, vs a lesser compensated system should stress the sealing elements less. The foam insert 140 has more volume compensation per unit uncompressed volume vs sealed plastic tube, is not inflicted with single point failure, and with multiple bladders total volume compensation for the impact assembly 107 is increased.

Figure 10B:
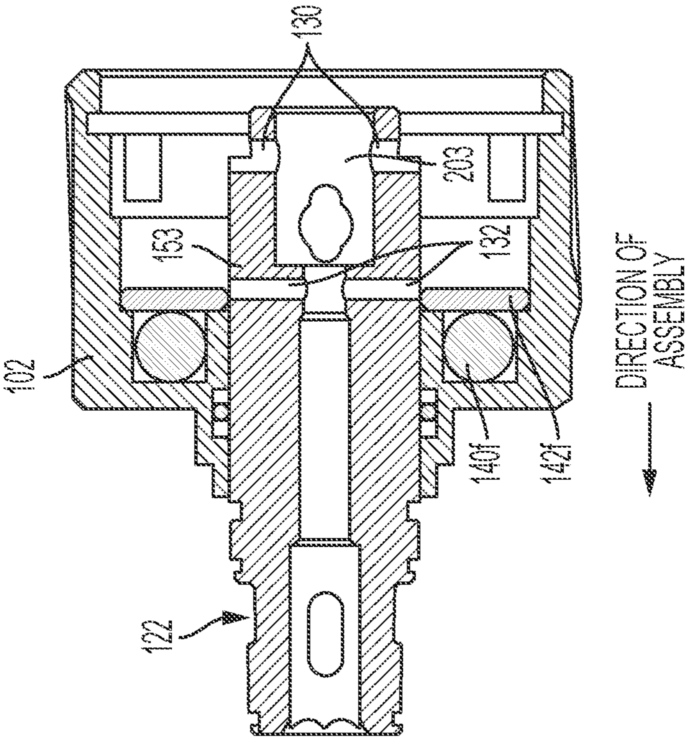
FIG. 10A shows a perspective view of an anvil of the impact assembly and FIG. 10B shows a cross-section view of the impact assembly with the anvil according to an embodiment of the present patent application, where some portions of the impact assembly are not shown in FIG. 10B to better illustrate other portions of the impact assembly.
Figure 10A:
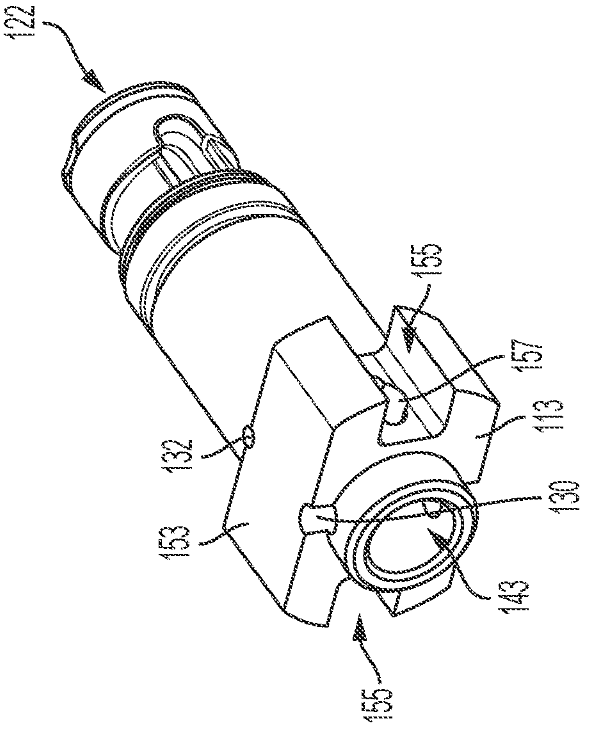

The impact assembly 107 also comprises the anvil 122. The anvil 122 is shown in FIG. 10A. FIG. 10B shows a cross-sectional view of the impact assembly 107 with the anvil 122 therein. The anvil 122 is at least partially disposed in the hammer chamber 111 (i.e., defined by the rear hammer cylinder 102*r* and the front hammer cylinder 102*f*) and configured to rotationally drive the output shaft 109. The anvil 122 may be interchangeably called as an anvil shaft. The anvil 122 protrudes from the front of the hammer 102 (e.g., from the front of the front hammer cylinder 102*f*) and forms the output shaft 109 of the power tool 100.

The anvil 122 comprises a body portion 113 configured to be rotatable relative to the hammer 102, and a reciprocating member 116 configured to selectively move radially outwardly relative to the body portion 113 to be impacted by the impact member 114 of the hammer 102 according to pressure of fluid in the anvil chamber 203 so that the hammer 102 imparts rotational movement to the body portion 113.

The anvil 122 also includes a blade holder 153 that includes recesses 155 that are configured to loosely receive the pair of blades/reciprocating members 116 that rotate together with the anvil 122 and can move radially inwardly and outwardly relative to the anvil 122. The blade holder 153 of the anvil 122 also includes radial holes 157 that receive balls 187 configured to push the blades/reciprocating members 116 radially outwardly from the blade holder 153. In another embodiment, the radial holes 157 of the blade holder 153 of the anvil 122 are configured to receive the integrally formed pins 159 (as shown in FIGS. 3 and 11A-11B) of the blades/reciprocating member 116.

Also, the blade holder 153 includes a pair of inlet orifices 130 and a pair of outlet orifices 132 that receive the viscous fluid. The inlet orifices 130 and the outlet orifices 132 are configured to selectively provide fluid communication between the anvil chamber 203 in the anvil 122 and the hammer chamber 111. The inlet orifices and outlet orifices may interchangeably be referred to as inlet ports and outlet ports, respectively.

The pair of inlet orifices 130 are configured to extend between and selectively provide fluid communication between the hammer chamber 111 and the anvil chamber 203 within the anvil 122. As will be clear from the discussions in detail below, the camshaft 120 of the impact assembly 107 (e.g., that is disposed within the anvil chamber 203 within the anvil 122) is configured to selectively seal the inlet orifices 130. Also, as will be clear from the discussions in detail below, the pair of outlet orifices/ports 132 are configured to be variably/selectively obstructed by the active valve 201, thereby limiting the volumetric flow rate of hydraulic fluid that may be discharged from the anvil chamber 203 within the anvil 122, through the outlet orifices 132, and to the hammer chamber 111.

The outlet orifices 132 are located in an anvil flange 161 of the anvil 122 (e.g., instead of in the anvil output shaft 109 of the anvil 122). The outlet orifice/port 132 is applied to the face of the anvil 122 that communicates with the area that is under the blade/vane 116. The outlet orifices 132 are aligned with a front cam shaft portion of the cam shaft 120. The outlet orifices 132 can each be covered by the active valve 201. The size and number of the outlet orifices 132 can be varied, and the outlet orifices can be applied to one or both sides of the anvil 122.

Figure 12A:
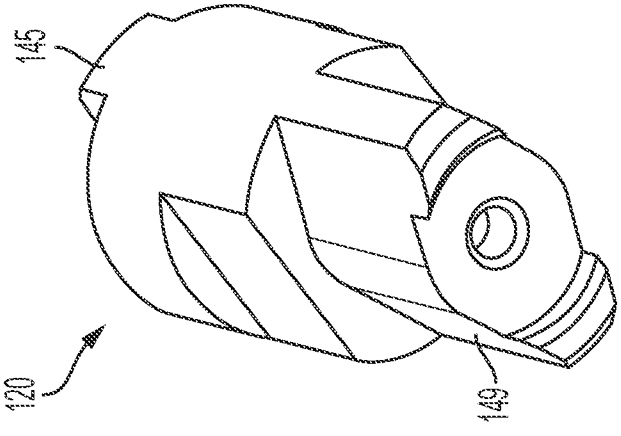
FIG. 12A shows a perspective view of a cam shaft/member of the impact assembly and FIG. 12B shows a cross-section view of the impact assembly with anvil, the reciprocating member(s) and the cam shaft/member according to an embodiment of the present patent application, where some portions of the impact assembly are not shown in FIG. 12B to better illustrate other portions of the impact assembly.

The cam shaft 120 of the impact assembly 107 is shown in FIG. 12A. The cam shaft 120 is configured to be attached to the hammer 102 (e.g., the rear hammer cylinder 102*r*) for co-rotation with the hammer 102. The cam shaft 120 is configured to rotated about the longitudinal axis L-L. In one embodiment, the cam shaft 120 is integrally formed with the hammer 102. In another embodiment, the cam shaft 120 is configured to be separately formed and is connected to the hammer 102 for co-rotation with the hammer 102.

Figure 12B:
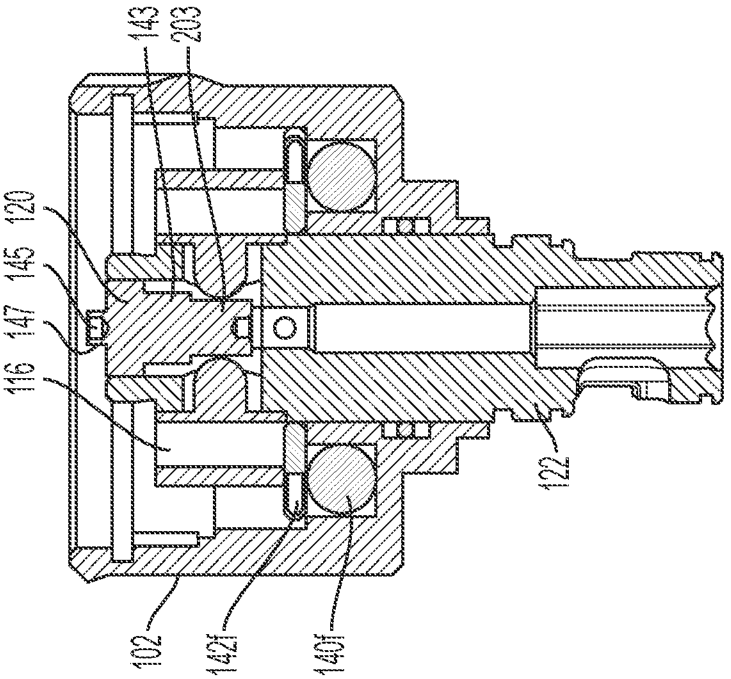
Figure 13:
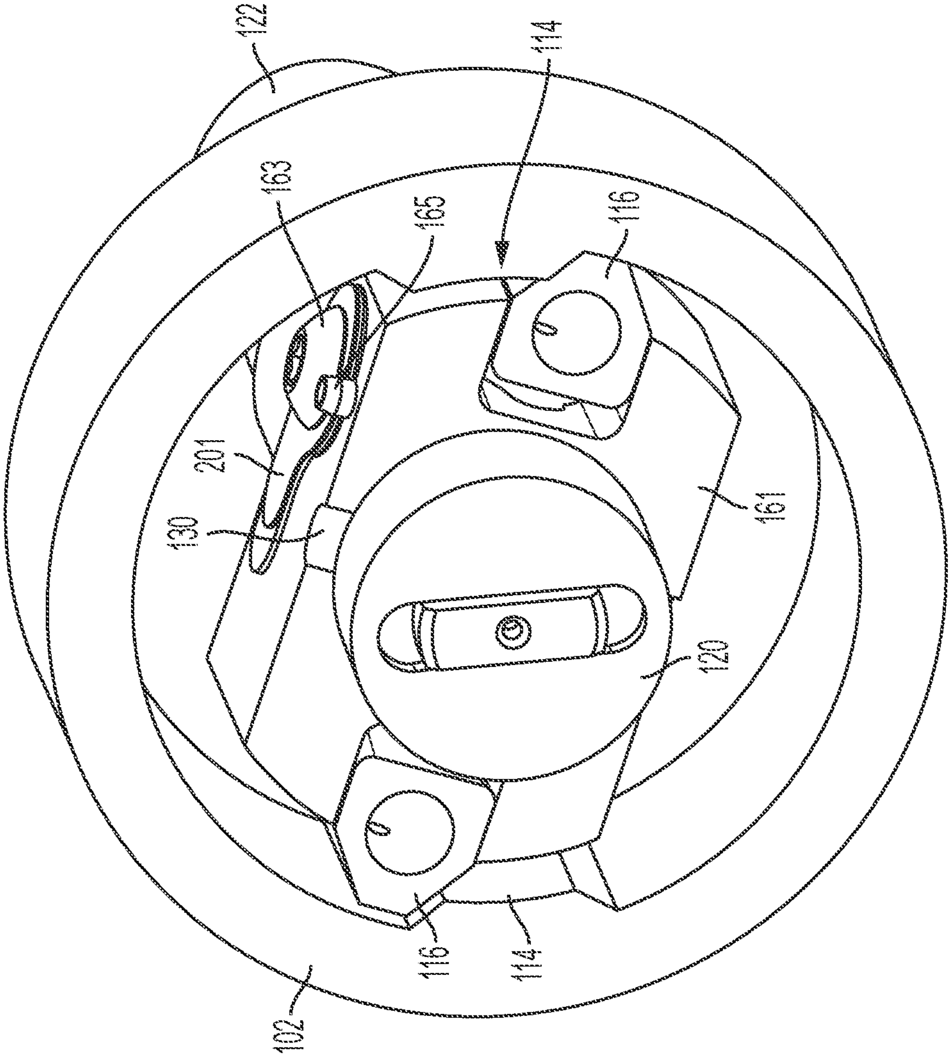
FIG. 13 shows a rear perspective view of the impact assembly showing an active valve according to an embodiment of the present patent application, where some portions of the impact assembly are not shown in FIG. 13 to better illustrate other portions of the impact assembly.
Figure 14:
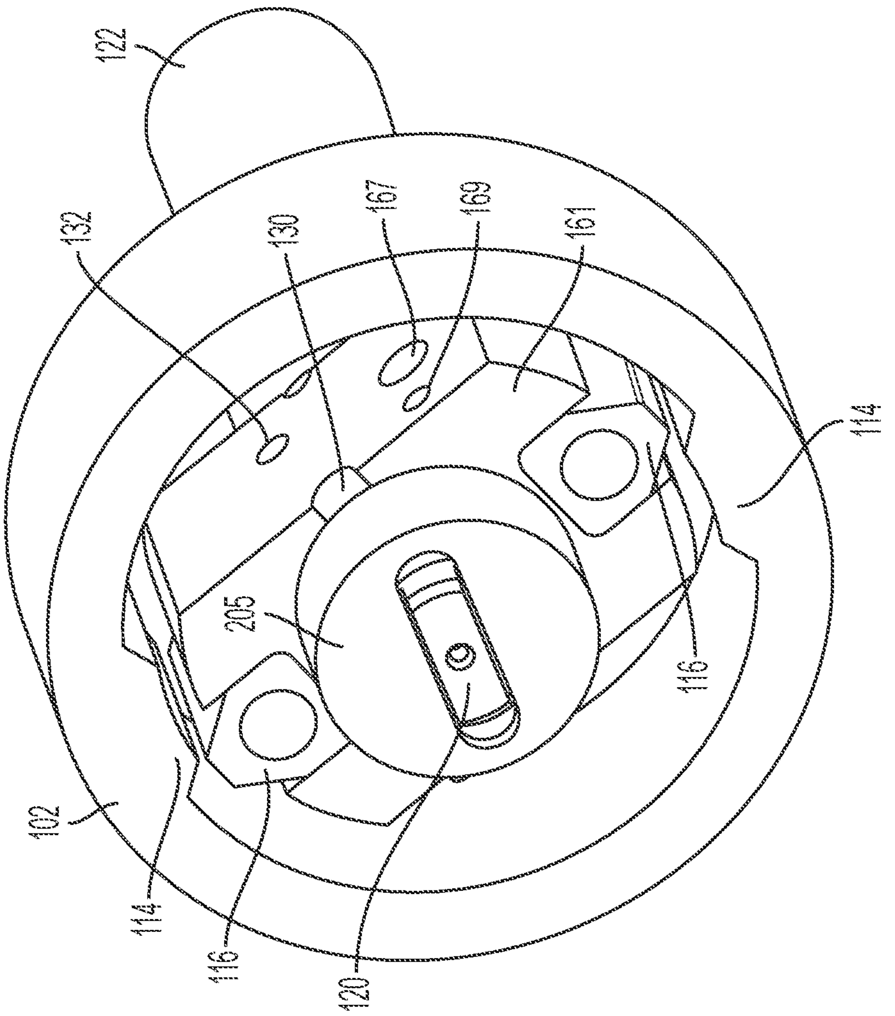
FIG. 14 shows another rear perspective view of the impact assembly according to an embodiment of the present patent application, where some portions of the impact assembly are not shown in FIG. 14 to better illustrate other portions of the impact assembly.

FIG. 12B shows a cross-sectional view of the impact assembly 107 in which the cam shaft 120 is being received by a portion of the anvil 122. As shown in FIGS. 4 and 10A, the cam shaft 120 is disposed within a receiving portion 143 (e.g., an axial bore) of the anvil 122 and is configured to selectively seal the inlet orifices 130 in the anvil 122. The cam shaft 120 is configured to be received within the anvil chamber 203 in the anvil 122 and is configured to selectively seal the inlet orifices 130.

The cam shaft 120 includes a key 145 at a rear end thereof. The key 145 engages a key slot 147 in the hammer 102 so that the cam shaft 120 and the hammer 102 rotate together. The cam shaft 120 also includes cam surfaces 149 at a front end thereof. The cam surfaces 149 are received in the axial bore 143 in the rear of the anvil shaft 122.

The cam shaft 120 and the hammer 102 are configured to rotate in unison relative to the anvil 122 until the impact members 114 of the hammer 102 impact the reciprocating members 116 to deliver a rotational impact to the anvil 122. Just prior to this rotational impact, the inlet orifices 130 are blocked by the cam shaft 120, thus sealing the fluid in the anvil chamber 203 at a relatively high pressure, which biases the reciprocating members 116 radially outward to maintain the reciprocating members 116 in contact with the interior surface of the hammer 102.

Figure 15:
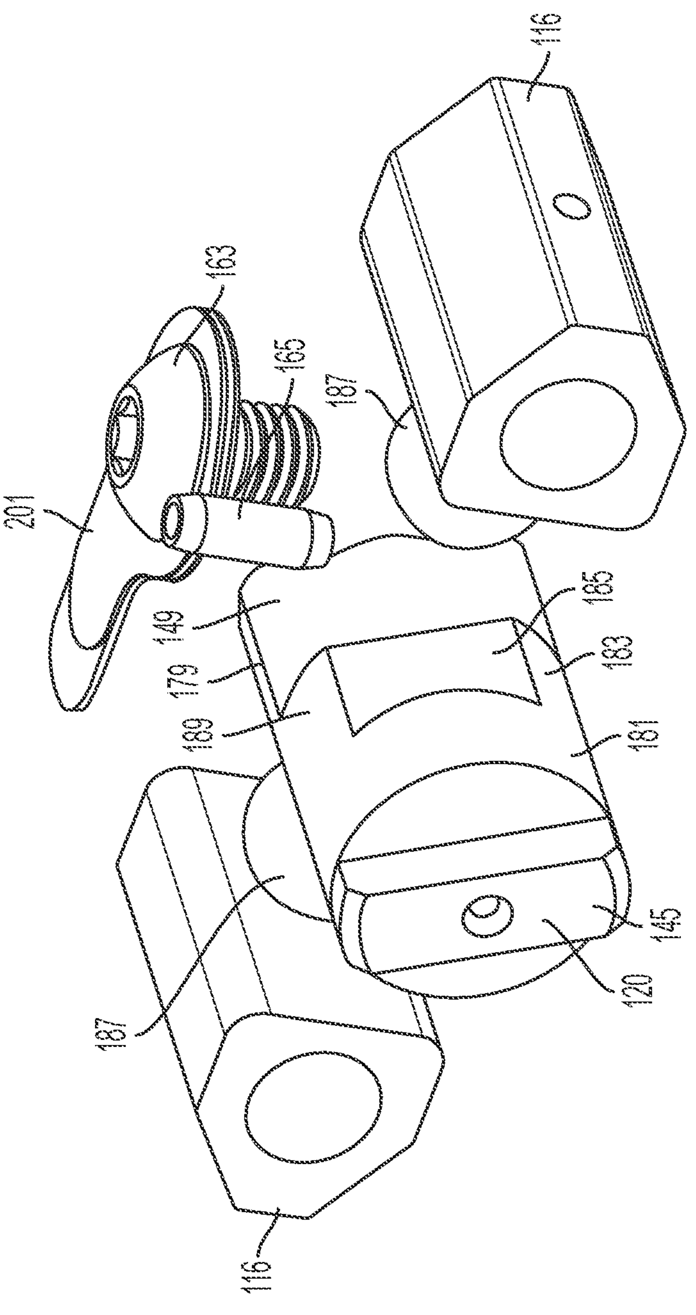
FIG. 15 shows an exploded view of the impact assembly showing the active valve, the reciprocating member(s), and the cam shaft/member according to an embodiment of the present patent application, where some portions of the impact assembly are not shown in FIG. 15 to better illustrate other portions of the impact assembly.
Figure 17:
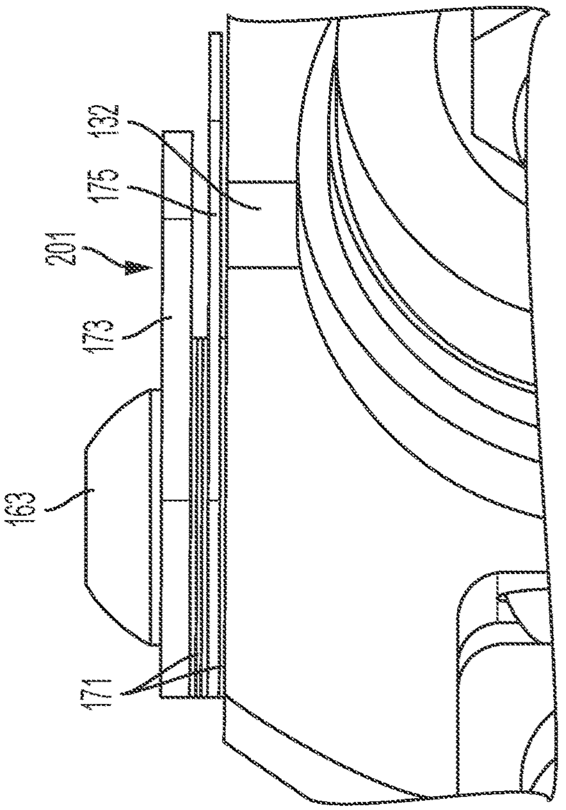
FIG. 17 shows another perspective view of the active valve of the impact assembly according to an embodiment of the present patent application.
Figure 16:
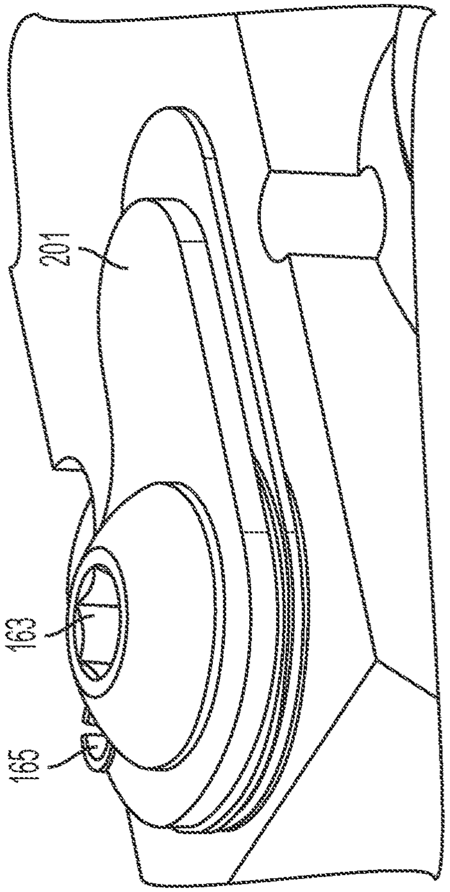
FIG. 16 shows a perspective view of the active valve of the impact assembly according to an embodiment of the present patent application.

Referring to FIG. 15, the cam shaft 120 includes a front portion 179, a rear portion 181, an intermediate portion 183 between the rear portion 181 and the front portion 179. The intermediate portion 183 of the cam shaft 120 includes flat surfaces 185 thereon. The front portion 179 of the cam shaft 120 has the cam surfaces 149 thereon. The rear portion 181 of the cam shaft 120 has the key 145 protruding therefrom. The functions of the portions of the cam shaft 120 will be described in detail below when describing the operation of the impact assembly 107 and/or the power tool 100.

In one embodiment, as shown in FIGS. 13 and 15-17, the power tool 100 comprises an active valve 201 configured to control the discharge of the fluid from the anvil chamber 203 in the anvil 122 to the hammer chamber 111 so as to dampen the radial inward movement of the reciprocating members/blade 116 to the body portion 113. The active valve 201 is configured to be variably open based on one or more physical characteristics of the fluid that vary in accordance with at least one of volume of the fluid, temperature of the fluid, pressure of the fluid or viscosity of the fluid.

The active valve 201 is configured to be movable between a plurality of positions including a completely closed position, a completely open position, and a plurality of intermediate positions therebetween to control the discharge of the fluid from the anvil chamber 203 in the anvil 122 to the hammer chamber 111 via the outlet orifice 132. The active valve 201 may be configured to be movable among a plurality of positions including a closed position and one or more at least partially open positions to control the discharge of the fluid from the anvil chamber 203 in the anvil 122 to the hammer chamber 111 via the outlet orifice 132.

The outlet orifices 132 in the anvil 122 may each be covered by the active valve 201. The active valve 201 is attached to the outer surface of the anvil flange 161 by a valve fastener (e.g., a threaded screw) 163. The fastener (e.g., a threaded screw) 163 may be a singular button head screw 163 that is used to provide clamping of the active valve/valve spring 201. The anvil flange 161 includes an opening 167 that is configured to receive the fastener 163 therein to attach the active valve 201 to the anvil 122.

The active valve 201 is also kept aligned by a valve alignment pin 165. The anvil flange 161 also includes an opening 169 that is configured to receive the alignment pin 165 therein. The alignment pin 165, which received in the anvil 122, is configured to keep the active valve 201 aligned with the associated outlet orifice 132. In one embodiment, the alignment pin 165 may be a roll pin 165 that is used to ensure proper clocking of the active valve/valve spring 201 relative to the port hole/outlet orifice 132.

It should be obvious that various other methods can be employed to ensure the active valve/valve spring 201 is clamped to the anvil 122 and rotation of the active valve/valve spring 201 is prevented. In another embodiment, a non-inclusive list of options may include a depression in the anvil face or matching the valve spring/active valve shape so as to capture to the valve spring/active valve and prevent the rotation of the valve spring/active valve 201. In yet another embodiment, a non-inclusive list of options may include staking, laser welding, riveting, roll pin for retention, press fitting a headed pin, peening a headed pin, etc. may be used to capture to the valve spring/active valve and prevent the rotation of the valve spring/active valve 201

The active valve 201 may also be referred to a flapper valve or a valve spring. The flapper valve 201 comprises a flexible plate 175 that is configured to selectively cover the outlet orifice 132 in the anvil 122 and to flex relative to the outlet orifice 132 in the anvil 122. The flapper valve 201 further comprises a limiter plate 173 that has a greater stiffness than the flexible plate 175. The limiter plate is configured to limit travel of the flexible plate 175 away from the outlet orifice 132 in the anvil 122. The flapper valve 201 further comprises one or more spacers/washers 171 disposed between the anvil 122 and the flexible plate 175 or between the flexible plate 175 and the limiter plate 173.

The active valve 201 can include one or more washers 171, one or more flexible plates 175, and a more rigid/stiff limiter plate 173 that limits movement (outwardly away from the outlet orifice 132 in the anvil 122) of the flexible plate(s) 175. There can be any number of washers 171 and flexible plates 175 in the active valve 201. The size and the design of the washers 171 and the flexible plates 175 can be tuned to generate a desired movement range and force profile. These sorts of valves are used in automotive shock absorbers. In illustrative embodiment, only one active valve 201 is shown. In another embodiment, both outlet ports 132 will be covered by their flapper valves 201.

In operation, the active valves 201 can open a larger amount at low temperatures when the fluid is more viscous and can open a smaller amount at high temperatures when the fluid is less viscous so that the impact assembly 107 can operate similarly regardless of temperature changes. That is, the active valve 201 of the present patent application is configured to actively accommodate for the temperature conditions in the impact assembly 107, thus, providing more or less blowby area as needed.

As the vane/blade 116 is driven radially inwardly when the impact lugs/member 114 contacts the vane/blade 116, the oil under the vane/blade 116 is displaced. The displaced oil flows around the vane/blade 116 blow by area and flows out the outlet orifice 132, flexing the valve spring/active valve 201 as dictated by the conditions of the fluid and the rapidity of the vane/blade 116 radially inward velocity. The flexing of the valve spring/active valve 201 controls the restriction to flow of the fluid from the outlet orifice 132. Differing conditions may change that amount of flexure, and control how the system reacts. For example, colder fluid, will force the valve spring/active valve 201 open more, while hotter fluid will open the valve spring/active valve 201 less. This will accommodate the various conditions and blow by area tolerance stacks.

In one embodiment, various options exist to provide multiple stacked valve springs/active valves 201, of different shapes, to tune the response. Also, spacers/washers 171 can be employed to space the valve spring/active valve 201 from the anvil face slightly to provide a base opening 177. In one embodiment, the spacer elements can also be employed on top of the valve spring/active valve 201, and along with a similar valve spring element stacked on the washer, can modify the response after a certain amount of opening of the base valve spring. It can be very stiff element functioning as hard limiter for valve spring travel, or a less stiff element, behaving as a soft limiter of valve spring travel. The combination of elements can be varied as needed.

It should also be noted that the active valve 201 arrangement with spacer 171, flexible plate 175, valve spring limiter 173, etc. configuration could be applied to a single side of the anvil 122. In another embodiment, the active valve 201 arrangement with spacer 171, flexible plate 175, valve spring limiter 173, etc. configuration could be applied to both sides of the anvil 122.

Figure 38B:
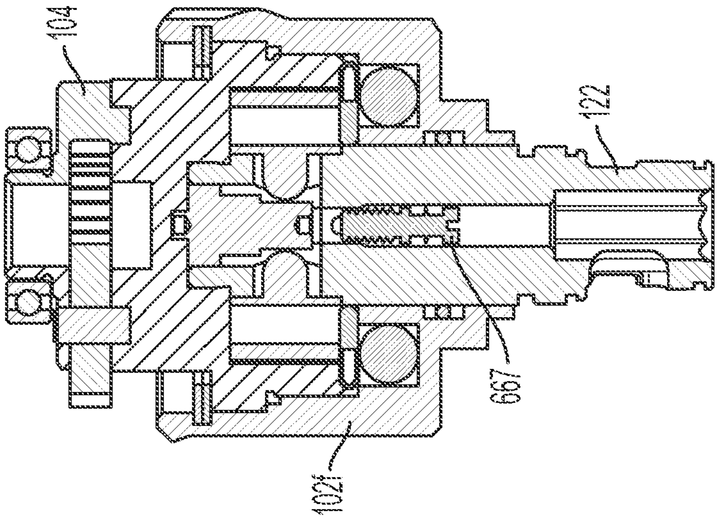
Figure 38A:
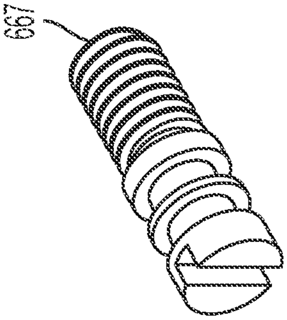
Figure 39:
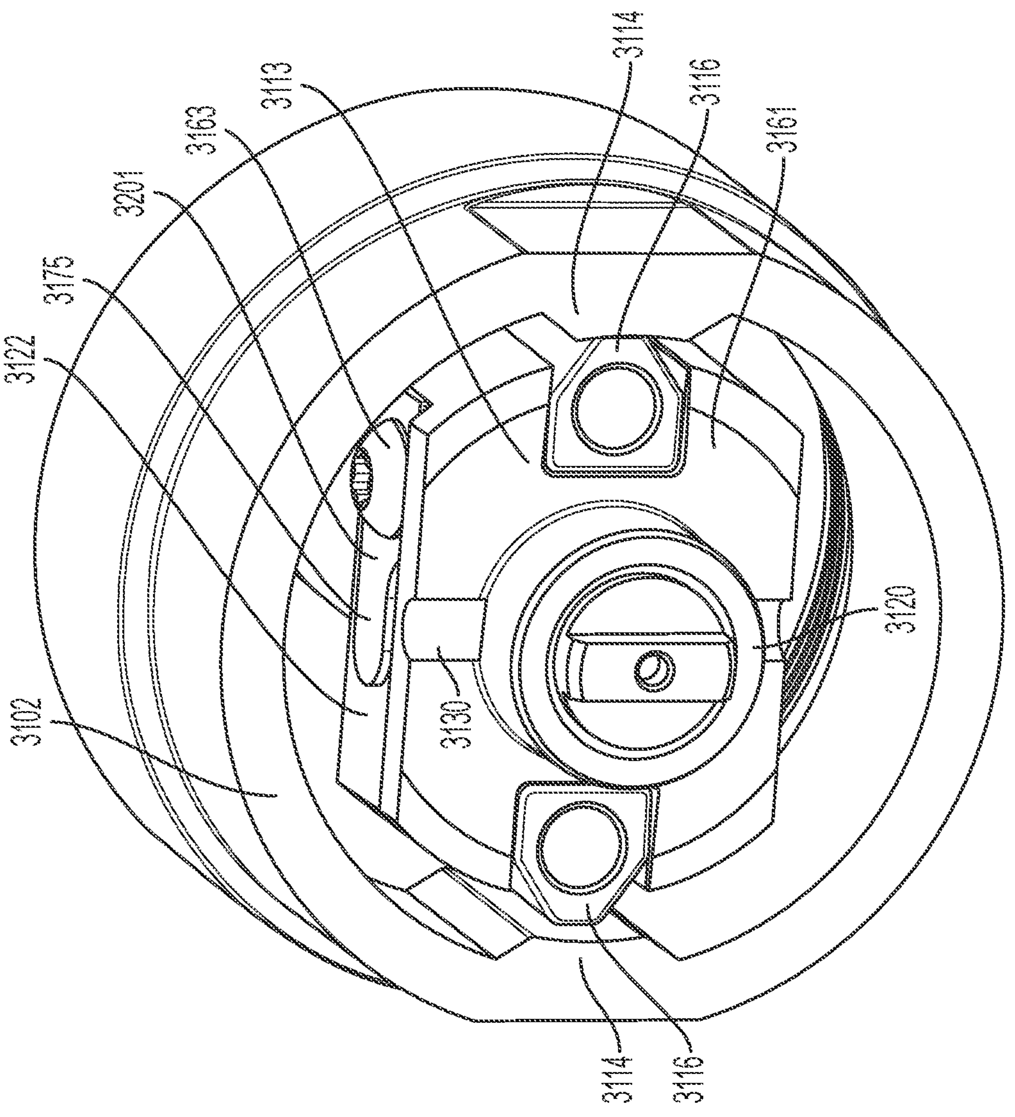
FIG. 39 shows a rear perspective view of the impact assembly showing an active valve according with another embodiment of the present patent application, wherein some portions of the impact assembly are not shown in FIG. 39 to better illustrate other portions of the impact assembly.
Figure 40:
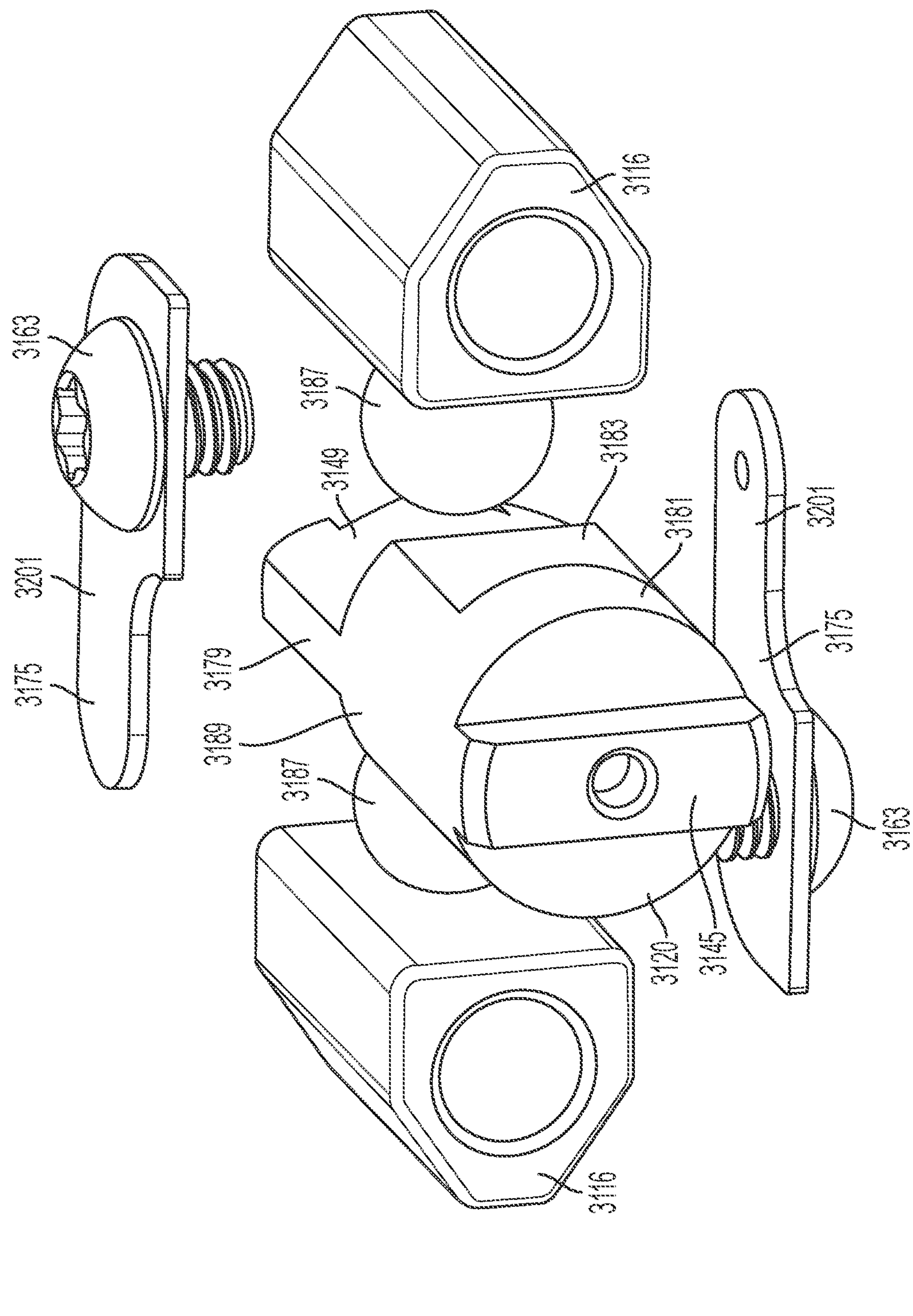
FIG. 40 shows an exploded view of the impact assembly showing the active valve, the reciprocating member(s), and the cam shaft/member according to an embodiment of the present patent application, wherein some portions of the impact assembly are not shown in FIG. 40 to better illustrate other portions of the impact assembly.
Figure 41:
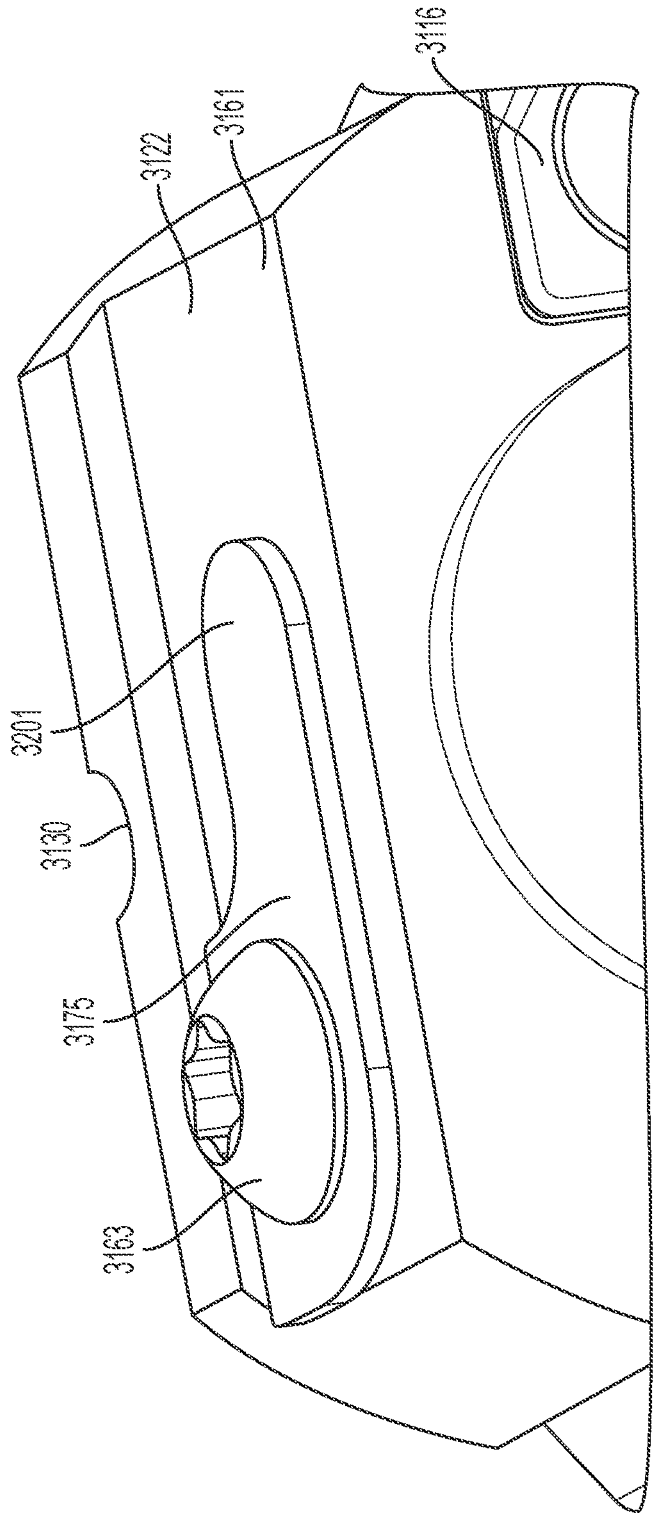
FIG. 41 shows a perspective view of the active valve of the impact assembly according to an embodiment of the present patent application.
Figure 42:
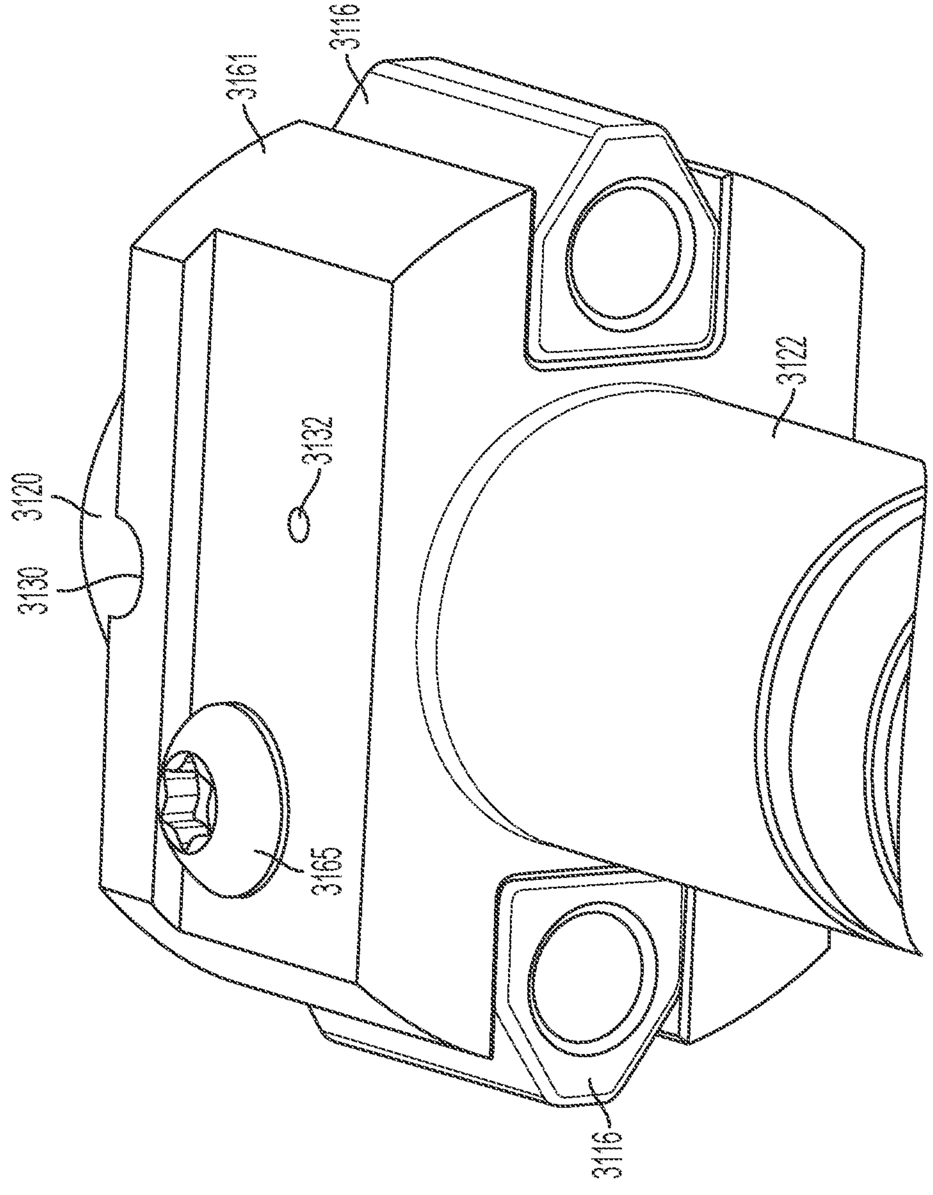
FIG. 42 shows a top perspective view of the impact assembly according with an embodiment of the present patent application, wherein some portions (such as flexible plate of the active valve) of the impact assembly are not shown in FIG. 42 to better illustrate other portions (such as outlet port/orifice) of the impact assembly.
Figure 43:
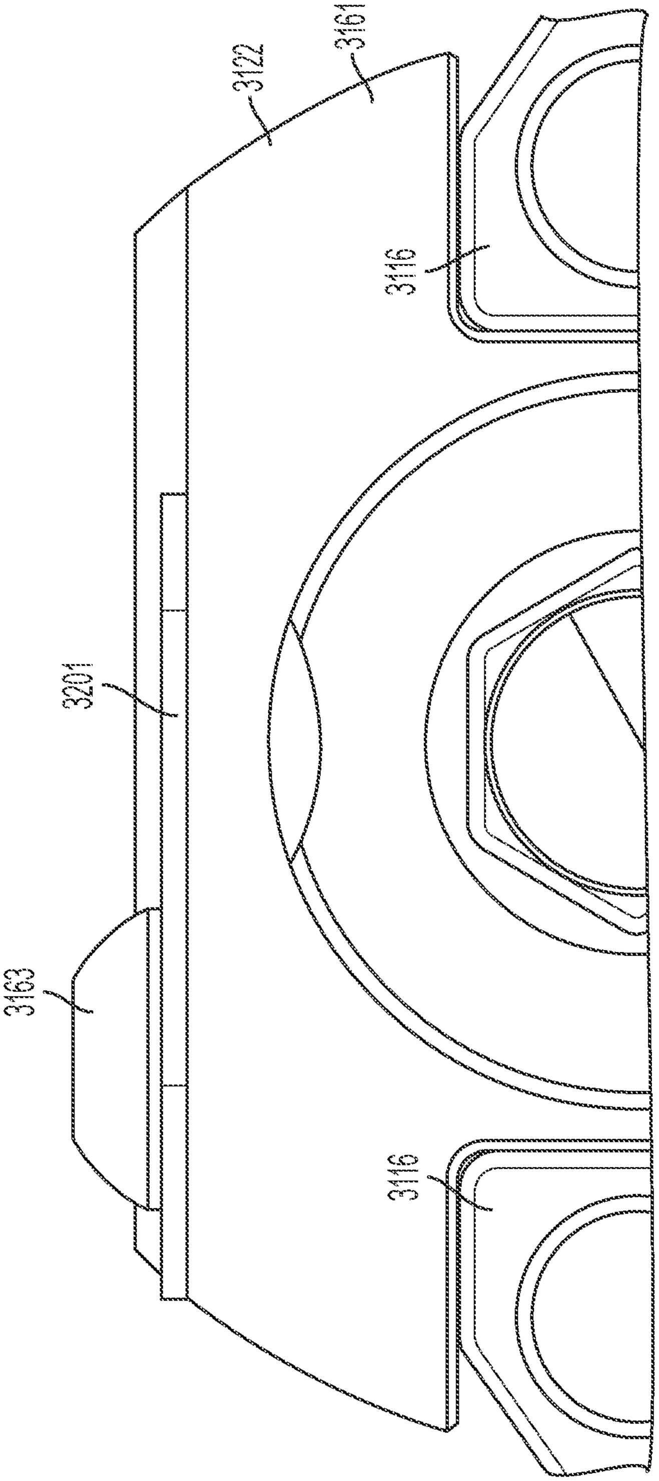
FIG. 43 shows another perspective view of the active valve of the impact assembly according to an embodiment of the present patent application.
Figure 44:
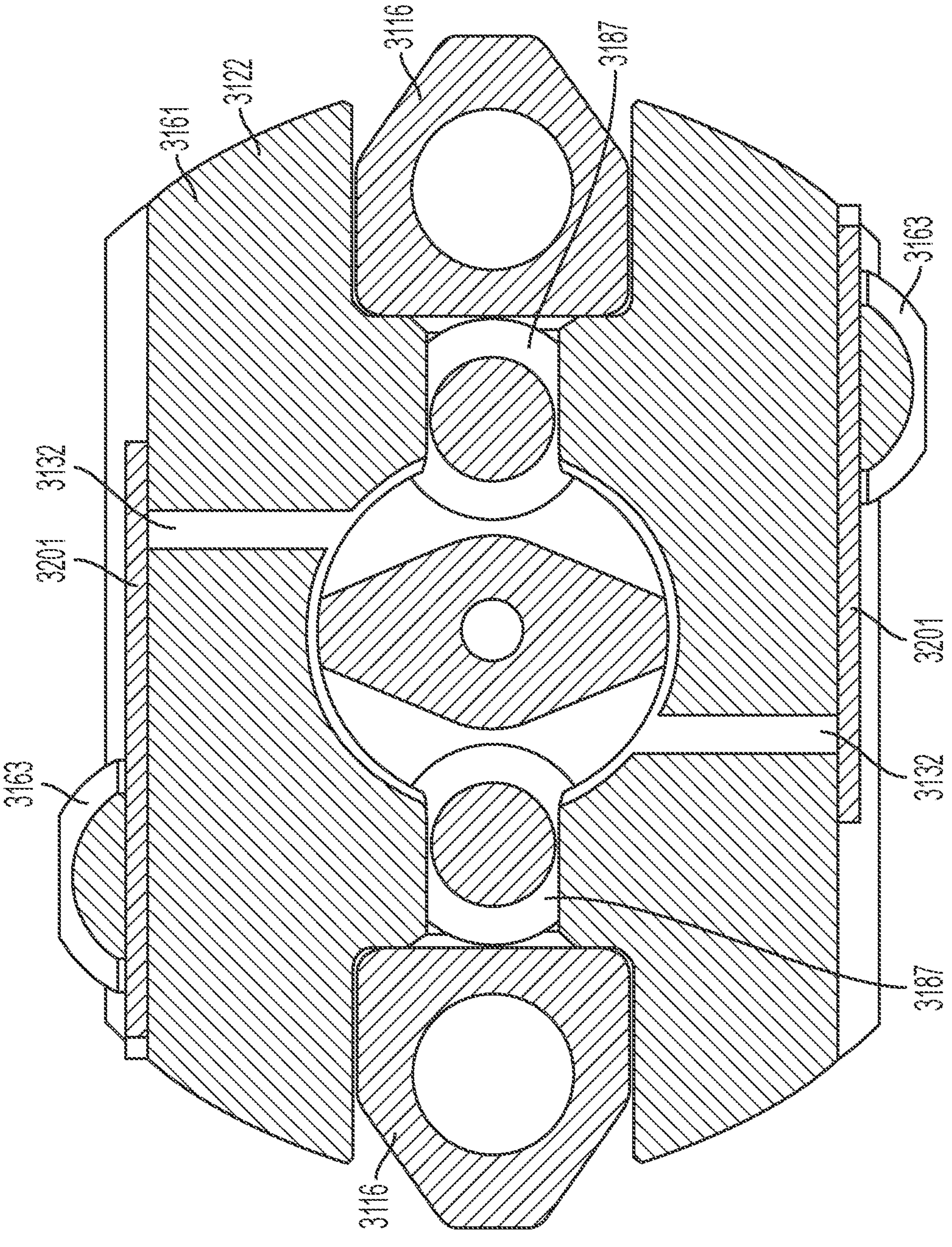
FIG. 44 shows a rear view of the impact assembly according to an embodiment of the present patent application, where
Figure 45:
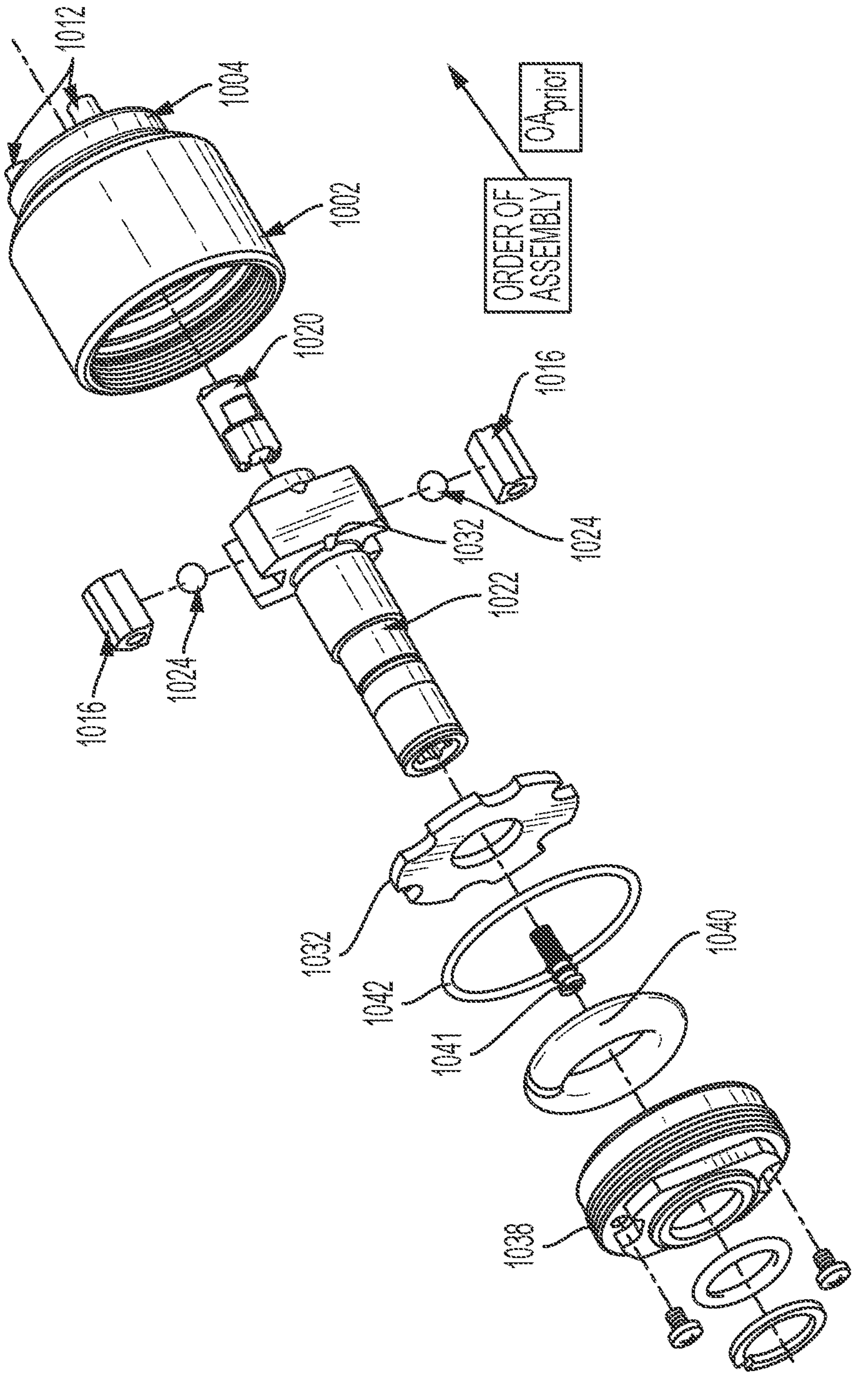
FIG. 45 PRIOR ART
FIGS. 45-48 show various views of a prior art impact assembly.
Figure 46:
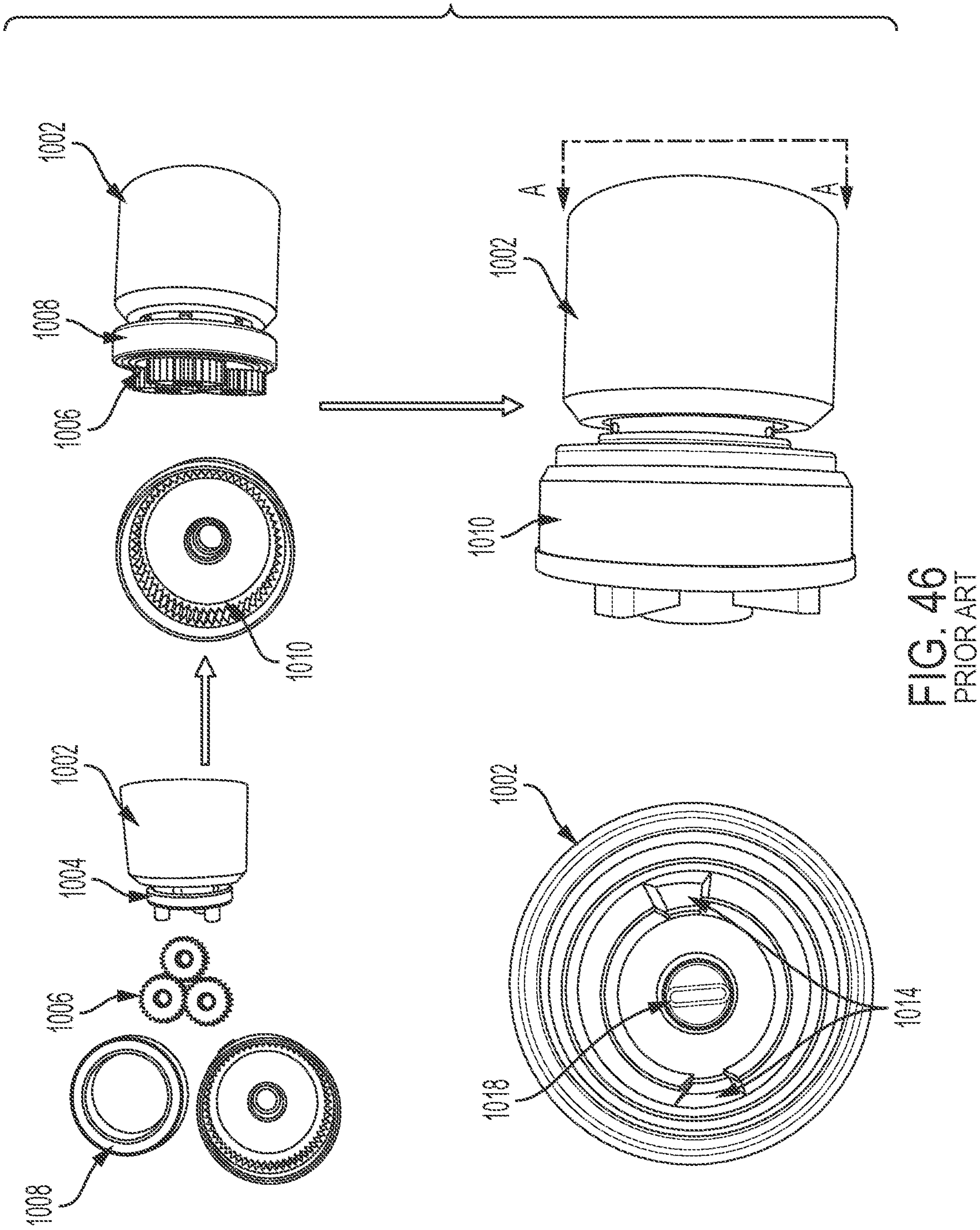
FIG. 46 PRIOR ART
Figure 47:
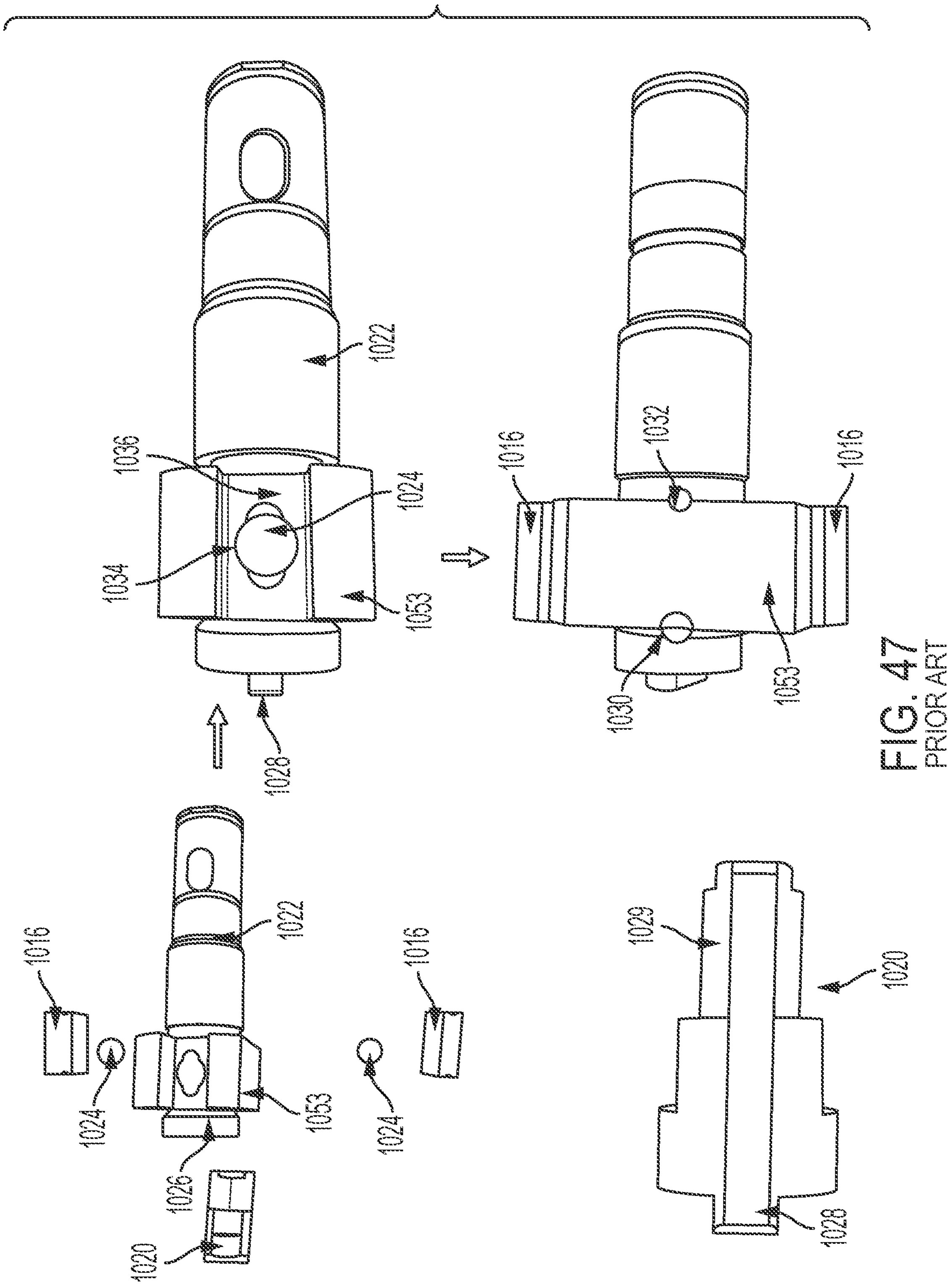
FIG. 47 PRIOR ART
Figure 48:
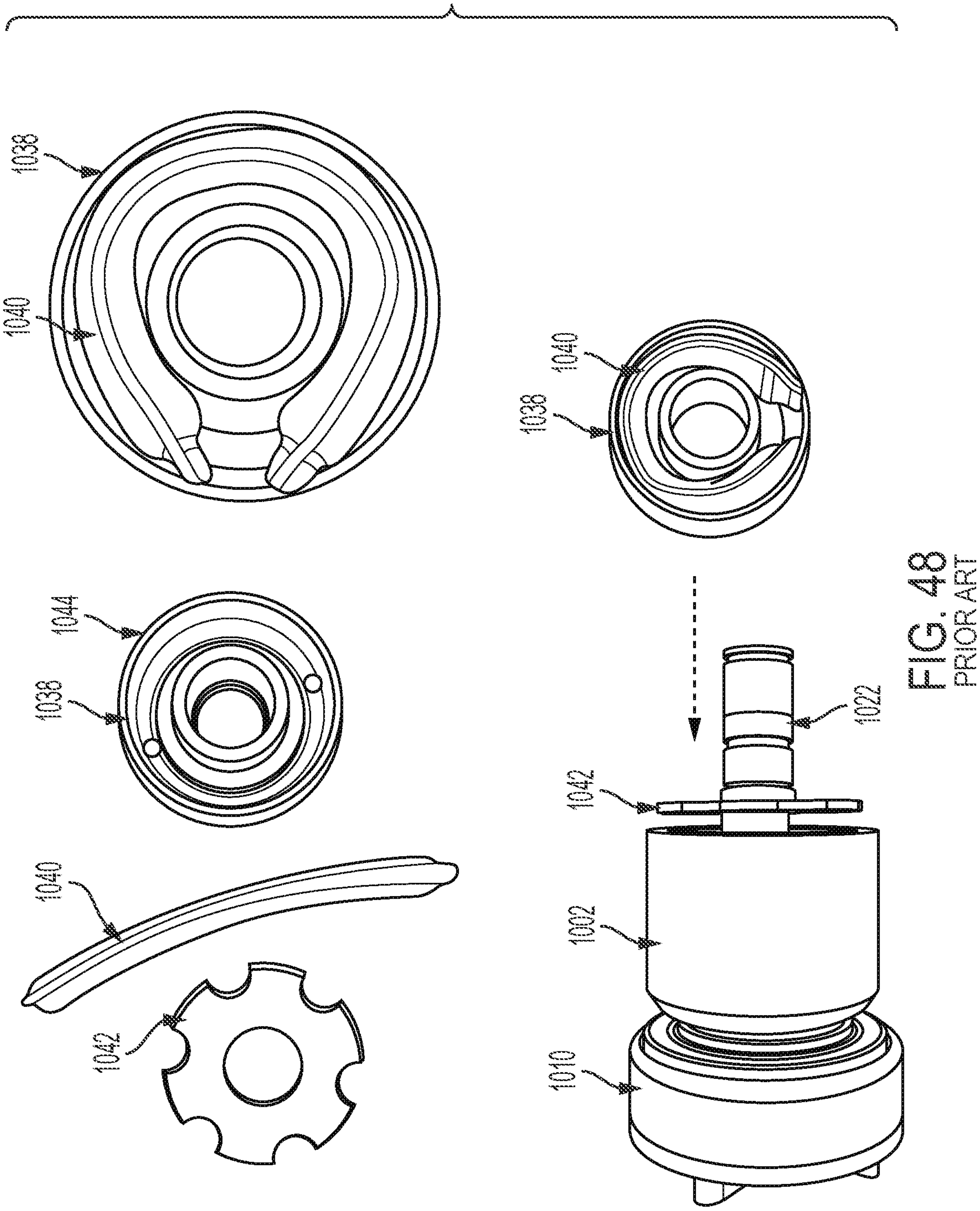
FIG. 48 PRIOR ART
Figure 49:
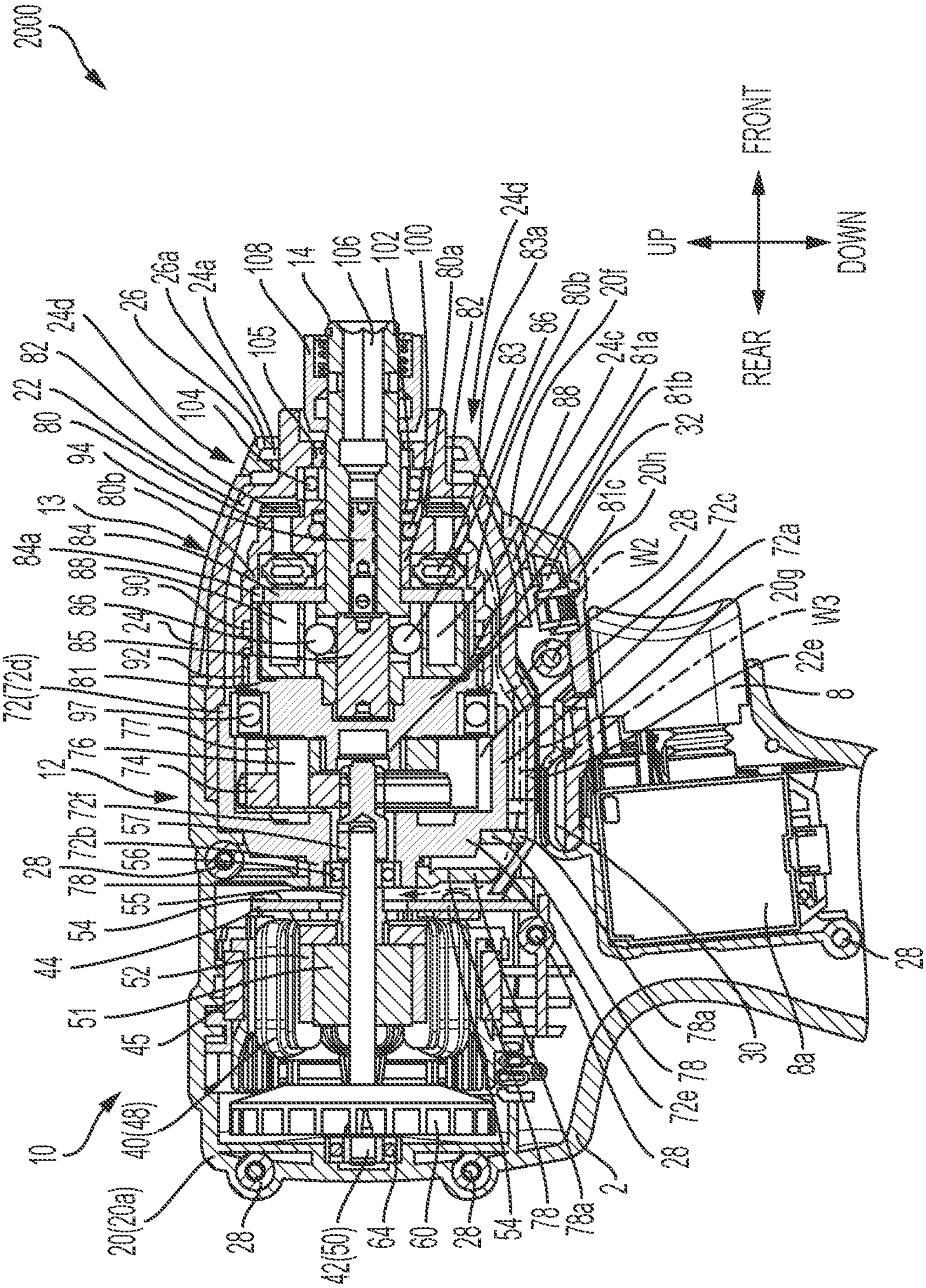
FIG. 49 PRIOR ART
FIGS. 49-53 show various views of another prior art impact assembly.
Figure 50:
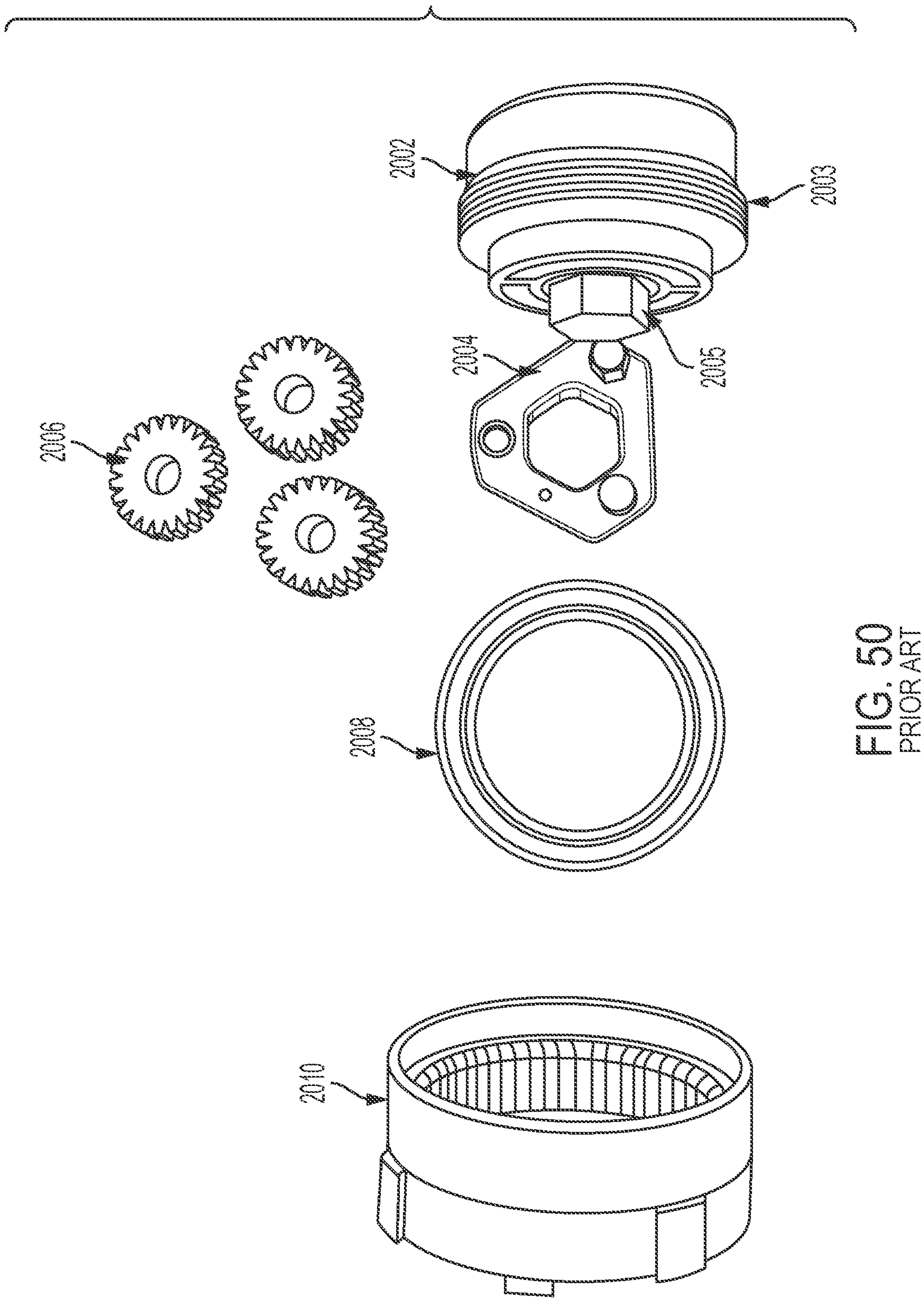
FIG. 50 PRIOR ART
Figure 51:
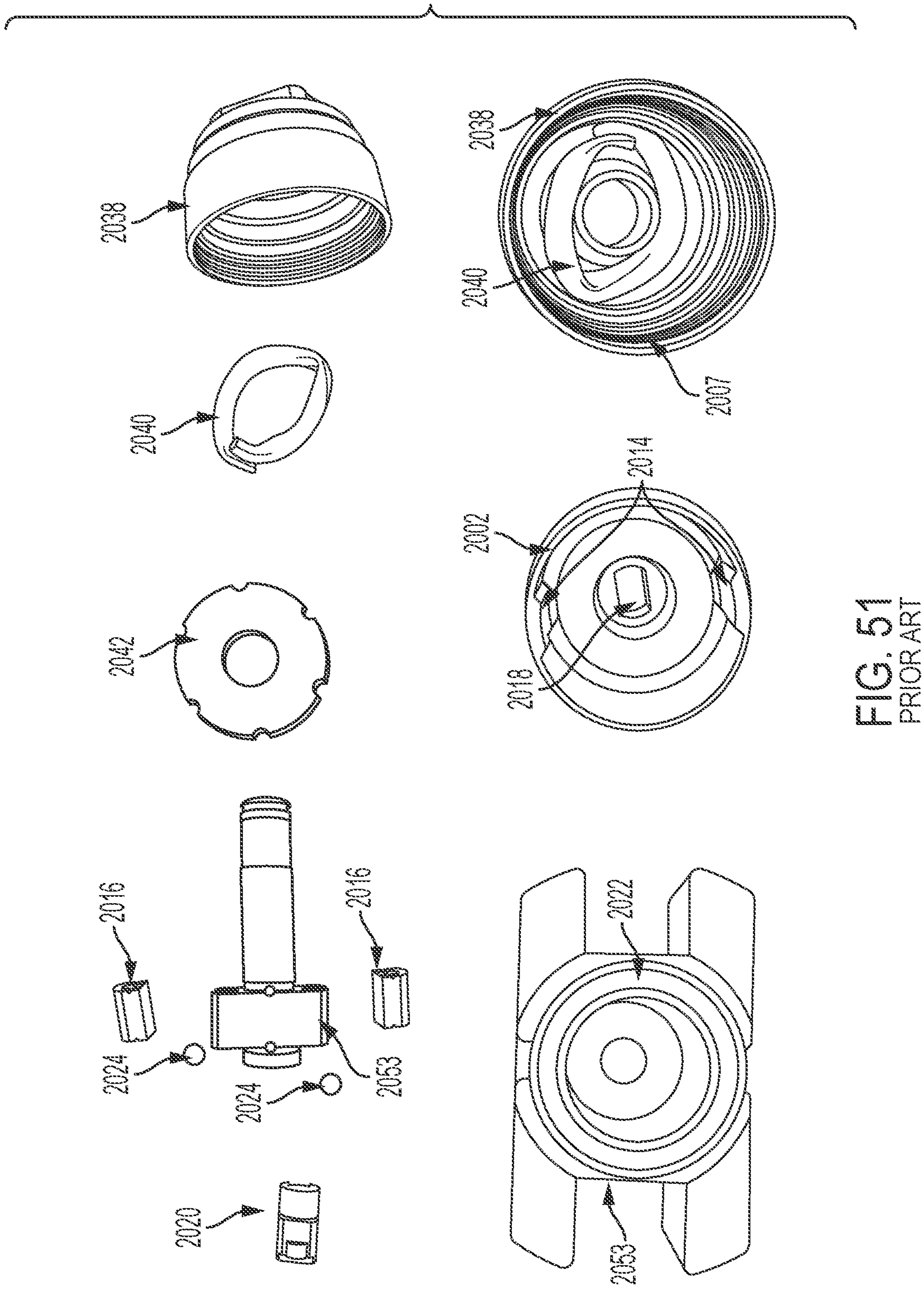
FIG. 51 PRIOR ART
Figure 52:
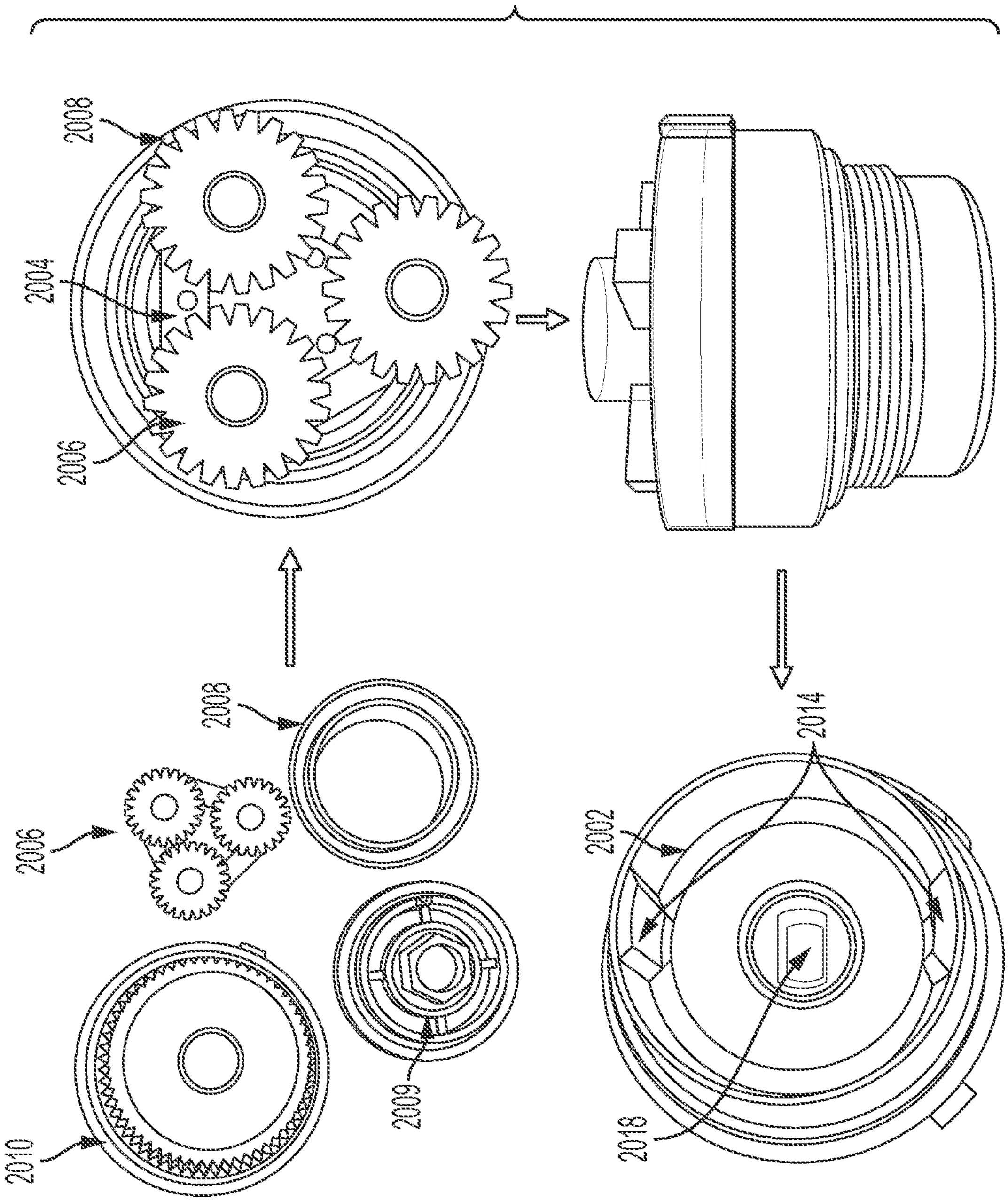
FIG. 52 PRIOR ART
Figure 53:
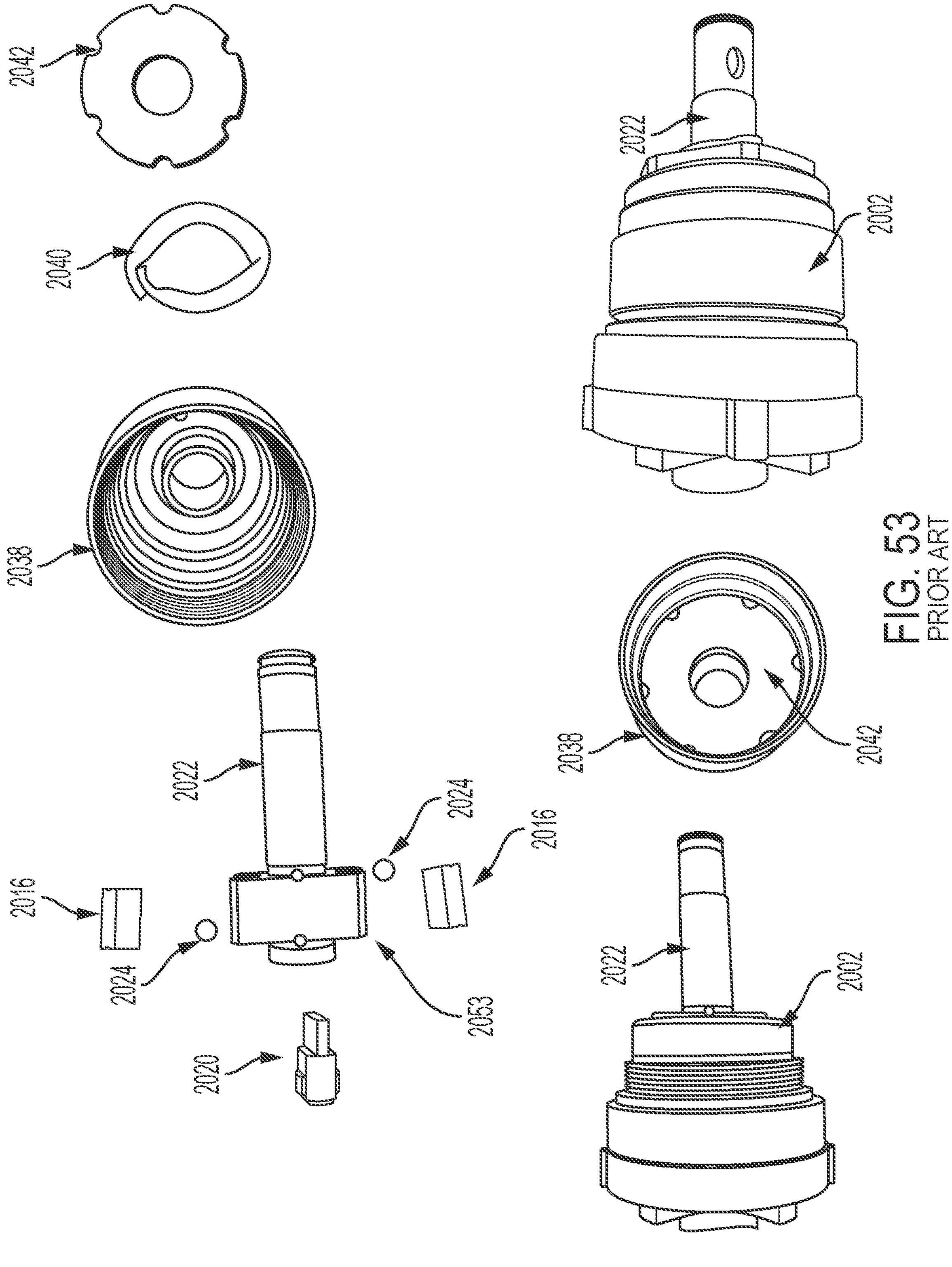
FIG. 53 PRIOR ART

In one embodiment, referring to FIGS. 38A-38B, the impact assembly 107 also includes an adjustment screw 667. The adjustment screw 667 is configured to adjust the internal pressure of the hammer chamber 111 of the hammer 102. The adjustment screw 667 is positioned in a front portion of the hammer chamber 111 of the hammer 102.

In operation, upon activation of the electric motor 105 (e.g., by depressing the trigger 119 of the power tool 100), torque from the electric motor 105 is transferred to the hammer 102 via the transmission 115, causing the hammer 102 and the cam shaft 120 to rotate in unison relative to the anvil 122 until the impact portions/members 114 on the hammer 102 impact the respective blades/reciprocating members 116 to deliver a rotational impact to the anvil 122. Just prior to the rotational impact, the inlet orifices 130 are blocked by the cam shaft 120, thus sealing the hydraulic fluid in the anvil chamber 203 at a relatively high pressure, which biases the blades/reciprocating members 116 radially outwardly to maintain the blades/reciprocating members 116 in contact with the interior surface of the hammer 102. For a short period of time following the initial impact between the impact portions/members 114 and the blades/reciprocating members 116, the hammer 102 and the anvil 122 rotate in unison to apply torque to a workpiece (e.g., a fastener) upon which work is being performed. That is, when impacting, the blades/reciprocating members 116 move radially inwardly and outwardly and are rotationally impacted by the impact members 114 on the hammer 102, which imparts rotational impacts to the anvil 122.

Figure 18B:
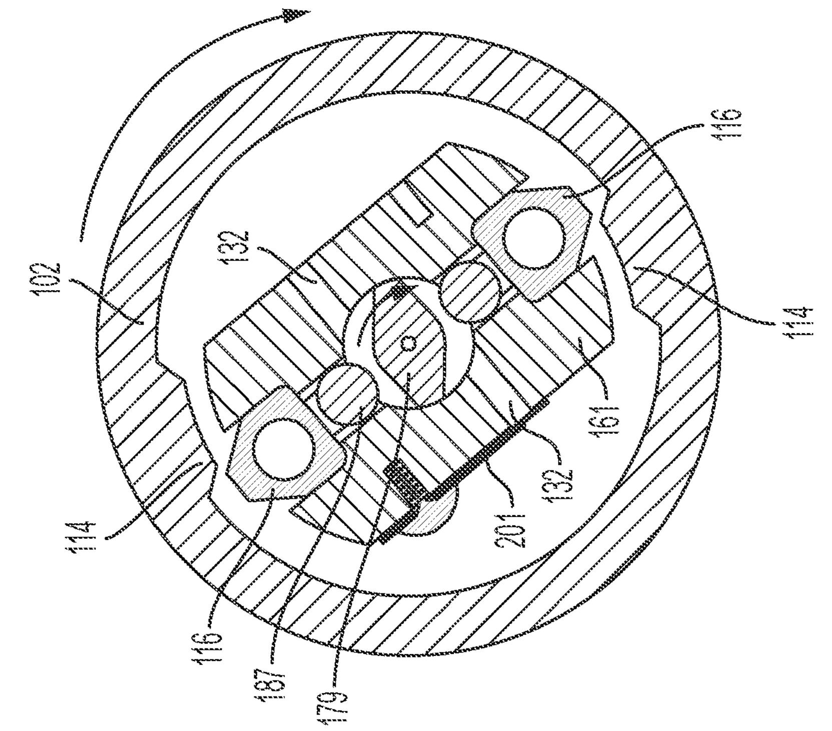
FIGS. 18A and 18B show rear views of the impact assembly according to an embodiment of the present patent application, where
Figure 18A:
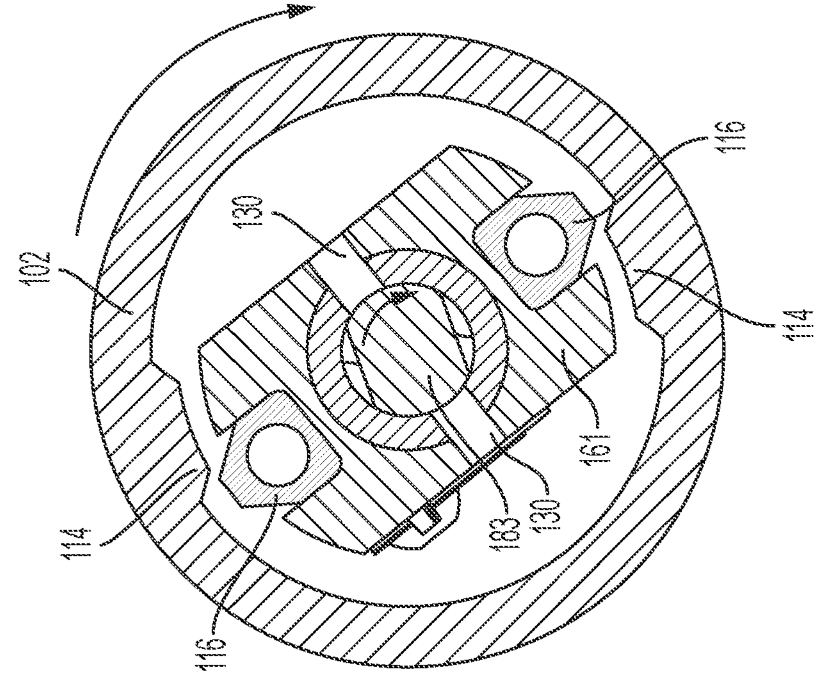

FIGS. 18A-23B show the operation of the impact assembly 107 in detail. As shown in FIGS. 18A-18B, at position 1, after resetting following a previous rotational impact, the hammer 102 and the cam shaft 120 rotate together in a clockwise direction, while the anvil 122 remains stationary and the vanes/blades 116 are in their radially inwardly position (with respect to the anvil 122). The inlet ports 130 are closed by the geometry of the intermediate portion 183 of the cam shaft 120. The outlet ports 132 are closed by the active valves 201.

Figure 19B:
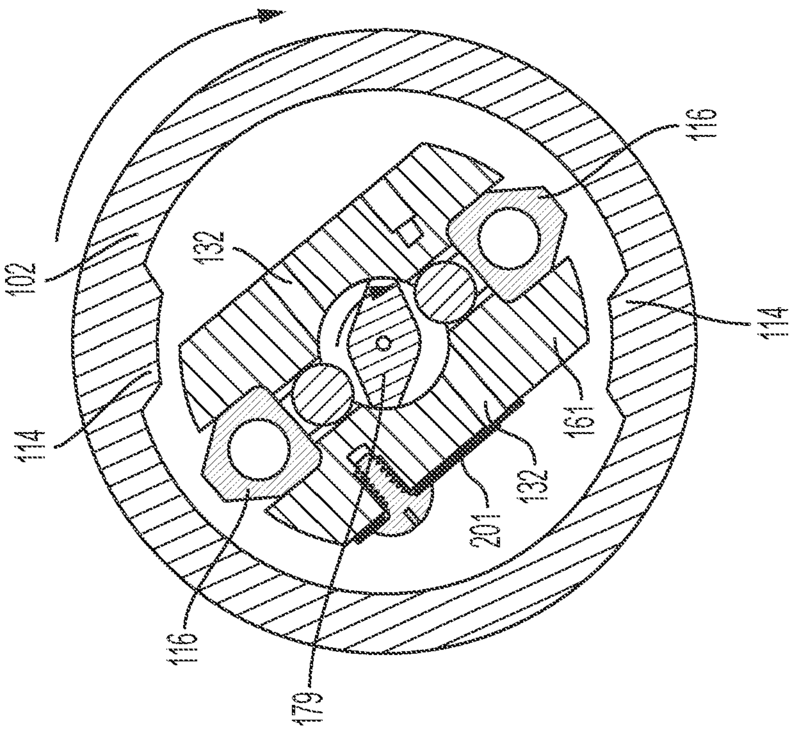
FIGS. 19A and 19B show rear views of the impact assembly according to an embodiment of the present patent application, where
Figure 19A:
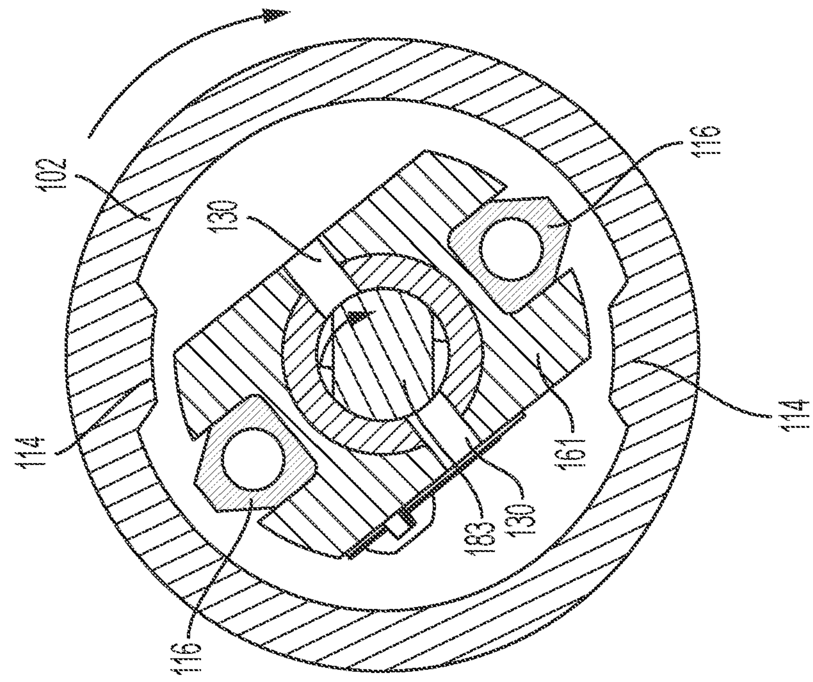

As shown in FIGS. 19A-19B, at position 2, between the rotational impacts, the hammer 102 and the cam shaft 120 continue to rotate together in a clockwise direction, while the anvil 122 remains stationary. The inlet ports 130 are partially open as the flat surfaces 185 of the intermediate portion 183 of the cam shaft 120 come into alignment with the inlet ports 130. The outlet ports 132 are still closed by the active valves 201.

Figure 20B:
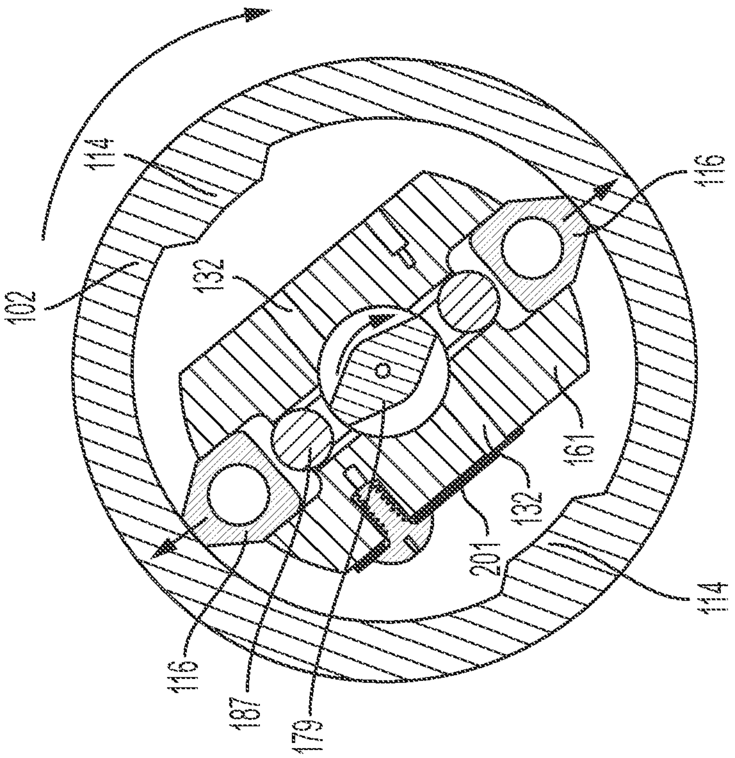
FIGS. 20A and 20B show rear views of the impact assembly according to an embodiment of the present patent application, where
Figure 20A:
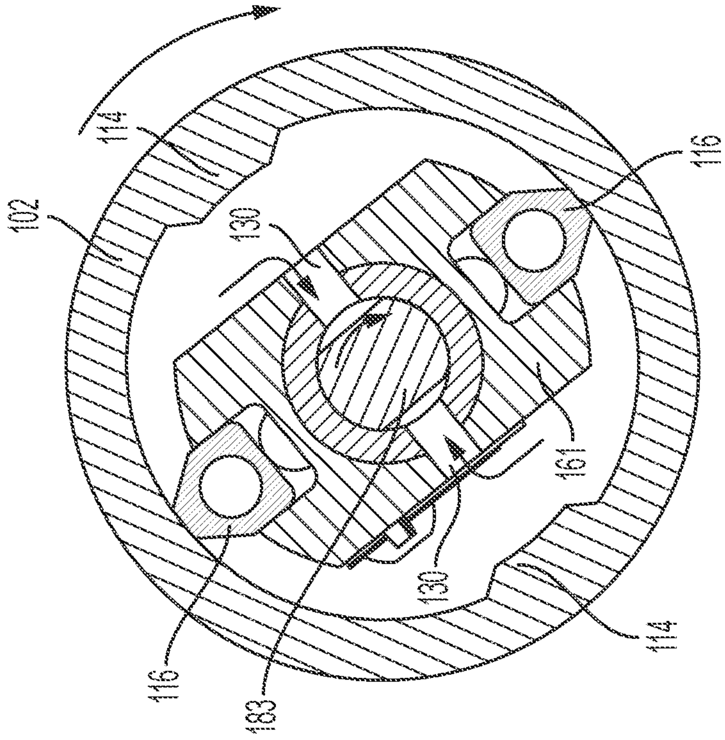

As shown in FIGS. 20A-20B, at position 3, between the rotational impacts, the hammer 102 and the cam shaft 120 continue to rotate together in a clockwise direction, while the anvil 122 remains stationary. The inlet ports 130 are fully open as the flat surfaces 185 of the intermediate portion 183 of the anvil 122 are in alignment with the inlet ports 132. The fluid flows into the anvil chamber 203 between the cam shaft 120 and the inner surface of the anvil 122, forcing the vanes/blades 116 radially outwardly into contact with the inner surface of the hammer 102. The outlet ports 132 still remain closed by the active valves 201.

Figure 21B:
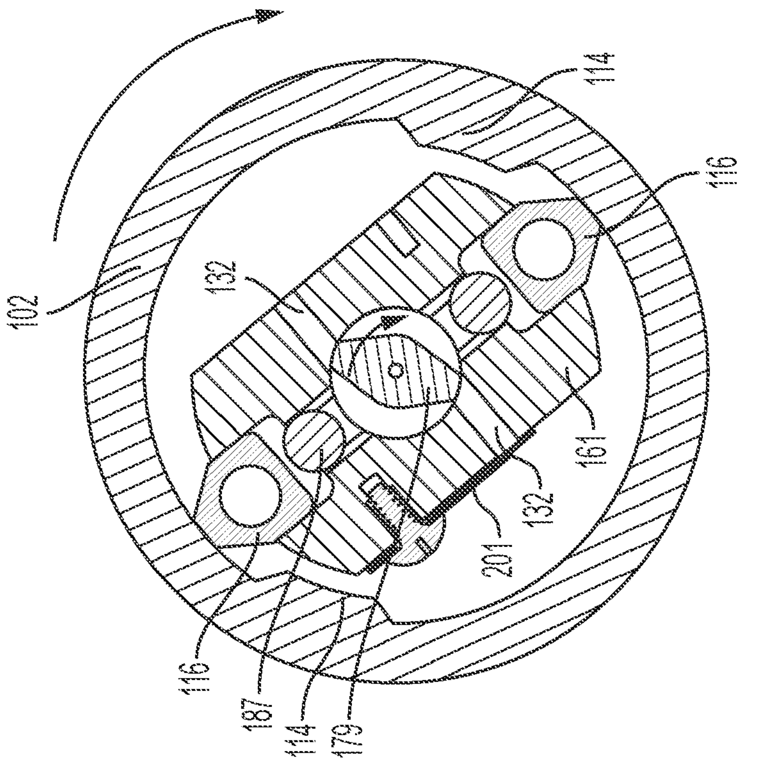
FIGS. 21A and 21B show rear views of the impact assembly according to an embodiment of the present patent application, where
Figure 21A:
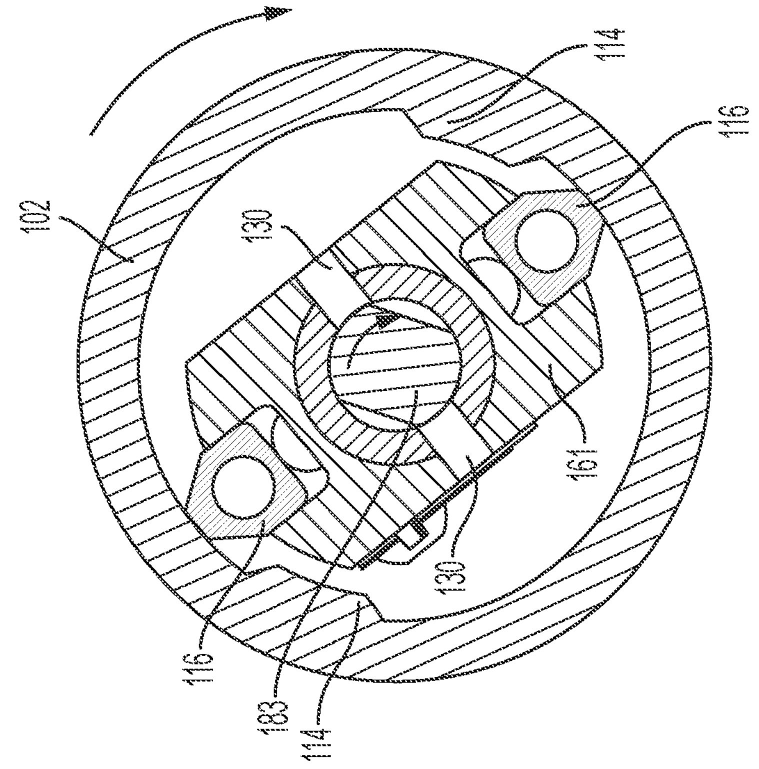

As shown in FIGS. 21A-21B, at position 4, just prior to the next rotational impact, the hammer 102 and the cam shaft 120 continue to rotate together in a clockwise direction, while the anvil 122 remains stationary. The inlet ports 130 are closed as cylindrical surfaces 189 of the intermediate portion 183 of the cam shaft 120 are in alignment with the inlet ports 130. The vanes/blades 116 remain radially outwardly and the outlet ports 132 still remain closed by the active valves 201.

Figure 22B:
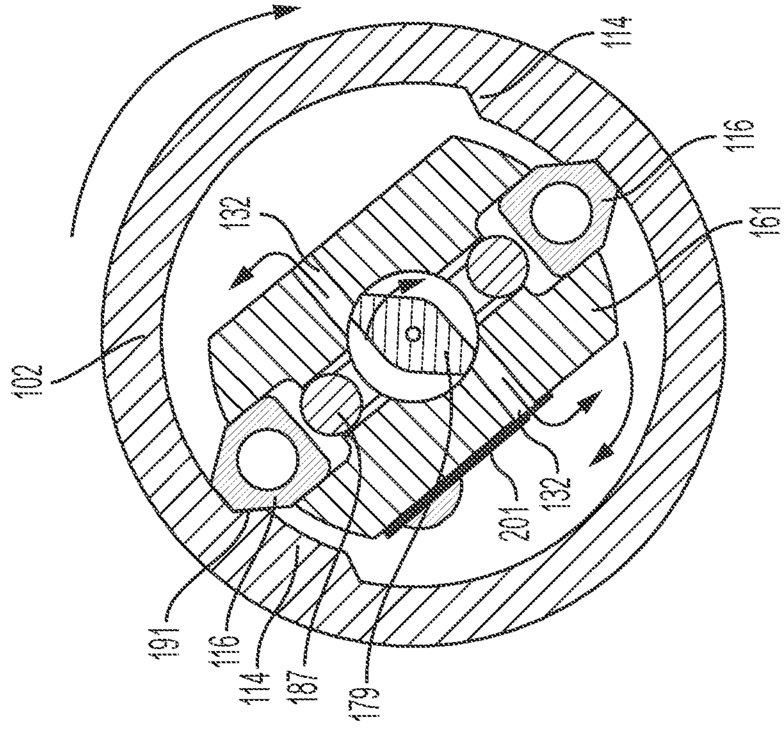
FIGS. 22A and 22B show rear views of the impact assembly according to an embodiment of the present patent application, where
Figure 22A:
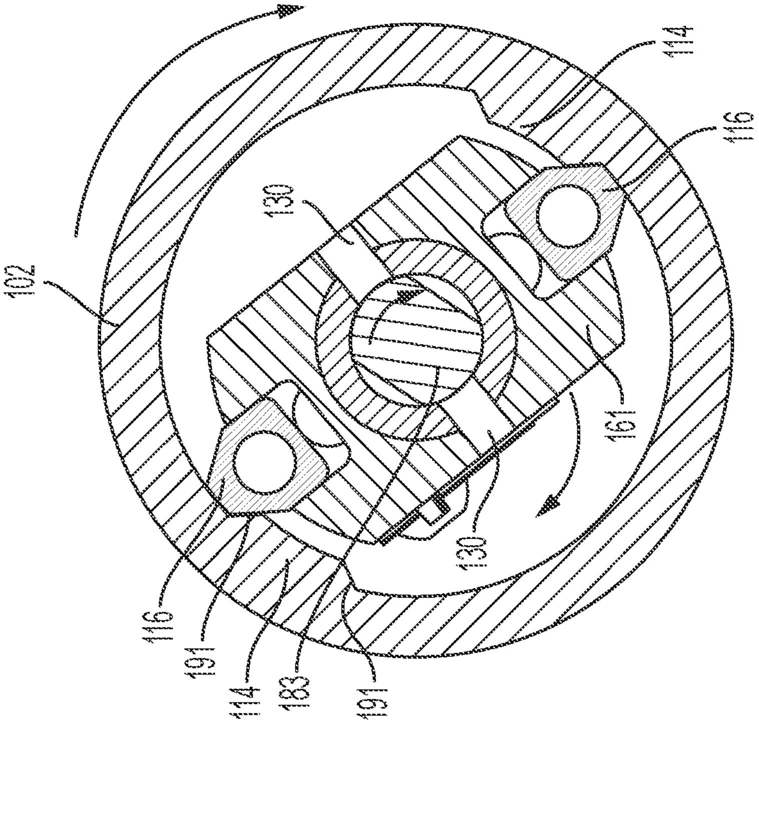

As shown in FIGS. 22A-22B, at position 5, upon the rotational impact, the hammer 102 and the cam shaft 120 rotate together in a clockwise direction causing angled surfaces 191 of the lugs/impact members 114 of the hammer 102 to strike the vanes/blade 116. The force of this strike causes the anvil 122 to rotate in the clockwise direction. The inlet ports 130 remain closed by the cylindrical surfaces 189 of the intermediate portion 183 of the cam shaft 120. The outlet ports 132 remain closed by the active valves 201.

Figure 23B:
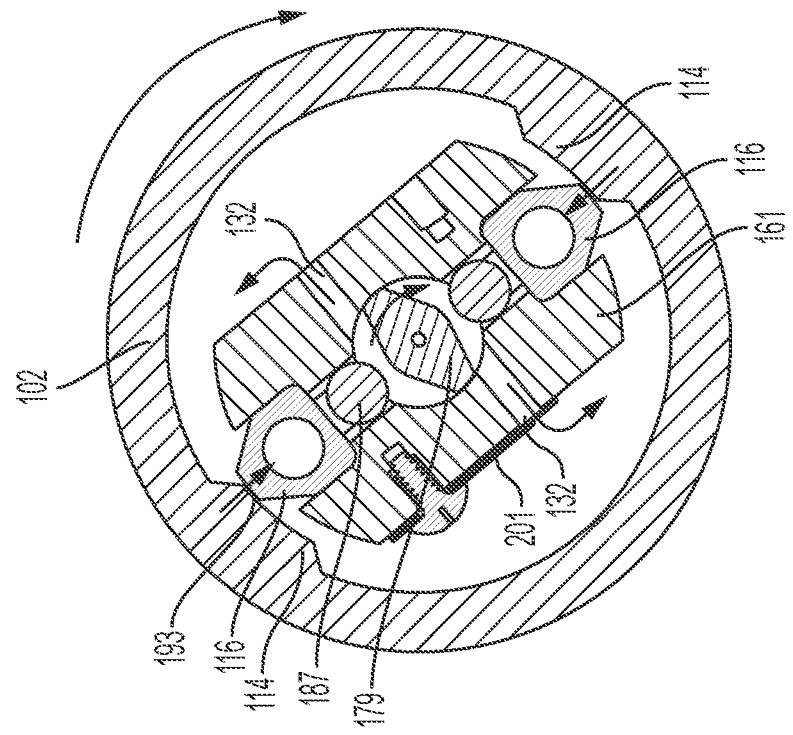
FIGS. 23A and 23B show rear views of the impact assembly according to an embodiment of the present patent application, where
Figure 23A:
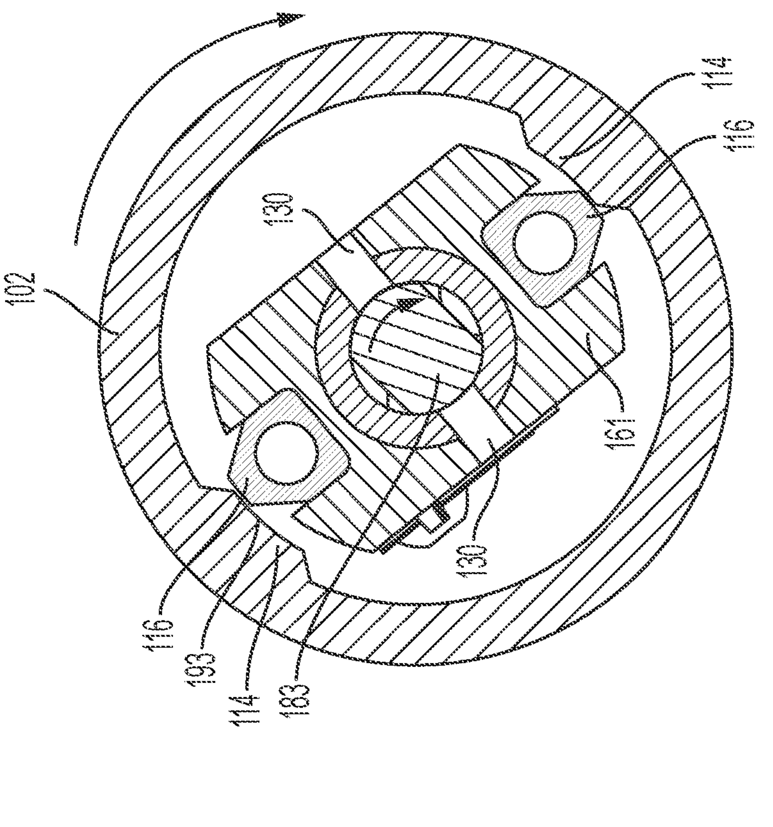
Figure 24:
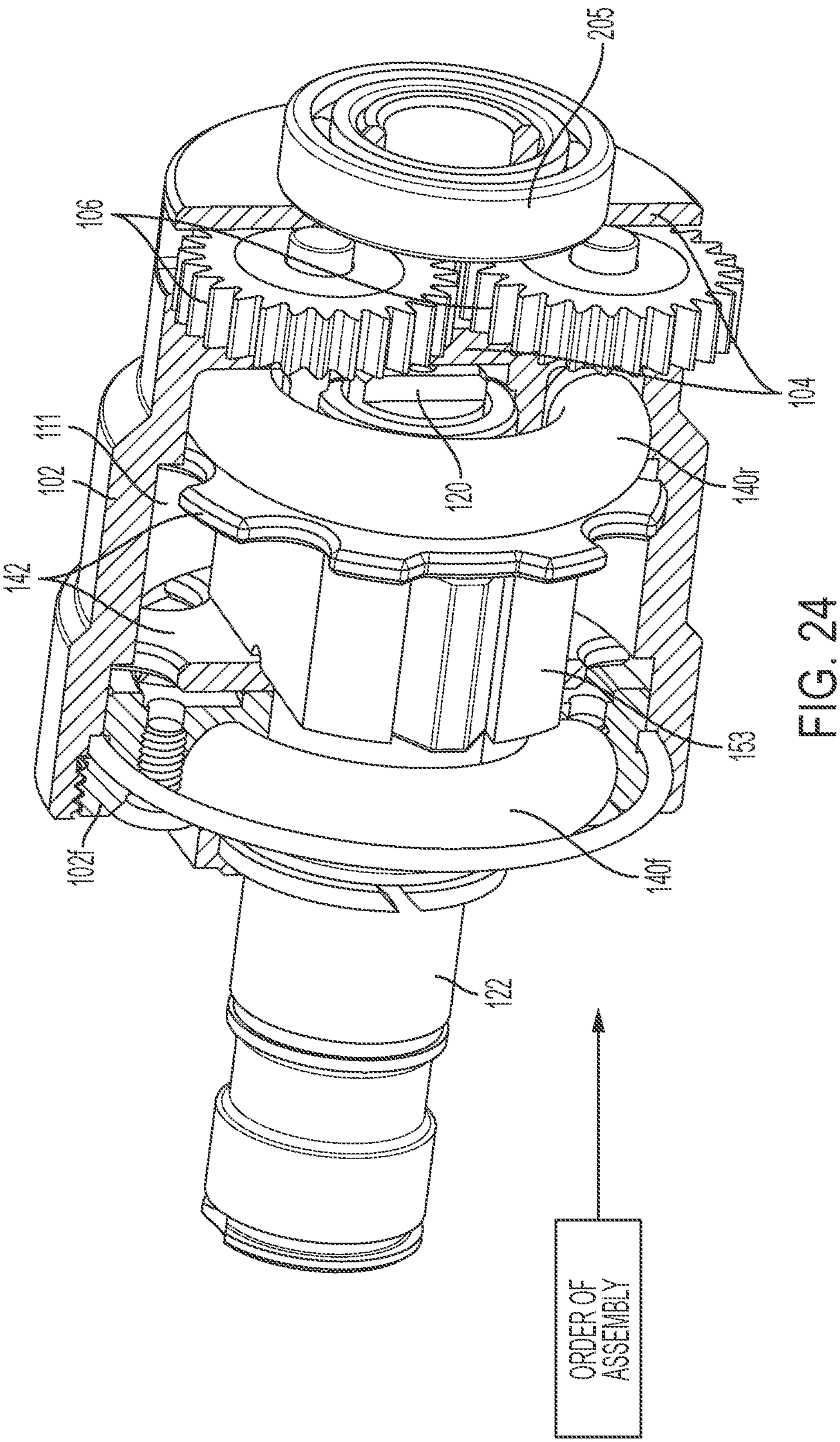
FIGS. 24-25 show perspective views of the impact assembly (with foam members and foam member containment disks) according to embodiments of the present patent application, where some portions of the impact assembly are not shown in FIGS. 24-25 to better illustrate other portions of the impact assembly.
Figure 25:
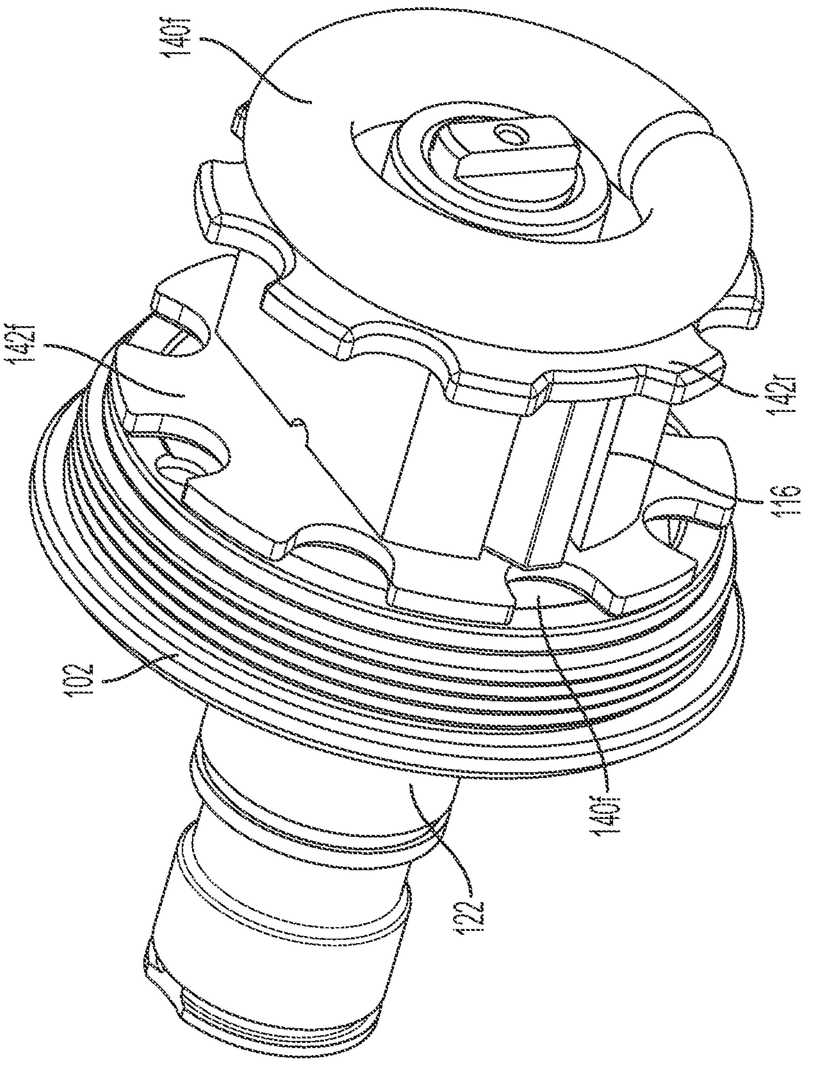

As shown in FIGS. 23A-23B, at position 6, immediately after the rotational impact, the hammer 102 and the cam shaft 120 rotate together in a clockwise direction past the anvil 122, which slows to a stop due to the drag force of the fluid. Flat surfaces 193 of the hammer lugs 114 push the vanes/blade 116 radially inwardly, which forces fluid out of the anvil chamber 203 between the cam shaft 120 and the inner surface of the anvil 122. The fluid is forced into the outlet ports 132, and the active valves 201 at least partially open to allow the fluid to flow out of the outlet ports 132.

The active valves 201 are configured to open a larger amount at low temperatures when the fluid is more viscous and a lesser amount at high temperatures when the fluid is less viscous so that the impact assembly operates similarly regardless of temperature.

In one embodiment, the impact assembly 107 is configured to operate in a temperature range between −30° C. and 215° C. over which the impact assembly 107 can operate without stall. In one embodiment, the −30° C. to 215° C. temperature range is for the oil inside the impact assembly. The impact assembly is configured to operate with the fluid in a temperature range between −30° C. and 215° C. without stall of the impact assembly. The impact assembly is configured to operate in an environment having an ambient temperature range between −30° C. and 50° C. without stall of the impact assembly.

Figure 8:
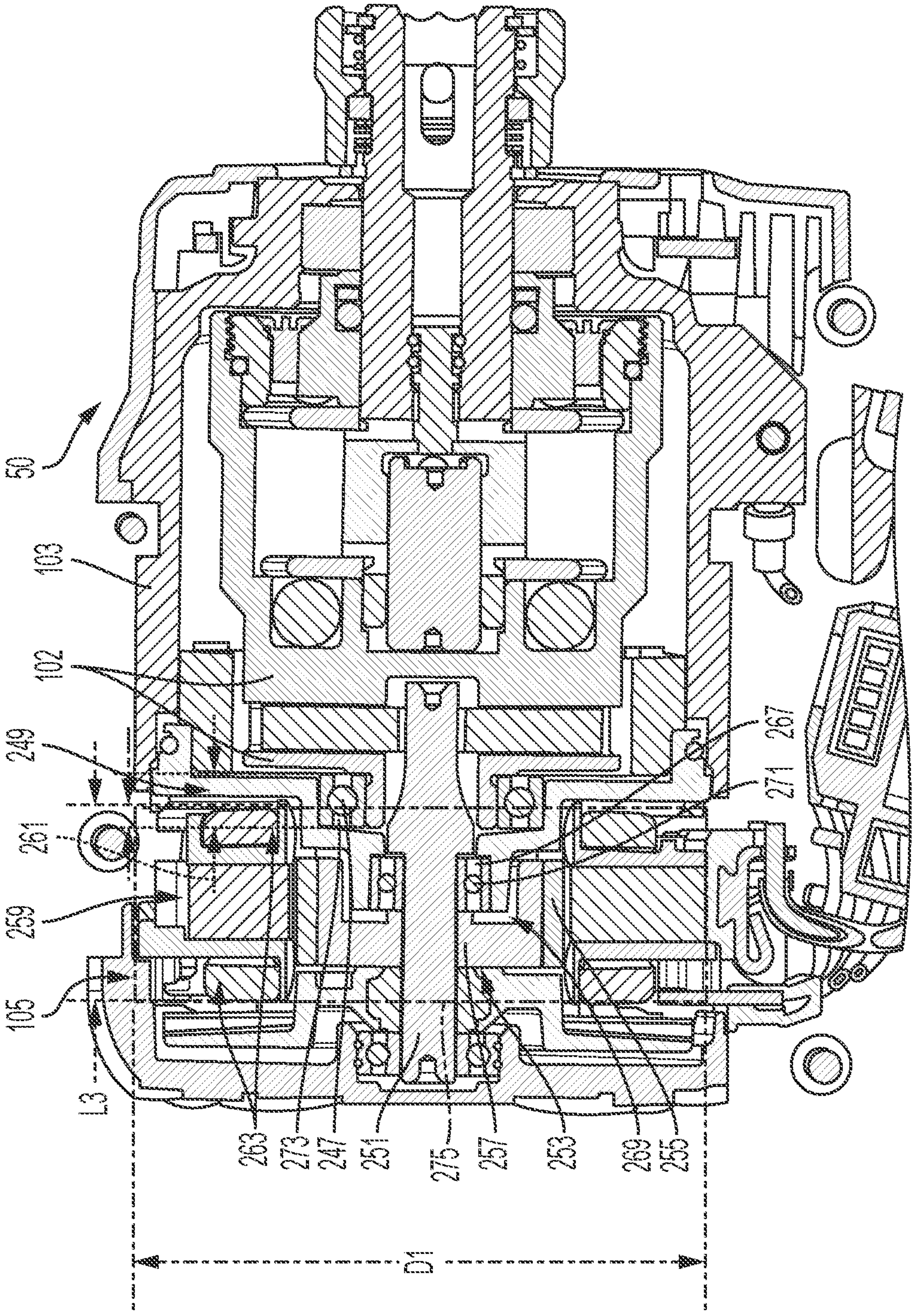
Figure 9:
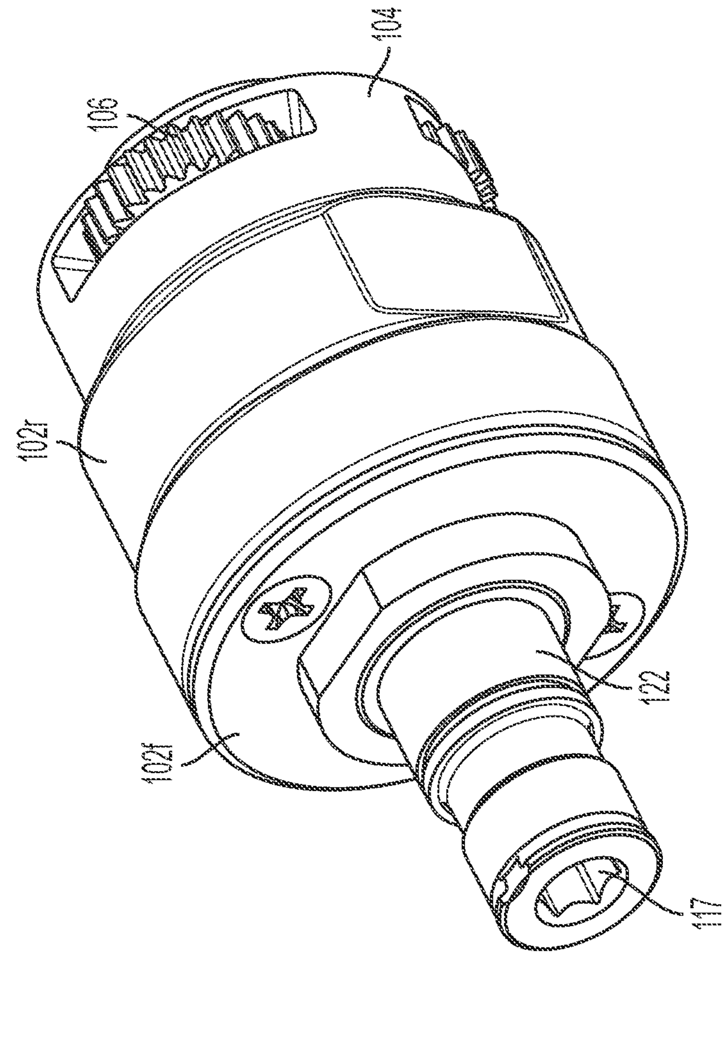
FIG. 9 shows an assembled view of the impact assembly, the bit holder assembly and some portions of the transmission assembly of the power tool according to an embodiment of the present patent application.

In one embodiment, the overall length of the power tool 100 is much shorter than other existing/prior art oil pulse impact driver. This is achieved because the power tool 100 uses a compact motor assembly similar to the one illustrated in FIGS. 4-5 of U.S. Patent Application Publication No.: 2021/0187707 ("the '707 Publication"), which is incorporated by reference in its entirety. Some of the features (i.e., other than the impact assembly 107) of this embodiment are described in detail in the '707 Publication, and, hence, will not be described here. FIG. 8 shows the embodiment of the present patent application in which the overall length of the power tool 100 is much shorter than other existing/prior art oil pulse impact driver. FIG. 8 of the present patent application is different from the '707 Publication as it shows the hammer cylinder 102 and its rear hammer cylinder bearing 247. As will be clear from the discussions in detail below, by using the rear mechanism bearing 247 of an outer diameter (OD) that is smaller than the inner diameter (ID) of the laminations, the rear bearing portion 247 of the hammer cylinder 102 can be partially nested within the motor 105. This reduces the axial footprint of the power tool 100

Referring to FIG. 8, the power tool 100 comprises the housing 103 having a rearward end portion and a forward end portion; the brushless motor 105 received in the housing 103, a rotor shaft 251 extending along a rotor axis and coupled to and configured to be rotatably driven by rotation of a rotor 253, and the impact assembly 107 operatively coupled with the motor 105 and configured to be driven thereby.

The motor 105 includes the rotor 253 configured to rotate about the rotor axis and a stator 259 having a stator core 261 and conductive windings 263. The motor assembly 105 includes a rotor shaft 251, and the inner rotor 253 mounted on the rotor shaft 251 having a surface-mount magnet ring 255 on a rotor core 257. The stator assembly 259 located around the rotor 253. The stator assembly 259 includes the stator core 261, a series of stator teeth 265 radially projecting inwardly from the stator core 261, and the series of conductive windings 263 wound around the stator teeth 265 to define three phases connected in a wye or a delta configuration.

The motor 105 defines a motor envelope 275 bounded by a rear plane at a rearmost point of the stator 259 and the rotor 253, a front plane at a frontmost point of the stator 259 and the rotor 253, and a generally cylindrical boundary extending from the rear plane to the front plane and surrounding a radially outermost portion of the stator 259 and the rotor 253.

The power tool 100 further comprises a first bearing 271 configured to support the rotor shaft 251 and at least partially received within the motor envelope 275, and a second bearing 247 configured to support the hammer 102 of the impact assembly 107 and at least partially received within the motor envelope 275.

The power tool 100 further comprises a support plate 249 configured to support a portion of the hammer 102 of the impact assembly 107. The support plate 249 is held non-rotatably relative to the housing 103 and has a rearward portion at least partially nested within the stator 259. At least a portion of the rearward portion of the support plate 249 is at least partially received within the rotor 253. At least a portion of the first bearing 271, at least a portion of the second bearing 247, and at least a portion of the support plate 249 are received within the motor envelope 275. The support plate 249 includes a nested portion that is at least partially received within the motor envelope 275. The nested portion of the support plate 249 supports at least one of the first bearing 271 and the second bearing 247. The nested portion of the support plate 249 is at least partially received within a recess in the rotor 253. The first bearing 271 is received at least partially within a recess in the rotor 253.

The support plate 249 includes a first bearing pocket 267 formed as a cylindrical or rim-shaped projection from a radial portion for supporting at least the front motor bearing 271. The first bearing pocket 267 of the support plate 249 at least partially projects into and is received within an annular recess 269 of the rotor 253. This allows the front bear motor bearing 271 to be received at least partially within the stator assembly 259 and within an envelope of the rotor core 257 defined by the radial surfaces of the rotor core 257.

The support plate 249 further includes a second bearing pocket 273 for supporting the rear hammer cylinder bearing 247. The rear hammer cylinder bearing 247 is received within the second bearing pocket 273 so that it is at least partially nested within the stator assembly 259 along a radial plane that intersects the front ends of the stator windings 263. In an embodiment, the motor assembly 105 defines the motor envelope 275 bounded by a rear plane at a rearmost point of the motor assembly 105 (i.e., at the rearmost point of the stator assembly 259), a front plane at a frontmost point of the motor assembly 105, and a generally cylindrical boundary extending from the rear plane to the front plane and surrounding a radially outermost portion of the motor assembly 105 (e.g., a radially outermost portion of the stator assembly 259).

At least a portion of the front motor bearing 271, at least a portion of the rear hammer cylinder bearing 247, and at least a portion of the support plate 249 are received within the motor envelope 275. This nesting of the front motor bearing 271 and the rear hammer cylinder bearing 247 at least partially within the motor envelope 275 and with the stator assembly 259 reduces the overall length of the power tool 100 without sacrificing output power.

The motor envelope 275 has a length, $L_3$ from the rear plane to the front plane of approximately from 20 mm to 31 mm. The motor envelope 275 has a length, $L_3$ from the rear plane to the front plane of approximately 25.7 mm. A diameter, $D_1$ of the cylindrical boundary of the motor envelope 275 is approximately from 45 mm to 56 mm. A diameter, $D_1$ of the cylindrical boundary of the motor envelope 275 is approximately 51 mm. The motor envelope 275 has a volume of approximately from 31 $cm^3$ to 77 $cm^3$. The motor envelope 275 has a volume of approximately 52.5 $cm^3$.

In one embodiment, the overall length (i.e., along the longitudinal axis L-L) of the power tool 100 (i.e., tool housing 103) from rear end of the motor envelope 275 to a front end of output shaft 109 is in the range of approximately 89 mm to 115 mm. In one embodiment, the girth (i.e., circumference) of the power tool 100 is in the range of approximately 152 mm to 216 mm.

In one embodiment, the rear bearing portion 247 of the hammer cylinder 102 is located rearward of the planet gears 106 and nested partially within the motor 105. Locating the rear bearing 247 that supports the mechanism in a way that minimizes overall length of the power tool 100. By utilizing this motor construction, the rear mechanism bearing 247 is located partially within the axial space claim of the motor 105, which reduces overall length compared to a system where the rear bearing is of a diametrical size that cannot fit inside the inner diameter (ID) of the laminations. By using the rear mechanism bearing 247 of an outer diameter (OD) that is smaller than the inner diameter (ID) of the laminations, the rear bearing portion 247 of the hammer cylinder 102 can be partially nested within the motor 105. This reduces the axial footprint of the power tool 100.

In one embodiment, as shown in FIGS. 4-7, the hammer 102 comprises the rear hammer cylinder **102*r* that is integral with the planet carrier 104. The hammer 102 also includes the front hammer cylinder cap 102*f* that has a smaller diameter than the rear hammer cylinder 102*r* and that is coupled to the rear hammer cylinder 102*r* by a threaded connection (e.g., outer threaded portions of the front hammer cylinder cap 102*f* engaging the inner threaded portions of the rear hammer cylinder 102*r*). This configuration of the hammer 102 enables that the hammer 102 and its internal components be assembled from rear to front (see the order of assembly shown by the arrow in FIG. 5), starting with the rear hammer cylinder 102*r*, then inserting the anvil 122, the blades 116, the cam shaft 120, and the foam member 140 into the rear hammer cylinder 102*r*, filling the hammer 102 with the oil/fluid, and then capping the hammer 102 by threadably attaching the front hammer cylinder cap 102*f* to the front end of the rear hammer cylinder 102*r*. In this embodiment, the front hammer cylinder 102*f* (i.e., having smaller diameter than the rear hammer cylinder 102*r* and also having shorter axial length than the rear hammer cylinder 102*r*) is referred to as the front hammer cylinder cap 102*f*. In this embodiment, the hammer 102 and its internal components are received in the rear hammer cylinder 102*r***.

In another embodiment, as shown in FIGS. 2, 3 and 36A-36B, the rear hammer cylinder **102*r* (which is formed integrally with the planet carrier 104) forms the interior component of the hammer 102 and the front hammer cylinder 102*f* forms the exterior component of the hammer 102**.

That is, the front hammer cylinder **102*f* has a larger diameter than the rear hammer cylinder 102*r*. This allows the larger front hammer cylinder 102*f*** to be made of a less durable metal with better heat transfer properties, such as aluminum, to facilitate better cooling.

In this second embodiment, the rear hammer cylinder **102*r* (i.e., having smaller diameter than the front hammer cylinder 102*f* and also having shorter axial length than the front hammer cylinder 102*f*) is referred to as the rear hammer cylinder cap 102*r*. In this embodiment, the hammer 102 and its internal components are received in the front hammer cylinder 102*f*. The front hammer cylinder 102*f* is coupled to the rear hammer cylinder 102*r* by a threaded connection (e.g., outer threaded portions of the rear hammer cylinder 102*r* engaging the inner threaded portions of the front hammer cylinder 102*f*). Also, instead of the front hammer cylinder 102*f* and the rear hammer cylinder 102*r* being threadably attached to each other, in an alternative design, the front hammer cylinder 102*f* includes the plurality of internal radial recesses 129 (as shown in FIGS. 28 and 29) and the rear cylinder cap 102*r* includes the plurality of radial projections 133 (as shown in FIGS. 3 and 36A) that are received in the radial recesses 129 of the front hammer cylinder 102*f*, with a seal 663 between the planet carrier 104 and the front hammer cylinder 102*f***.

Figure 36C:
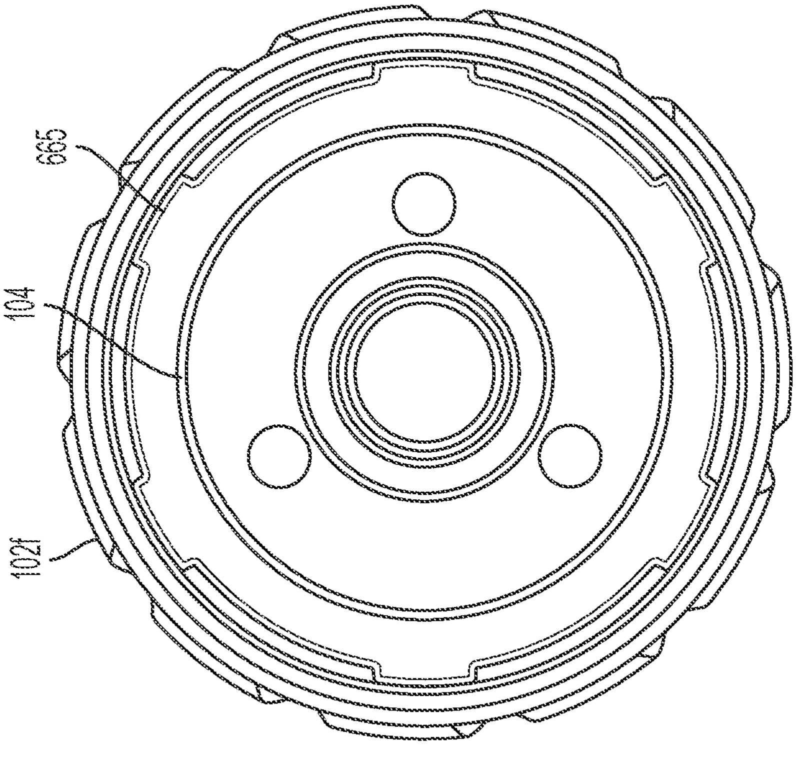
Figure 37B:
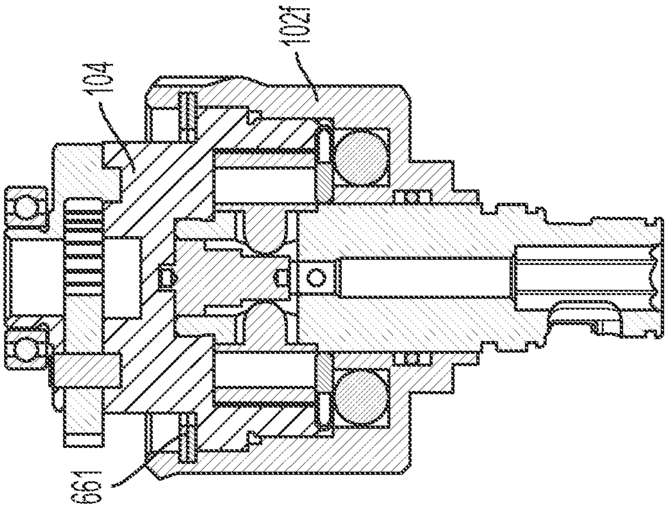
FIG. 37A shows a perspective view of a retaining ring and FIG. 37B shows a cross-section view of the impact assembly with the planet carrier assembly, the front hammer cylinder and the retaining ring according to an embodiment of the present patent application, where some portions of the impact assembly are not shown in FIG. 37B to better illustrate other portions of the impact assembly.
Figure 37A:
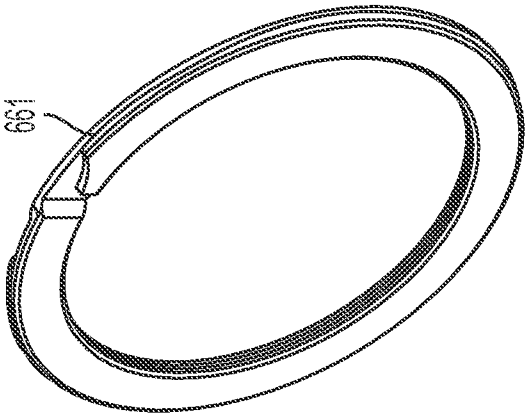

As shown in FIG. 36C, a rotational interlock 665 is formed between the plurality of radial projections 133 of the rear hammer cylinder cap **102*r* and the radial recesses 129 of the front hammer cylinder 102*f*. The rear cylinder cap 102*r* is axially retained in the front hammer cylinder 102*f* by a retaining ring 661 (as shown in FIG. 37A and 37B). That is, the retaining ring 661 is used to axially retain the carrier assembly 104 in the front hammer cylinder 102*f* This design enables the hammer 102 to be assembled from front to rear in the direction of the arrow OA in FIG. 3, instead of from rear to front as shown in FIGS. 4-7. Assembling from front to rear is easier to perform on the assembly line. This configuration enables that the hammer 102 and its internal components be assembled from front to rear, starting with the front hammer cylinder 102*f*, then inserting the anvil 122, the blades 116, the cam shaft 120, and the foam member 140 into the front hammer cylinder 102*f*, filling the hammer 102 with the oil/fluid, and then capping the hammer 102 by connecting (using projections 133 and recesses 129 or using threaded connections) the rear hammer cylinder cap 102*r* to the rear end of the front hammer cylinder 102*f***.

In another embodiment, as shown in and described with respect to FIGS. 39-44, the power tool comprises an active valve 3201 that is configured to control the discharge of fluid from the anvil chamber (e.g., 203 as shown in FIG. 10B) to the hammer chamber (e.g., 111 as shown in FIG. 4) so as to dampen the radial inward movement of the reciprocating member 3116 to the body portion 3113 of the anvil 3122. The active valve 3201 is configured to be variably open based on one or more physical characteristics of the fluid, which physical characteristics can vary in accordance with a physical characteristic of the fluid, e.g., one or more of the volume, temperature, pressure, or viscosity of the fluid.

The active valve 3201 may also be referred to as a flapper valve. The flapper valve 3201 comprises a flexible plate 3175 that is configured to selectively cover the outlet orifice 3132 in the anvil 3122 (i.e., one outlet orifice 3132 on opposite side of the anvil 3122) and to flex relative to the outlet orifice 3132 in the anvil 3122. As shown in FIGS. 39-44, each outlet orifice 3132 is covered by the flapper 3201 that is composed of a single flexible plate 3175 (e.g., no spacers or multiple plates like in the previously described embodiments). Remaining components of the impact assembly (including the pair of inlet orifices 3130, the pair of output orifices/ports 3132, the cam shaft 3120, the reciprocating members 3116, the anvil 3122, and the hammer 3102) are similar to those described in detail in the previously described embodiments and will not be described here again.

The impact assembly may be configured to provide an output torque in the range of approximately 500 inch-lbs. to approximately 750 in-lbs. For example, the output torque may be in the range of approximately 500 inch-lbs. to approximately 550 inch-lbs.

The hammer cylinder may have an outer diameter in the range of approximately 40 mm to approximately 45 mm, a length in the range of approximately 45 mm to approximately 50 mm and an interior volume in the range of approximately 6 $cm^3$ to approximately 10 $cm^3$. For example, the outer diameter of the hammer cylinder may be approximately 42 mm, the length of the hammer cylinder may be approximately 47 mm, and the interior volume of the hammer cylinder may be approximately 8 $cm^3$.

The mass/weight of the hammer cylinder may be approximately 133.4 grams (g)). The mass/weight of the hammer cylinder may be in the range between approximately 126.73 g and approximately 140.07 g. The mass/weight of the hammer cylinder may be in the range between approximately 126.73 g and approximately 133.4 g. The mass/weight of the hammer cylinder may be in the range between approximately 120.06 g and approximately 146.74 g. The mass/weight of the hammer cylinder may be in the range between approximately 120.06 g and approximately 133.4 g. The mass/weight of the hammer cylinder may be in the range between approximately 106.72 g and approximately 160.08 g. The mass/weight of the hammer cylinder may be in the range between approximately 106.72 g and approximately 133.4 g.

The mass/weight of the anvil may be approximately 66.0 g. The mass/weight of the anvil may be in the range between approximately 62.7 g and approximately 69.3 g. The mass/weight of the anvil may be in the range between approximately 62.7 g and approximately 66 g The mass/weight of the anvil may be in the range between approximately 59.4 g and approximately 72.6 g. The mass/weight of the anvil may be in the range between approximately 59.4 g and approximately 66 g. The mass/weight of the anvil may be in the range between approximately 52.8 g and approximately 79.2 g. The mass/weight of the anvil may be in the range between approximately 52.8 g and approximately 66 g.

The mass/weight of the vanes/blades may be approximately 2.5 g. The mass/weight of the vanes/blades may be in the range between approximately 2.375 g and approximately 2.625 g. The mass/weight of the vanes/blades may be in the range between approximately 2.375 g and approximately 2.5 g. The mass/weight of the vanes/blades may be in the range between approximately 2.25 g and approximately 2.75 g. The mass/weight of the vanes/blades may be in the range between approximately 2.25 g and approximately 2.5 g. The mass/weight of the vanes/blades may be in the range between approximately 2 g and approximately 3 g. The mass/weight of the vanes/blades may be in the range between approximately 2 g and approximately 2.5 g.

Each partially collapsible insert may have a volume in the range of approximately 2 $cm^3$ to approximately 4 $cm^3$ (e.g., approximately 2.8 $cm^3$) and may be collapsible to a volume in the range of approximately 1 $cm^3$ to approximately 3 $cm^3$ (e.g., approximately 1.8 $cm^3$). For example, each partially collapsible insert may have a volume of approximately 2.8 $cm^3$ and may be collapsible to a volume of approximately 1.8 $cm^3$.

The collapsible inserts may fill in the range of approximately 33% to approximately 50% of the interior volume of the cylinder when uncollapsed, and may collapse to in the range of about 50% to approximately 75% of its uncollapsed volume to fill in the range of approximately 17% to approximately 30% of the interior volume of the cylinder, enabling heat expansion of the fluid in the cylinder and a greater of volume of fluid in the cylinder.

For example, the dimension of each closed cell foam insert may be in the range between approximately 6 mm in diameter and approximately 8 mm in diameter and may be in the range between approximately 70 mm in length and approximately 75 mm in length. The interior volume of each closed cell foam insert may be in the range between approximately 2.5 $cm^3$ and approximately 3 $cm^3$.

Each closed cell foam insert may be configured to compress to approximately 1 $cm^3$ (i.e., to approximately two-thirds of its original uncompressed volume). Each closed cell foam insert may be configured to compress in the range between approximately 0.95 $cm^3$ and approximately 1.05 $cm^3$. Each closed cell foam insert may be configured to compress in the range between approximately 0.9 $cm^3$ and approximately 1.1 $cm^3$. Each closed cell foam insert may be configured to compress in the range between approximately 0.8 $cm^3$ and approximately 1.2 $cm^3$.

The ratio of the foam insert volume to the hammer cylinder interior volume may be greater than or equal to approximately 65% uncompressed and may be less than or equal to approximately 45% compressed.

The ratio of the foam insert volume to the hammer cylinder interior volume may be in the range between approximately 65% uncompressed and approximately 68.25% uncompressed. The ratio of the foam insert volume to the hammer cylinder interior volume may be in the range between approximately 65% uncompressed and approximately 71.5% uncompressed. The ratio of the foam insert volume to the hammer cylinder interior volume may be in the range between approximately 65% uncompressed and approximately 78% uncompressed.

The ratio of the foam insert volume to the hammer cylinder interior volume may be in the range between approximately 42.75% compressed and approximately 45% compressed. The ratio of the foam insert volume to the hammer cylinder interior volume may be in the range between approximately 40.5% compressed and approximately 45% compressed. The ratio of the foam insert volume to the hammer cylinder interior volume may be in the range between approximately 36% compressed and approximately 45% compressed.

The spring constant of the active valve flapper may be in the range between approximately 28 Newtons per millimeters (N/mm) and approximately 35 N/mm. The larger outlet orifices may require a larger spring constant, but the relationship is complex and not proportional.

The overall tool weight of the power tool may be less than or equal to approximately 2.5 pounds (lbs) (without battery). That is, the overall tool weight may be at most approximately 2.5 lbs (without battery). For example, the overall tool weight may be approximately 2.2 lbs (without battery). The overall tool weight may be between approximately 2.375 lbs (without battery) and approximately 2.5 lbs (without battery). The overall tool weight may be between approximately 2.25 lbs (without battery) and approximately 2.5 lbs (without battery). The overall tool weight may be between approximately 2.0 lbs (without battery) and approximately 2.5 lbs (without battery).

The power tool may have an overall length of at most 4.5 inches. The overall tool length may be less than or equal to approximately 4.5 inches in length. For example, the overall tool length may be approximately 4 inches. The overall tool length may be between approximately 4.275 inches and approximately 4.5 inches in length. The overall tool length may be between approximately 4.05 inches and approximately 4.5 inches in length. The overall tool length may be between approximately 3.6 inches and approximately 4.5 inches in length.

The motor may be an electric motor. The motor may be a brushless DC motor. The impact driver may be powered by a removable battery having a nominal voltage of at least approximately 18V. The battery may have a nominal voltage in the range between approximately 18V and approximately 80V. For example, the nominal voltage of the battery may be 18V, 20V, 36V, 48V, 60V, or 80V. The nominal voltage is in the range between approximately 18V and approximately 18.9V. The nominal voltage may be in the range between approximately 18V and approximately 19.8V. The nominal voltage may be in the range between approximately 18V and approximately 21.6V. The motor may be powered by a battery having a power output in the range of approximately 400 Watts to approximately 600 Watts. For example, the power output of the motor may be approximately 435 Watts.

The impact driver may be powered by a removable battery having a capacity of at least approximately 1.5 Ampere hours (Ah). For example, the impact driver may be powered by a removable battery having a capacity in the range between approximately 1.7 Ah to approximately 15 Ah.

The dimensions and/or weights of various parts and/or other parameters of the exemplary tool are measured in units noted above unless indicated otherwise. The dimensions and/or weights of various parts and/or other parameters of the exemplary tool, as shown and described here, may be up to 5 percent, 10 percent, 15 percent, or 20 percent greater than or up to 5 percent, 10 percent, 15 percent, or 20 percent less than those illustrated and described.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A power tool comprising:

a housing, a motor assembly disposed in the housing, an output shaft at least partially received in and rotatable relative to the housing, and an impact assembly operatively coupled with the motor assembly and configured to be driven thereby, the impact assembly comprising:

a hammer defining a hammer chamber therein and an inwardly protruding impact member, the hammer configured to be rotationally driven upon rotation of the motor assembly;

an anvil defining an anvil chamber therein, the anvil at least partially disposed in the hammer chamber and configured to rotationally drive the output shaft;

a fluid received in the hammer chamber and the anvil chamber;

the anvil comprising a body portion configured to be rotatable relative to the hammer, and a reciprocating portion that selectively moves radially outwardly relative to the body portion to be impacted by the impact member of the hammer according to a pressure of the fluid in the anvil chamber so that the hammer imparts a rotational movement to the body portion; and an active valve configured to control a discharge of the fluid from the anvil chamber to the hammer chamber so as to dampen a radial inward movement of the reciprocating portion relative to the body portion, the active valve being configured to be variably open based on one or more physical characteristics of the fluid.

2. The power tool of claim 1, wherein the anvil chamber includes an inlet orifice and an outlet orifice, and wherein the inlet orifice and the outlet orifice are configured to selectively provide fluid communication between the anvil chamber and the hammer chamber.

3. The power tool of claim 2, wherein the active valve is configured to be movable among a plurality of positions including a closed position and one or more at least partially open positions to control the discharge of the fluid from the anvil chamber to the hammer chamber via the outlet orifice.

4. The power tool of claim 3, further comprising a cam shaft that is configured to be received within the anvil chamber and configured to selectively seal the inlet orifice.

5. The power tool of claim 1, wherein the active valve comprises a flapper valve.

6. The power tool of claim 5, wherein the flapper valve comprises a flexible plate that is configured to selectively cover and flex relative to an outlet orifice in the anvil.

7. The power tool of claim 1, wherein the hammer comprises at least one cooling vane on an outer surface of the hammer.

8. The power tool of claim 1, wherein the impact assembly comprises an at least partially collapsible insert disposed inside the hammer chamber, wherein the at least partially collapsible insert is configured to reduce in volume upon an increase in temperature or pressure of the fluid in the hammer chamber.

9. The power tool of claim 8, wherein the at least partially collapsible insert comprises a foam insert.

10. The power tool of claim 1, wherein the impact assembly is configured to operate in an environment having an ambient temperature range between −30° C. and 50° C. without stall of the impact assembly.

11. The power tool of claim 10, wherein the output shaft is configured to provide an output torque of approximately 500 in-lb to approximately 550 in-lb across the ambient temperature range.

12. The power tool of claim 11, further comprising a battery coupleable to the motor assembly, wherein the battery has a nominal voltage of approximately 18V to approximately 60V and the motor assembly has a power output of approximately 400 W to approximately 450 W.

13. The power tool of claim 10, wherein the impact assembly further includes a foam insert disposed inside the hammer chamber and configured to reduce in volume upon an increase in temperature or pressure of the fluid in the hammer chamber.

14. The power tool of claim 1 further comprising:

at least two foam members within the hammer chamber, the at least two foam members being at least partially collapsible based upon a changing physical characteristic of the fluid during an operation of the impact assembly.

15. The power tool of claim 14, wherein the at least two foam members include a closed-cell foam material.

16. The power tool of claim 14, wherein the at least two foam members are spaced from one another within the hammer.

17. The power tool of claim 16, wherein a first one of the at least two foam members is positioned at a first end portion of the hammer and a second one of the at least two foam members is positioned at an opposite second end portion of the hammer.

18. The power tool of claim 14, wherein the impact assembly is configured to operate with the fluid in a temperature range between −30° C. and 215° C. without stall of the impact assembly.

19. The power tool of claim 14, wherein the impact assembly is configured to operate in an environment having an ambient temperature range between −30° C. and 50° C. without stall of the impact assembly.

20. The power tool of claim 14, wherein the at least two foam members fill at least approximately 65% of an interior volume of the hammer chamber when uncompressed.

21. The power tool of claim 20, wherein the at least two foam members fill at most approximately 45% of the interior volume of the hammer chamber when compressed.

22. The power tool of claim 14, wherein a volume of each of the at least two foam members is compressible to approximately two-thirds of an uncompressed volume.

* * * * *